US 11,754,874 B2

(12) United States Patent
Wang et al.

(10) Patent No.: US 11,754,874 B2
(45) Date of Patent: Sep. 12, 2023

(54) LIQUID CRYSTAL DISPLAY PANEL AND DISPLAY DEVICE

(71) Applicant: Shanghai Tianma Micro-Electronics Co., Ltd., Shanghai (CN)

(72) Inventors: Yuanying Wang, Shanghai (CN); Jun Zhou, Shanghai (CN); Fan Tian, Shanghai (CN); Yuefeng Gu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/038,919

(22) Filed: Sep. 30, 2020

(65) Prior Publication Data

US 2021/0080782 A1 Mar. 18, 2021

(30) Foreign Application Priority Data

Jun. 30, 2020 (CN) .......................... 202010623324.6

(51) Int. Cl.
*G02F 1/1335* (2006.01)
*G02F 1/13363* (2006.01)
*G02F 1/13357* (2006.01)

(52) U.S. Cl.
CPC .... *G02F 1/133528* (2013.01); *G02F 1/13363* (2013.01); *G02F 1/133602* (2013.01); *G02F 1/133638* (2021.01); *G02F 2413/04* (2013.01)

(58) Field of Classification Search
CPC ......... G02F 1/133528; G02F 1/133531; G02F 1/133638; G02F 2413/04
See application file for complete search history.

(56) References Cited

U.S. PATENT DOCUMENTS

| 2012/0218487 A1* | 8/2012 | Lu | G02F 1/13363 |
| | | | 349/98 |
| 2019/0278120 A1* | 9/2019 | Smith | G02F 1/133711 |
| 2020/0257166 A1* | 8/2020 | Smith | G09G 3/3648 |

FOREIGN PATENT DOCUMENTS

| CN | 201174012 Y | 12/2008 |
| CN | 101846829 A | 9/2010 |

(Continued)

OTHER PUBLICATIONS

English translation of Chinese Patent Publication No. CN109164627, published Jan. 8, 2019. Translation downloaded on Dec. 10, 2021 from Espacenet at http://worldwide.espacenet.com. Translation obtained using Google Translate tool on site. (Year: 2019).*

(Continued)

*Primary Examiner* — Angela K Davison
(74) *Attorney, Agent, or Firm* — CHRISTENSEN O'CONNOR JOHNSON KINDNESS PLLC

(57) ABSTRACT

Provided is a liquid crystal display panel, including: first and second substrates; a liquid crystal layer between the first and second substrates; a first linear polarizer provided at a side of the first substrate facing away from the liquid crystal layer and having an absorption axis extending along a first direction; a second linear polarizer provided at a side of the second substrate facing away from the liquid crystal layer and having an absorption axis extending along a direction perpendicular to the first direction; a first quarter-wave plate provided at the side of the first substrate facing away from the liquid crystal layer; a second quarter-wave plate between the first substrate and the liquid crystal layer; and a first half-wave plate provided at the side of the first substrate facing away from the liquid crystal layer, and/or a second half-wave plate between the first substrate and the liquid crystal layer.

5 Claims, 54 Drawing Sheets

(56) References Cited

FOREIGN PATENT DOCUMENTS

| CN | 107908037 A | 4/2018 |
| CN | 110967863 A | 4/2020 |

OTHER PUBLICATIONS

Chinese First Office Action dated Apr. 11, 2022, issued in corresponding Chinese Application No. 202010623324.6, filed Jun. 30, 2020, 10 pages.

* cited by examiner

LIQUID CRYSTAL DISPLAY PANEL AND DISPLAY DEVICE

CROSS-REFERENCE TO RELATED APPLICATIONS

The present disclosure claims priority to Chinese Patent Application No. 202010623324.6, filed on Jun. 30, 2020, the content of which is incorporated herein by reference in its entirety.

TECHNICAL FIELD

The present disclosure relates to the field of display technologies, and more particularly, to a liquid crystal display panel and a display device.

BACKGROUND

Liquid crystal display (LCD) panels have been widely used in fields such as mobile phones, televisions, digital cameras, car monitors and the like due to its advantages such as fast response, low cost, no radiation, soft image, thinness and the like.

The liquid crystal display panel includes an array substrate and a color film substrate facing towards each other, and a liquid crystal layer located between the array substrate and the color film substrate. The color film substrate is provided with various film layers such as a color filter, a black matrix, and optical glue. Due to a difference in refractive indices between different film layers, ambient light will be reflected at an interface between these film layers after entering the liquid crystal display panel. Moreover, in order to achieve functions such as signal shielding or signal transmission, the liquid crystal display panel will be further provided with some film layers having high electrical conductivity, and generally high reflectivity. The ambient light will also be reflected by these film layers after entering the liquid crystal display panel. The above-mentioned reflected light emitted from the liquid crystal display panel will interfere with light emitted from the liquid crystal display panel itself, thereby affecting a contrast of the liquid crystal display panel.

In addition, the existing current liquid crystal display panel also has a problem of light leakage in the black state at a front viewing angle and at a large viewing angle, and a problem of a poor contrast.

SUMMARY

In view of this, the embodiments of the present disclosure provide a liquid crystal display panel and a display device, aiming to reduce the reflected ambient light emitted from the liquid crystal display panel, alleviate light leakage in a black state of the liquid crystal display panel at a front viewing angle and at a large viewing angle, and increase a contrast of the liquid crystal display panel at a front viewing angle and a large viewing angle.

In an aspect, an embodiment of the present disclosure provides a liquid crystal display panel, including: a first substrate and a second substrate that face towards each other; a liquid crystal layer disposed between the first substrate and the second substrate; a first linear polarizer disposed on a side of the first substrate facing away from the liquid crystal layer and having an absorption axis extending along a first direction; a second linear polarizer disposed on a side of the second substrate facing away from the liquid crystal layer and having an absorption axis extending along a direction perpendicular to the first direction at a front viewing angle; a first quarter-wave plate disposed at the side of the first substrate facing away from the liquid crystal layer; a second quarter-wave plate disposed between the first substrate and the liquid crystal layer; and a first half-wave plate disposed on the side of the first substrate facing away from the liquid crystal layer, and/or a second half-wave plate disposed between the first substrate and the liquid crystal layer.

In another aspect, an embodiment of the present disclosure provides a display device, including the liquid crystal display panel described above.

For the liquid crystal display panel and the display device provided by the embodiments of the present disclosure, the first linear polarizer can cooperate with the first phase delay structure in such a manner that light becomes circularly polarized light after passing through the first linear polarizer and the first phase delay structure.

In addition, when the liquid crystal display panel is in a black state, the second linear polarizer can cooperate with the second phase delay structure in such a manner that light becomes circularly polarized light after passing through the second linear polarizer, the liquid crystal layer and the second phase delay structure. Moreover, a rotation direction of the circularly polarized light formed after light passes through the second linear polarizer, the liquid crystal layer and the second phase delay structure is the same as a rotation direction of the circularly polarized light formed after light passes through the first linear polarizer and the first phase delay structure descried above.

When the liquid crystal display panel is in a white state, the second linear polarizer can cooperate with the second phase delay structure in such a manner that light becomes circularly polarized light after passing through the second linear polarizer, the liquid crystal layer and the second phase delay structure. Moreover, a rotation direction of the circularly polarized light formed after light passes through the second linear polarizer, the liquid crystal layer and the second phase delay structure is the same as the rotation direction of the circularly polarized light formed after light passes through the first linear polarizer and the first phase delay structure descried above.

In addition, in the embodiments of the present disclosure, the first phase delay structure and/or the second phase delay structure is formed as a structure of superposition of the quarter-wave plate and the half-wave plate. Therefore, compared with a case where only the quarter-wave plate is provided, in the embodiments of the present disclosure, phase delay will occur twice when light passes through the first phase delay structure and/or the second phase delay structure, thereby alleviating light leakage in the black state at a large viewing angle and increasing the contrast at a large viewing angle. Moreover, the first phase delay structure and/or the second phase delay structure can also alleviate color dispersion in the black state of the liquid crystal display panel, and can also suppress color shift of the display panel at a large viewing angle.

BRIEF DESCRIPTION OF DRAWINGS

In order to explain the embodiments of the present disclosure or the technical solutions in the prior art, the drawings used in the description of the embodiments or the prior art will be introduced in the following. The drawings in the following description are only some of the embodiments of the present disclosure. For those of ordinary skill in the art, other drawings can be obtained based on these drawings without any inventive efforts.

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are only for the purpose of describing the specific embodiments, rather than limiting the present disclosure. The singular forms of "a", "an" and "the" used in the embodiments of the present disclosure and the attached claims are intended to include plural forms as well, unless indicated otherwise explicitly in the context.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

Figure 1:
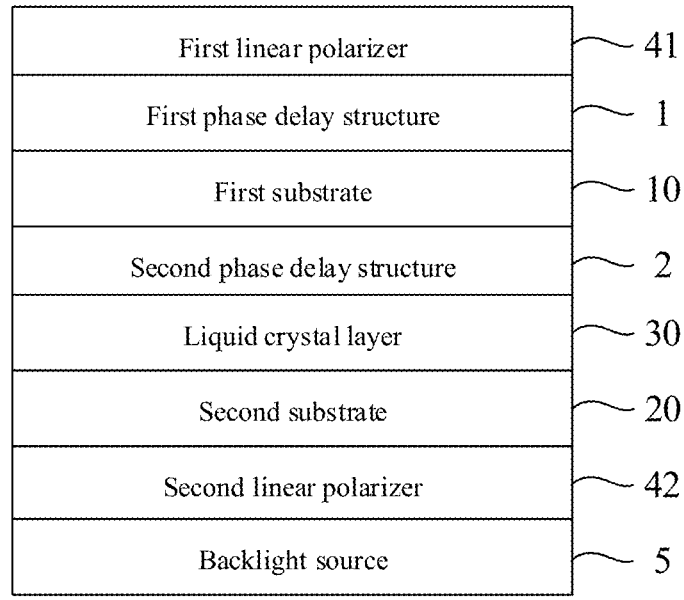
FIG. 1 is a schematic cross-sectional view of a liquid crystal display panel according to an embodiment of the present disclosure.

The embodiments of the present disclosure provide a liquid crystal display panel. FIG. 1 is a schematic cross-sectional view of a liquid crystal display panel according to an embodiment of the present disclosure. As shown in FIG. 1, the liquid crystal display panel includes a first substrate 10, a second substrate 20, a liquid crystal layer 30, a first linear polarizer 41, a second linear polarizer 42, a first phase delay structure 1 and a second phase delay structure 2. The first substrate 10 is opposite to the second substrate 20. The liquid crystal layer 30 is located between the first substrate 10 and the second substrate 20. The first linear polarizer 41, the second linear polarizer 42 and the first phase delay structure 1 are all disposed outside a liquid crystal cell. The second phase delay structure 2 is located inside the liquid crystal cell. In an example, the first linear polarizer 41 and the first phase delay structure 1 are located on a side of the first substrate 10 facing away from the liquid crystal layer 30. The second linear polarizer 42 is located on a side of the second substrate 20 facing away from the liquid crystal layer 30. The second phase delay structure 2 is located between the first substrate 10 and the liquid crystal layer 30.

An absorption axis of the first linear polarizer 41 extends in a first direction. At a front viewing angle, an absorption axis of the second linear polarizer 42 extends in a direction perpendicular to the first direction.

In this embodiment of the present disclosure, for example, each of the first phase delay structure 1 and the second phase delay structure 2 includes a quarter-wave plate ($\lambda/4$). Moreover, in this embodiment of the present disclosure, at least one of the first phase delay structure 1 and the second phase delay structure 2 further includes a half-wave plate ($\lambda/2$). For better illustration, the quarter-wave plate and the half-wave plate included by the first phase delay structure 1 are respectively referred to as a first quarter-wave plate and a first half-wave plate, and the quarter-wave plate and the half-wave plate included by the second phase delay structure 2 are respectively referred to as a second quarter-wave plate and a second half-wave plate.

In this embodiment of the present disclosure, the first linear polarizer 41 can cooperate with the first phase delay structure 1 in such a manner that light becomes circularly polarized light after passing through the first linear polarizer 41 and the first phase delay structure 1. The circularly polarized light may be left rotation circularly polarized light or right rotation circularly polarized light. Here, a rotation direction of the circularly polarized light refers to a rotation direction observed at a viewing angle facing towards a direction of light propagation.

In addition, when the liquid crystal display panel is in a black state, that is, when no power is applied to two sides of the liquid crystal layer 30 and liquid crystal molecules in the liquid crystal layer 30 are not deflected, the second linear polarizer 42 can cooperate with the second phase delay structure 2 in such a manner that light becomes circularly polarized light after passing through the second linear polarizer 42, the liquid crystal layer 30 and the second phase delay structure 2. A rotation direction of the circularly polarized light formed after light passes through the second linear polarizer 42, the liquid crystal layer 30 and the second phase delay structure 2 is the same as the rotation direction of the circularly polarized light formed after light passes through the first linear polarizer 41 and the first phase delay structure 1 as descried above.

When the liquid crystal display panel is in a white state, that is, when power is applied to the two sides of the liquid crystal layer 30 and the liquid crystal molecules in the liquid crystal layer 30 are deflected, the second linear polarizer 42 can cooperate with the second phase delay structure 2 in such a manner that light becomes circularly polarized light after passing through the second linear polarizer 42, the liquid crystal layer 30 and the second phase delay structure 2. A rotation direction of the circularly polarized light formed after light passes through the second linear polarizer 42, the liquid crystal layer 30 and the second phase delay structure 2 is the same as the rotation direction of the circularly polarized light formed after light passes through the first linear polarizer 41 and the first phase delay structure 1 descried above.

The liquid crystal display panel inevitably includes some materials having higher reflectivity, such as shielding electrodes for shielding. Alternatively, due to a difference in refractive indices between different film layers in the liquid crystal display panel, such as between a base substrate and a color filter and/or a black matrix, or between the color filter and/or the black matrix and the optical glue, light will also be reflected when reaching an interface between these film layers. These film layers having a reflective function will reflect ambient light, and the reflected light will affect light emitted from the liquid crystal display panel itself, thereby affecting a contrast of the liquid crystal display panel.

In this embodiment of the present disclosure, the first phase delay structure 1 and the second phase delay structure 2 are arranged at two sides of the above-mentioned film layer having the reflective function. When the liquid crystal display panel provided by this embodiment of the present disclosure is in operation, the ambient light emitted towards the liquid crystal display panel, before reaching the above-mentioned film layer having the reflective function, will become circularly polarized light after passing through the first linear polarizer 41 and the first phase delay structure 1. When the circularly polarized light reaches these film layers having the reflective function, a rotation direction of the light will change after being reflected. Then, after the reflected light exits from a light-exiting side of the liquid crystal display panel, the light will be transformed again into linear polarized light after passing through the first phase delay structure 1. A polarization direction of the linear polarized light is parallel to the absorption axis of the first linear polarizer 41. The linearly polarized light will be absorbed by the first linear polarizer 41 when reaching the first linear polarizer 41 and cannot exit, thereby preventing reflected ambient light from exiting from the liquid crystal display panel.

In addition, when the liquid crystal display panel is in the black state, light emitted from a backlight source 5 becomes circularly polarized light after passing through the second linear polarizer 42, the liquid crystal layer 30 and the second phase delay structure 2, and a rotation direction of the circularly polarized light is the same as the rotation direction of the above-mentioned circularly polarized light formed after light passes through the first linear polarizer 41 and the first phase delay structure 1. Subsequently, the circularly polarized light formed after the light emitted from the backlight source 5 passes through the second linear polarizer 42, the liquid crystal layer 30 and the second phase delay structure 2 will be transformed into a linear polarized light after passing through the first phase delay structure, and a polarization direction of the linear polarized light is parallel to the absorption axis of the first linear polarizer 41. The linear polarized light is subsequently absorbed by the first linear polarizer 41 and cannot exit, thereby avoiding light leakage in the black state of the liquid crystal display panel.

When the liquid crystal display panel is in the white state, light emitted from the backlight source 5 becomes circularly polarized light after passing through the second linear polarizer 42, the liquid crystal layer 30 and the second phase delay structure 2, and a rotation direction of the circularly polarized light is opposite to the rotation direction of the above-mentioned circularly polarized light formed after light passes through the first linear polarizer 41 and the first phase delay structure 1. Subsequently, the circularly polarized light formed after the light emitted from the backlight source 5 passes through the second linear polarizer 42, the liquid crystal layer 30 and the second phase delay structure 2 will be transformed into linear polarized light after passing through the first phase delay structure 1, and the polarization direction of the linear polarized light is perpendicular to the absorption axis of the first linear polarizer 41. The linear polarized light can be subsequently emitted from the first linear polarizer 41, thereby achieving a brightness of the liquid crystal display panel in the white state, and thus increasing the contrast of the liquid crystal display panel.

In addition, in this embodiment of the present disclosure, the first phase delay structure 1 and/or the second phase delay structure 2 is formed as a structure of superposition of the quarter-wave plate and the half-wave plate. Therefore, compared with a case where only the quarter-wave plate is provided, in this embodiment of the present disclosure, phase delay will occur twice when light passes through the first phase delay structure 1 and/or the second phase delay structure 2, thereby alleviating light leakage in the black state at a large viewing angle and increasing the contrast at a large viewing angle. Moreover, the first phase delay structure 1 and/or the second phase delay structure 2 can also alleviate color dispersion in the black state of the liquid crystal display panel, and can also suppress color shift of the display panel at a large viewing angle.

In an example, on the basis that the first phase delay structure 1 and the second phase delay structure 2 can achieve the above functions, according to different setting manners of wave plates in the first phase delay structure 1 and the second phase delay structure 2, the embodiments of the present disclosure provide a variety of different structures of the liquid crystal display panel, which will be respectively illustrated in the following.

Figure 2:
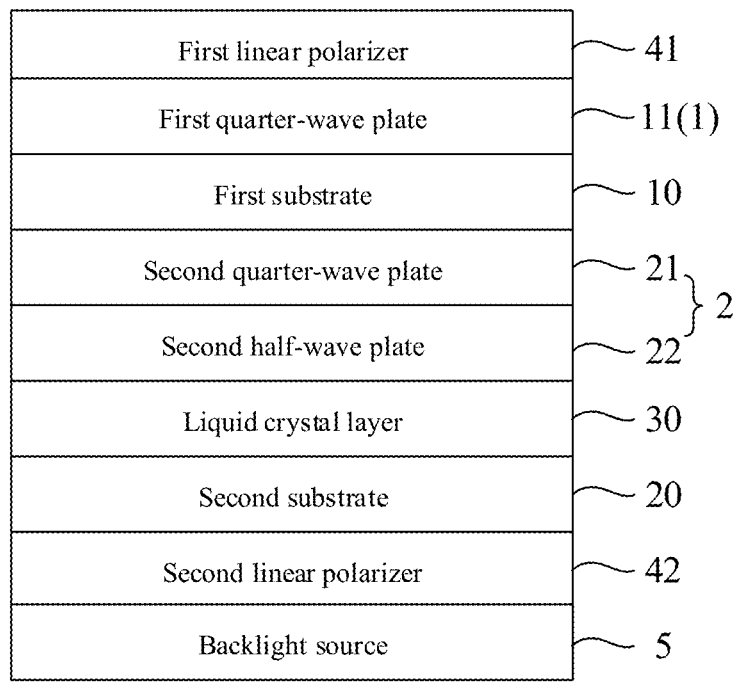
FIG. 2 is a schematic cross-sectional view of another liquid crystal display panel according to an embodiment of the present disclosure.

FIG. 2 is a schematic cross-sectional view of another liquid crystal display panel according to an embodiment of the present disclosure. As shown in FIG. 2, in this embodiment of the present disclosure, the liquid crystal display panel can adopt a first scheme for setting the number of wave plates. The first scheme for setting the number of wave plates represents that the second phase delay structure 2 inside the liquid crystal cell includes a second quarter-wave plate 21 and a second half-wave plate 22, and the first phase delay structure 1 disposed outside the liquid crystal cell only includes a first quarter-wave plate 11. The first scheme for setting the number of wave plates is denoted by A1 in the following.

In an embodiment, the liquid crystal display panel based on the A1 design may further adopt a first scheme for setting positions of wave plates. The first scheme for setting positions of wave plates based on the A1 design represents that the second half-wave plate 22 is located between the second quarter-wave plate 21 and the second linear polarizer 42. The first scheme for setting positions of wave plates based on A1 is denoted by A1-B1 in the following.

In an embodiment, the liquid crystal display panel based on the A1-B1 design may further adopt a first scheme for setting a rotation direction. The first scheme for setting the rotation direction based on the A1-B1 design represents that ambient light emitted towards the liquid crystal display panel becomes left rotation circularly polarized light after passing through the first linear polarizer 41 and the first phase delay structure 1. The first scheme for setting the rotation direction based on the A1-B1 design is denoted by A1-B1-C1 in the following.

In an embodiment, when the liquid crystal display panel adopts the A1-B1-C1 design, in a case where the first quarter-wave plate 11 is made of a positive material, an angle $\theta_2$ formed between a slow axis of the first quarter-wave plate 11 and a first direction may be set as 45°; and in a case where the first quarter-wave plate 11 is made of a negative material, the angle θ2 formed between the slow axis of the first quarter-wave plate 11 and the first direction may be set as 135°.

Figure 3:
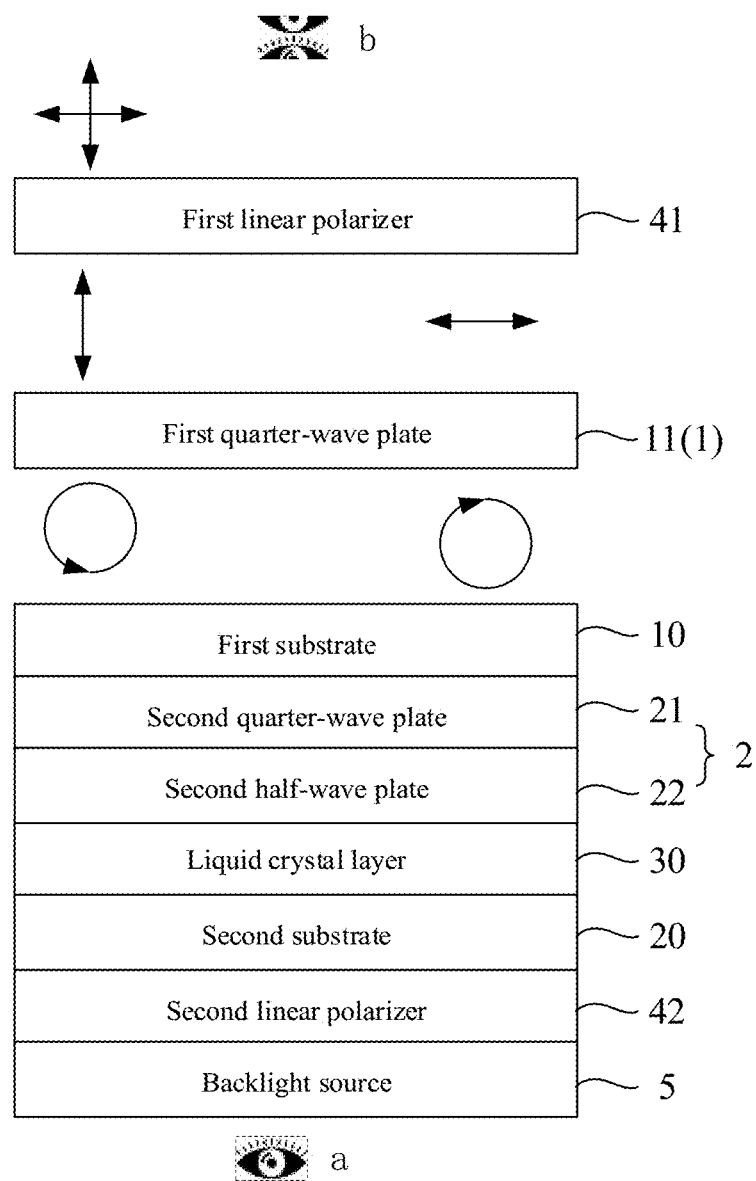
FIG. 3 is a schematic diagram illustrating light changes after ambient light is emitted towards the liquid crystal display panel shown in FIG. 2.
Figure 4:
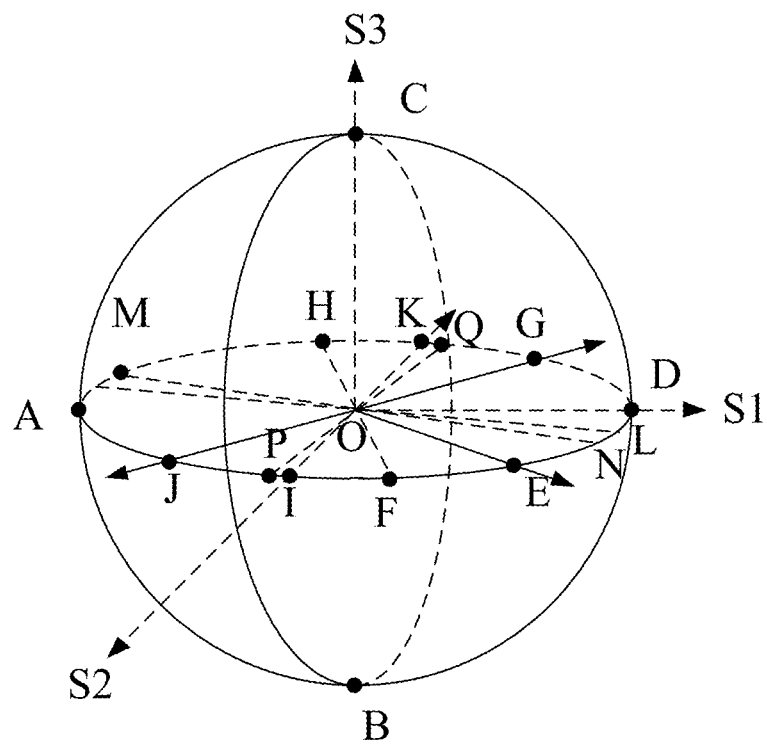
FIG. 4 illustrates a Poincare sphere that characterizes a polarization state of light.
Figure 5:
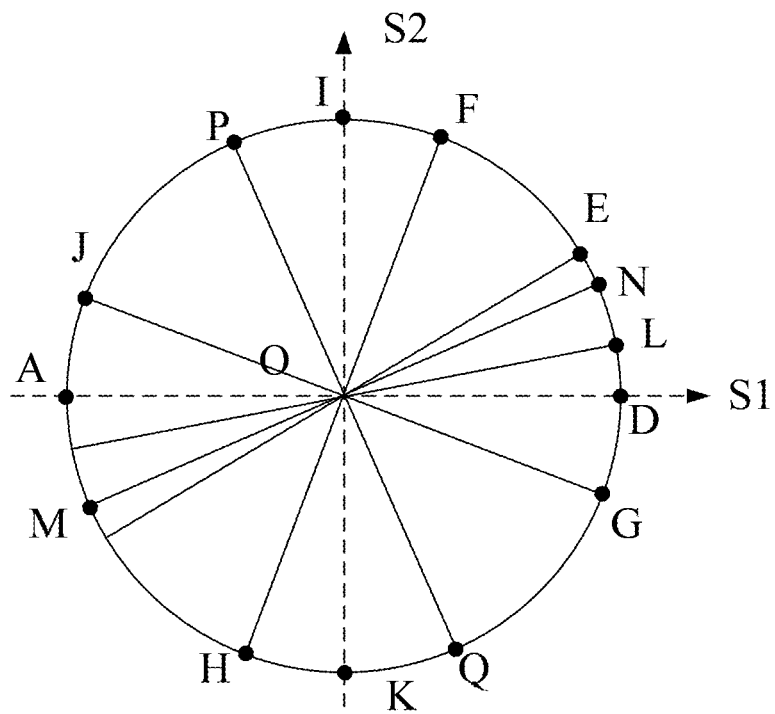
FIG. 5 illustrates an equatorial circle of the Poincare sphere shown in FIG. 4.

FIG. 3 is a schematic diagram illustrating light changes after ambient light is emitted towards the liquid crystal display panel shown in FIG. 2. With reference to FIG. 3, after the ambient light is emitted towards the liquid crystal display panel, the ambient light becomes linear polarized light after passing through the first linear polarizer 41, and a polarization direction of the linear polarized light is a second direction. The second direction is perpendicular to the first direction, and the first direction is a direction of the absorption axis of the first linear polarizer 41. FIG. 4 illustrates a Poincaré sphere that characterizes a polarization state of light, and FIG. 5 illustrates an equatorial circle of the Poincaré sphere shown in FIG. 4. As shown in FIG. 4 and FIG. 5, S1 represents the first direction, S2 represents the second direction, and S1 is perpendicular to S2. S3 represents a third direction, and S3 is perpendicular to a plane where S1 and S2 are located. The linear polarized light, which has a polarization direction being the second direction, is denoted by a point A in FIG. 4 and FIG. 5 (an angle on the Poincare sphere is twice an actual angle).

The linear polarized light, which is emitted from the first linear polarizer 41 and has a polarization direction being the second direction, is emitted towards the liquid crystal display panel, and then passes through the first quarter-wave plate 11. The polarization direction of light rotates clockwise (in a case where the first quarter-wave plate 11 is made of a positive material) or counterclockwise (in a case where the first quarter-wave plate 11 is made of a negative material) by 90° about the slow axis of the first quarter-wave plate 11.

In a case where the first quarter-wave plate 11 is made of a positive material, the angle $\theta_2$ formed between the slow axis of the first quarter-wave plate 11 and the first direction is 45°, and the slow axis of the first quarter-wave plate 11 is denoted by a positive axis OI of S2 in FIG. 4 and FIG. 5. When observed at a position a shown in FIG. 3, the linear polarized light, which has the polarization direction being the second direction, rotates clockwise by 90° about the slow axis of the first quarter-wave plate 11, and this process is illustrated by the point A rotating clockwise by 90° on a sphere surface of the Poincare sphere about OI to a point B located on a negative axis of S3. That is, after passing through the first quarter-wave plate 11, the linear polarized light, which has the polarization direction being the second direction, becomes left rotation circularly polarized light.

The left rotation circularly polarized light becomes right rotation circularly polarized light after being reflected by a reflective film layer in the liquid crystal display panel, this process is illustrated by the point B moving to a point C on the Poincare sphere shown in FIG. 4. However, when observing the reflected light, as shown in FIG. 3, an observation position is changed from an original position a to a position b. The right rotation circularly polarized light when originally observed at the position a becomes left rotation circularly polarized light when observed at the position b, so it is still denoted by the point B on the Poincare sphere shown in FIG. 4.

When observed at the position b, the left rotation circularly polarized light is emitted towards a light-exiting side of the liquid crystal display panel. After light passes through the first quarter-wave plate 11, a polarization direction of the light rotates clockwise by 90° about the slow axis of the first quarter-wave plate 11. This process is represented on the Poincare sphere shown in FIG. 4 by the point B rotating clockwise by 90° on the sphere surface of the Poincare sphere about OI to a point D located on the positive axis of S1. That is, after passing through the first quarter-wave plate 11, the left rotation circularly polarized light becomes linear polarized light, which has a polarization direction being the first direction. Subsequently, the linear polarized light is absorbed by the first linear polarizer 41 and cannot exit, thereby preventing reflected ambient light from exiting from the liquid crystal display panel.

In a case where the first quarter-wave plate 11 is made of a negative material, the angle $\theta_2$ formed between the slow axis of the first quarter-wave plate 11 and the first direction is 135°. The slow axis of the first quarter-wave plate 11 is denoted by a negative axis OK of S2 in FIG. 3 and FIG. 4. When observed at the position a shown in FIG. 3, the linear polarized light, which has a polarization direction being the second direction, rotates counterclockwise by 90° about the slow axis of the first quarter-wave plate 11, and this process is represented on the Poincaré sphere shown in FIG. 4 by the point A rotating counterclockwise by 90° on the sphere surface of the Poincare sphere to the point B located on the negative axis of S3. That is, the linear polarized light, which has a polarization direction being the second direction, becomes left rotation circularly polarized light after passing through the first quarter-wave plate 11.

The left rotation circularly polarized light becomes right rotation circularly polarized light after being reflected by the reflective film layer in the liquid crystal display panel. The right rotation circularly polarized light when originally observed at the position a becomes left rotation circularly polarized light when observed at the position b, so it is still denoted by the point B on the Poincare sphere shown in FIG. 4.

When observed at the position b, the left rotation circularly polarized light is emitted towards the light-exiting side of the liquid crystal display panel. After light passes through the first quarter-wave plate 11, a polarization direction of the light rotates counterclockwise by 90° about the slow axis of the first quarter-wave plate 11. This process is represented on the Poincare sphere shown in FIG. 4 by the point B rotating counterclockwise by 90° on the sphere surface of the Poincare sphere about OK to the point D located on the positive axis of S1. That is, after passing through the first quarter-wave plate 11, the left rotation circularly polarized light becomes linear polarized light having a polarization direction being the first direction. Subsequently, the linear polarized light is absorbed by the first linear polarizer 41 and cannot exit, thereby preventing reflected ambient light from exiting from the liquid crystal display panel.

Based on the structure shown in FIG. 2, in a case where the A1-B1-C1 design is adopted and it is satisfied that $\theta_2=45°$ (in a case where the first quarter-wave plate 11 is made of a positive material) or $\theta_2=135°$ (in a case where the first quarter-wave plate 11 is made of a negative material), when setting the second quarter-wave plate 21 and the second half-wave plate 22 in the liquid crystal cell, in a case where the second quarter-wave plate 21 is made of a positive material, an angle $\theta_3$ formed between a slow axis of the second half-wave plate 22 and the first direction and an angle $\theta_4$ formed between a slow axis of the second quarter-wave plate 21 and the first direction satisfy that $\theta_4=2\theta_3+135°$, and in a case where the second quarter-wave plate 21 is made of a negative material, the angle $\theta_3$ and the angle $\theta_4$ satisfy that $\theta_4=2\theta_3+45°$. In this way, the contrast of the liquid crystal display panel is increased.

Figure 6:
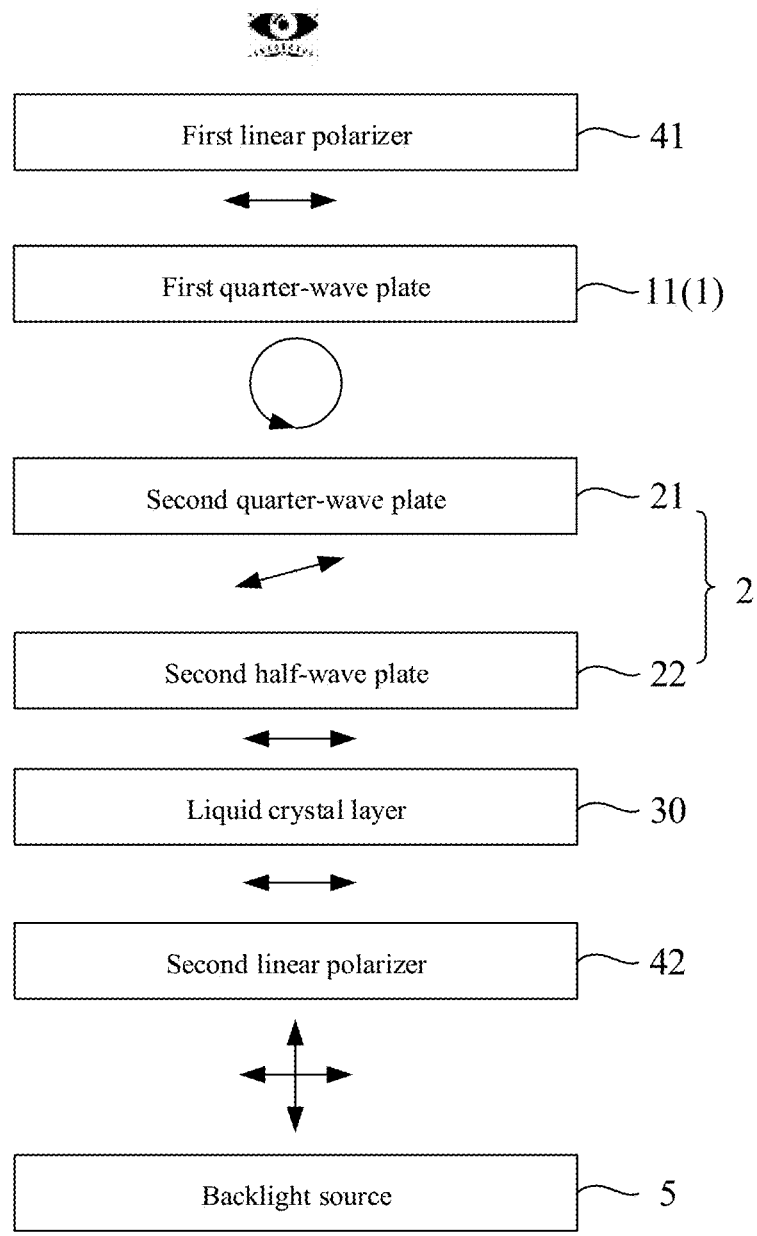
FIG. 6 is a schematic diagram illustrating light changes when the liquid crystal display panel shown in FIG. 2 is in a black state.

FIG. 6 is a schematic diagram illustrating light changes when the liquid crystal display panel shown in FIG. 2 is in a black state (structures that do not change a polarization state of the light are omitted in this figure). With reference to FIG. 6, after passing through the second linear polarizer 42, the light emitted from the backlight source 5 becomes linear polarized light, which has a polarization direction being the first direction and is denoted by a point D on the Poincare sphere shown in FIGS. 4 and 5. When the liquid crystal display panel is in the black state, no power is applied to the two sides of the liquid crystal layer 30, and the polarization direction of the linear polarized light does not change after passing through the liquid crystal layer 30.

The linear polarized light, which is emitted from the liquid crystal layer 30 and has a polarization direction being the first direction, is emitted towards the light-exiting side of the liquid crystal display panel and then passes through the second half-wave plate 22. Then, the polarization direction of the light rotates clockwise (in a case where the second half-wave plate 22 is made of a positive material) or counterclockwise (in a case where the second half-wave plate 22 is made of a negative material) by 180° about the slow axis of the second half-wave plate 22.

Assuming that the slow axis of the second half-wave plate 22 is denoted by OE on the Poincaré sphere shown in FIG. 4 and FIG. 5, then the polarization direction rotating by 180° about the slow axis of the second half-wave plate 22 is represented by the point D rotating by 180° on the sphere surface of the Poincare sphere about OE to a point F. That is, after passing through the second half-wave plate 22, the linear polarized light having a polarization direction being the first direction becomes linear polarized light having the polarization direction being a fourth direction. As shown in FIG. 5, D and F are symmetrical to each other about OE. ∠DOE=2θ$_3$, and ∠DOF=2∠DOE=4θ$_3$.

Then, the linear polarized light having a polarization direction being the fourth direction passes through the second quarter-wave plate 21, and the polarization direction of the light rotates by 90° about the slow axis of the second quarter-wave plate 21.

In a case where the second quarter-wave plate 21 is made of a positive material, θ$_4$=2θ$_3$+135°, that is, 2θ$_4$=4θ$_3$+270°=4θ$_3$+180°+90°. As shown in FIG. 5, 4θ$_3$+180°=∠DOH, and 4θ$_3$+180°+90°=∠DOH+90°=∠DOG (obtuse angle)=2θ$_4$. Here, O, F, and H are collinear. OG is perpendicular to OH. Therefore, the slow axis of the second quarter-wave plate 21 made of the positive material can be denoted by OG in FIG. 5. Therefore, the polarization direction of the linear polarized light rotating clockwise by 90° about the slow axis of the second quarter-wave plate 21 is represented on the Poincare sphere shown in FIG. 4 by the point F rotating clockwise by 90° on the sphere surface of the Poincare sphere about OG. The point F rotates clockwise by 90° on the sphere surface of the Poincare sphere about OG to the point B located on the negative axis of S3.

In a case where the second quarter-wave plate 21 is made of a negative material and θ$_4$=2θ$_3$+45°, 2θ$_4$=4θ$_3$+90°. As shown in FIG. 4 and FIG. 5, 4θ$_3$+90°=∠DOF+90°=∠DOJ=2θ$_4$. Here, OF is perpendicular to OJ, and O, J, and G are collinear. Therefore, the slow axis of the second quarter-wave plate 21 made of the negative material is denoted by OJ in FIG. 5. Therefore, the polarization direction of the linear polarized light rotating counterclockwise by 90° about the slow axis of the second quarter-wave plate 21 is represented on the Poincare sphere shown in FIG. 4 by the point F rotating counterclockwise by 90° on the sphere surface of the Poincare sphere about OJ to the point B located on the negative axis of S3.

That is, after passing through the second quarter-wave plate 21, the linear polarized light having a polarization direction being the fourth direction becomes left rotation circularly polarized light. Then, the left rotation circularly polarized light is further propagated towards the light-exiting side of the liquid crystal display panel and passes through the first quarter-wave plate 11 to become linear polarized light having a polarization direction being the first direction. This process is the same as an emission process of the above-mentioned ambient light after being reflected by the liquid crystal display panel based on the A1-B1-C1 design, and will not be repeated herein. Subsequently, the linear polarized light is absorbed by the first linear polarizer 41 and cannot exit, thereby avoiding light leakage in a black state of the liquid crystal display panel.

Figure 7:
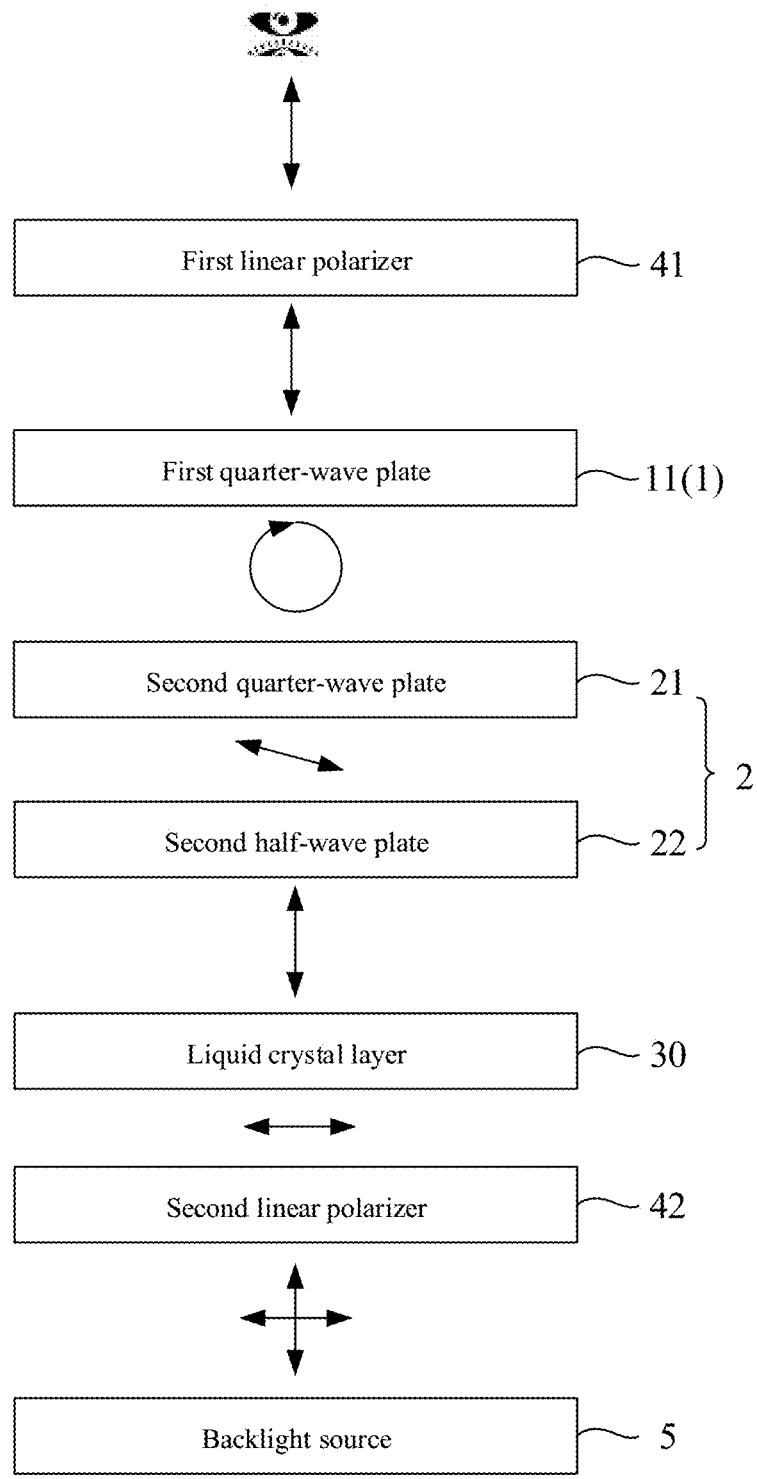
FIG. 7 is a schematic diagram illustrating light changes when the liquid crystal display panel shown in FIG. 2 is in a white state.

FIG. 7 is a schematic diagram illustrating light changes when the liquid crystal display panel shown in FIG. 2 is in a white state (structures that do not change a polarization state of the light are omitted in this figure). When the liquid crystal display panel is in the white state, as shown in FIG. 7, power is supplied to two sides of the liquid crystal layer 30, and the liquid crystal molecules therein are deflected under a voltage. After linear polarized light passes through the liquid crystal layer 30, the polarization direction of the linear polarized light changes from the first direction to the second direction, which is denoted by the point A in FIG. 4 and FIG. 5. Then, the linear polarized light having a polarization direction being the second direction passes through the second half-wave plate 22, and the polarization direction of the light rotates by 180° about the slow axis of the second half-wave plate 22. The slow axis of the second half-wave plate 22 is denoted by OE in FIG. 4 and FIG. 5. Since A and D are symmetrical to each other about O, A will fall onto a point H after rotating about OE, and H and F are symmetrical to each other about O. That is, after passing through the second half-wave plate 22, the linear polarized light having a polarization direction being the second direction becomes linear polarized light having a polarization direction being the fifth direction. Then, the linear polarized light having a polarization direction being the fifth direction passes through the second quarter-wave plate 21, and the polarization direction of the light rotates by 90° about the slow axis of the second quarter-wave plate 21.

In a case where the second quarter-wave plate 21 is made of a positive material, as described above, the slow axis of the second quarter-wave plate 21 made of the positive material is denoted by OG in FIG. 4 and FIG. 5. Since OH is perpendicular to OG, H rotates clockwise by 90° about the slow axis of the second quarter-wave plate 21 to the point C.

In a case where the second quarter-wave plate 21 is made of a negative material, as described above, the slow axis of the second quarter-wave plate 21 made of the negative material is denoted by OJ in FIG. 4 and FIG. 5, and H rotates counterclockwise by 90° to the point C.

That is, after passing through the second quarter-wave plate 21, the linear polarized light having a polarization direction being the fifth direction becomes right rotation circularly polarized light. Then, the right rotation circularly polarized light is further propagated towards the light-exiting side of the liquid crystal display panel and passes through the first quarter-wave plate 11, and the polarization direction of the light rotates by 90° about the slow axis of the first quarter-wave plate 11.

In a case where the first quarter-wave plate 11 is made of a positive material, the angle θ$_2$ formed between the slow axis of the first quarter-wave plate 11 and the first direction is 45°. The polarization direction of the light rotates clockwise by 90° about the slow axis of the first quarter-wave plate 11, and this process is represented in FIG. 4 by the point C rotating clockwise by 90° on the sphere surface of the Poincaré sphere about OI to the point A.

In a case where the first quarter-wave plate 11 is made of a negative material, the angle θ$_2$ formed between the slow axis of the first quarter-wave plate 11 and the first direction is 135°. The polarization direction of the light rotates counterclockwise by 90° about the slow axis of the first quarter-wave plate 11, and this process is represented in FIG. 4 by the point C rotating counterclockwise by 90° on the sphere surface of the Poincaré sphere about OK to the point A.

That is, after passing through the first quarter-wave plate 11, the right rotation circularly polarized light becomes linear polarized light having a polarization direction being the second direction. The second direction is perpendicular to a direction of the absorption axis of the first linear polarizer 41. Therefore, the linear polarized light can exit without loss when passing through the first linear polarizer 41, thereby ensuring the brightness in the white state of the liquid crystal display panel and increasing the contrast of the liquid crystal display panel.

On basis of this, in a case where the second quarter-wave plate 21 is made of a positive material, $7°≤θ_3≤17°$, and correspondingly, $θ_4$ satisfies $155°≤θ_4≤164°$. In a case where the second quarter-wave plate 21 is made of a negative material, $40°≤θ_3≤50°$. The second quarter-wave plate 21 can cooperate with the second half-wave plate 22 to alleviate light leakage in the black state of the liquid crystal display panel at a large viewing angle and increase the contrast of liquid crystal display panel at a large viewing angle.

Figure 8:
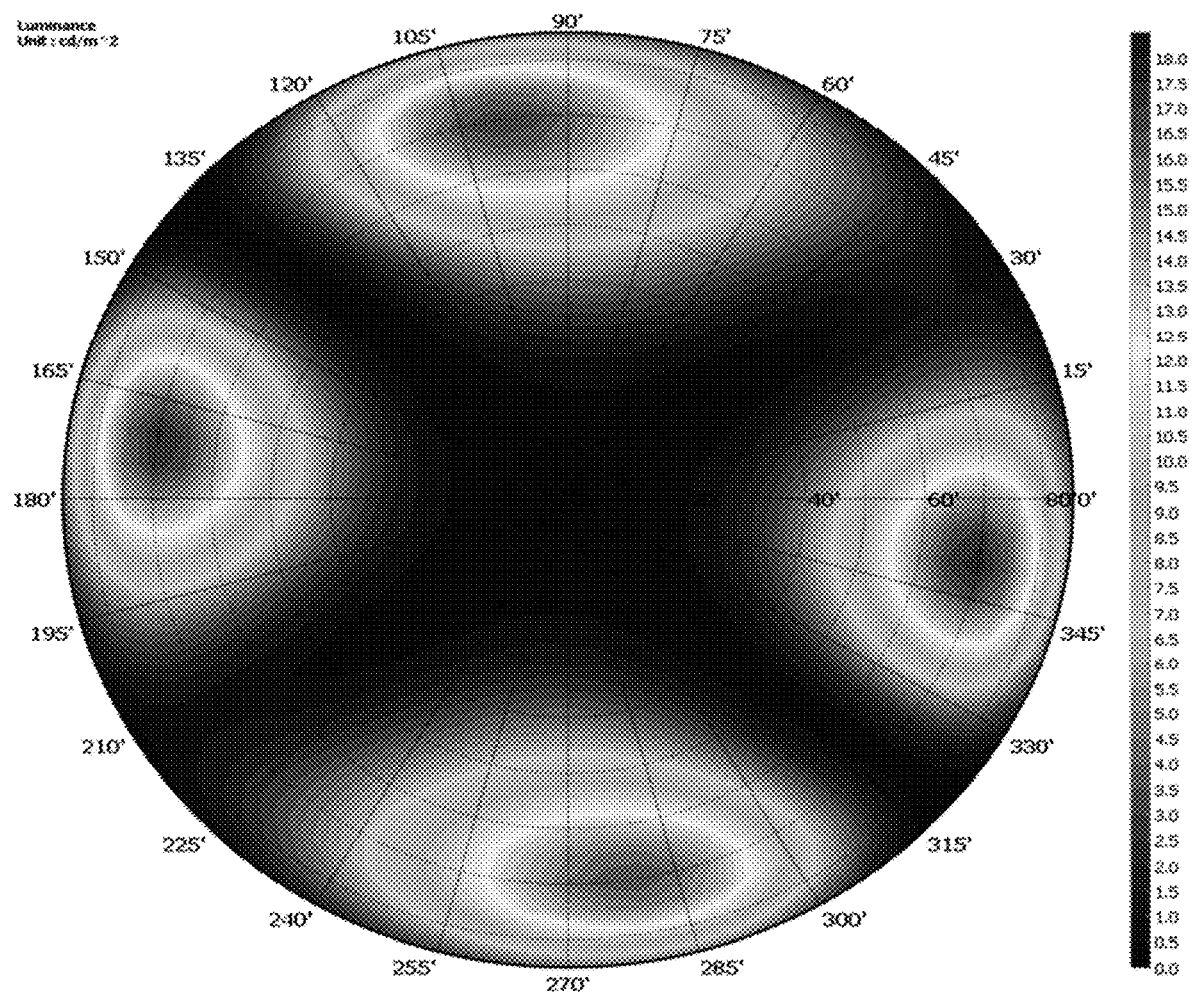
FIG. 8 is a black-state simulation effect diagram of the liquid crystal display panel shown in FIG. 2 at different viewing angles.
Figure 9:
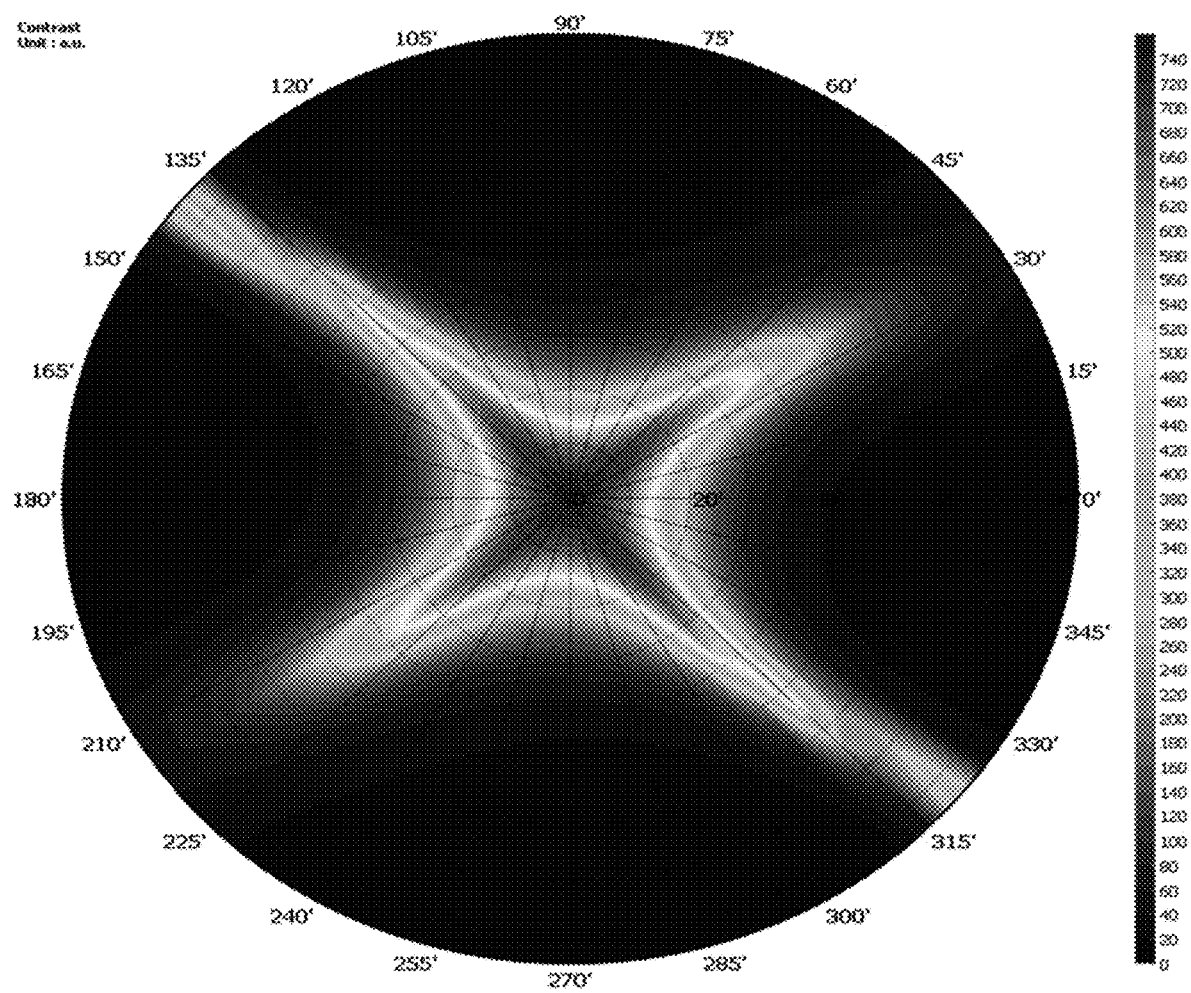
FIG. 9 is a contrast simulation effect diagram of the liquid crystal display panel shown in FIG. 2 at different viewing angles.
Figure 10:
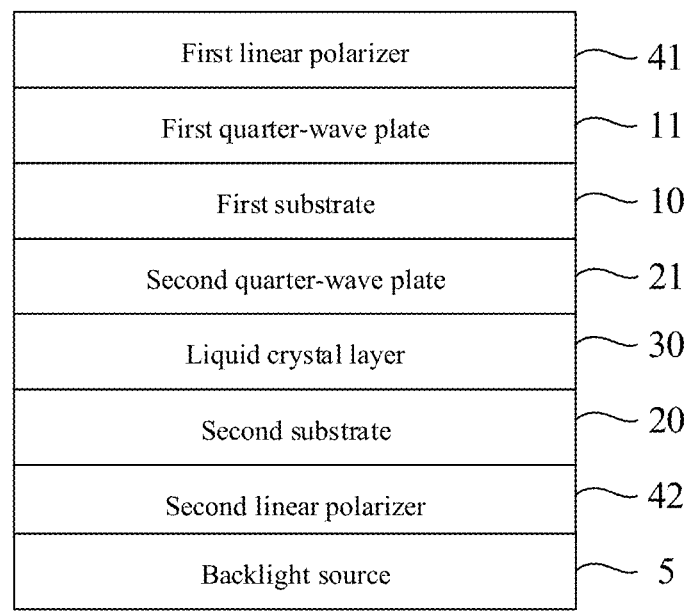
FIG. 10 is a schematic cross-sectional view of a liquid crystal display panel in the related art.
Figure 11:
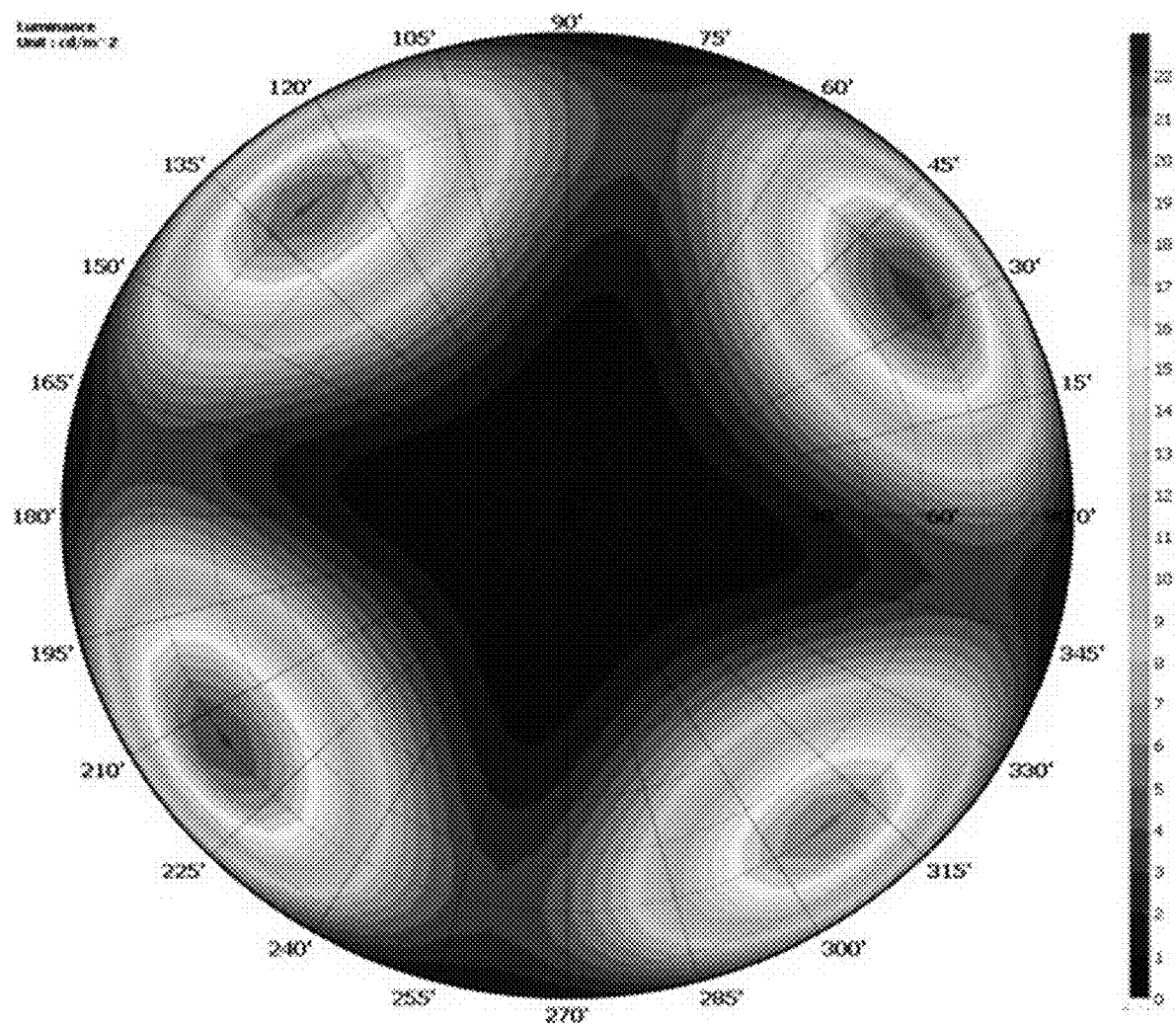
FIG. 11 is a black-state simulation effect diagram of the liquid crystal display panel shown in FIG. 10 at different viewing angles.
Figure 12:
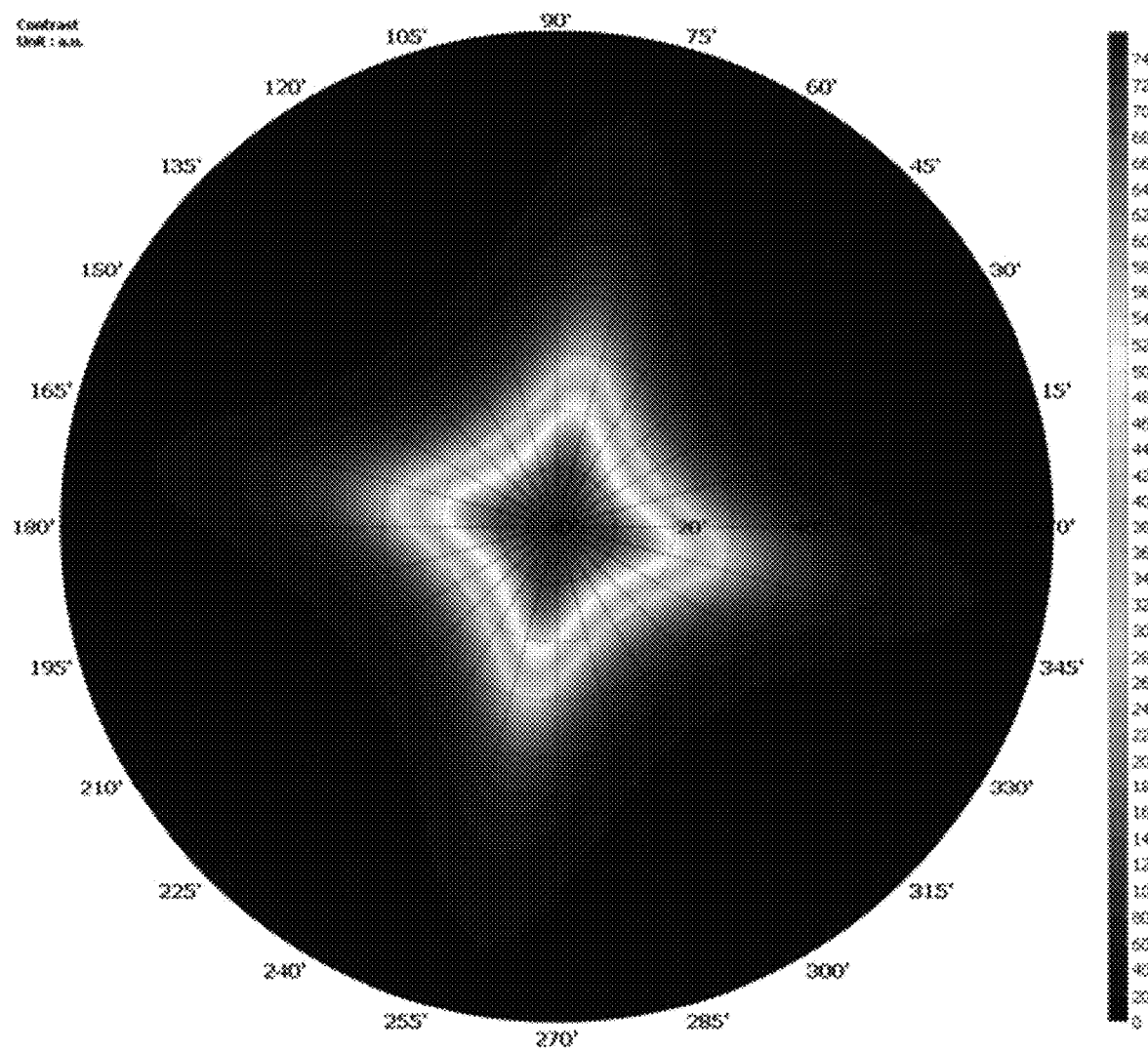
FIG. 12 is a contrast simulation effect diagram of the liquid crystal display panel shown in FIG. 10 at different viewing angles.

FIG. 8 is a black-state simulation effect diagram of the liquid crystal display panel shown in FIG. 2 at different viewing angles. FIG. 9 is a contrast simulation effect diagram of the liquid crystal display panel shown in FIG. 2 at different viewing angles. FIG. 10 is a schematic cross-sectional view of a liquid crystal display panel in the related art. FIG. 11 is a black-state simulation effect diagram of the liquid crystal display panel shown in FIG. 10 at different viewing angles. FIG. 12 is a contrast simulation effect diagram of the liquid crystal display panel shown in FIG. 10 at different viewing angles. With reference to FIG. 8 to FIG. 12, the first quarter-wave plate 11 and the second quarter-wave plate 21 are each made of a positive material, and $θ_2=45°$, $θ_3=12°$ and $θ_4=159°$. The liquid crystal display panel shown in FIG. 10 does not include a half-wave plate, but only includes two quarter-wave plates, and the angles formed between slow axes of the two quarter-wave plates and the first direction are 45° and 135°, respectively. It can be seen that a viewing angle range of strong light (light-colored part) in FIG. 8 is significantly smaller than that in FIG. 11, indicating that light leakage in the black state of the liquid crystal display panel shown in FIG. 2 at a large viewing angle can be significantly alleviated. The viewing angle range where the contrast is large (light-colored area) in FIG. 9 is significantly larger than that in FIG. 12. In addition, comparing FIG. 9 and FIG. 12, it can be seen that at a same large viewing angle such as a viewing angle of (45° and) 135°, the contrast in FIG. 9 is higher than the contrast in FIG. 12. It indicates that the liquid crystal display panel based on the A1-B1-C1 design has an increased contrast at a large viewing angle.

Figure 13:
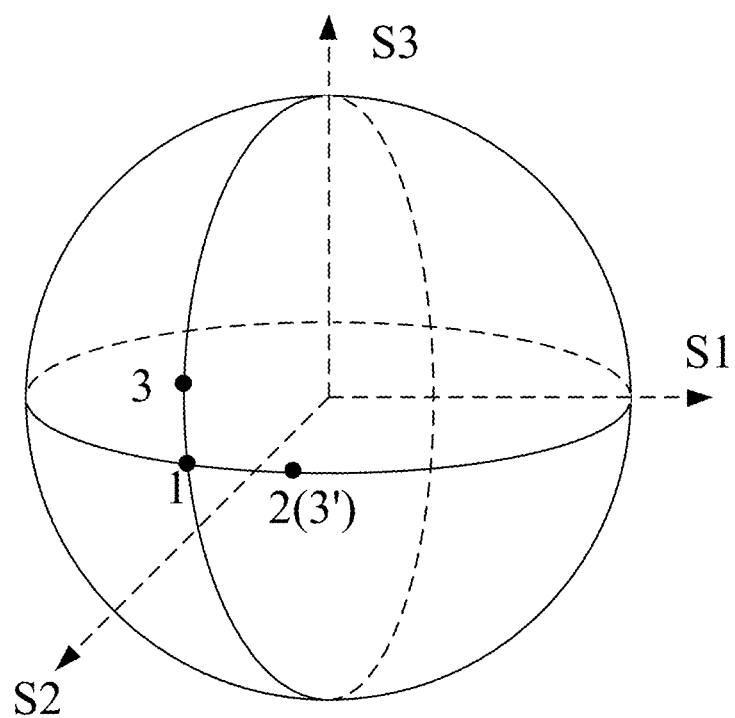
FIG. 13 is a diagram characterized by a Poincare sphere for the liquid crystal display panel shown in FIG. 10 observed at a large viewing angle of (45°, 135°)

It has been found in the research that the poor optical effect of the liquid crystal display panel shown in FIG. 10 at a large viewing angle is caused by viewing angle dependence of the polarizer and the wave plate, i.e., there is a deviation between a direction of an optical axis at a large viewing angle and a direction of an optical axis at a front viewing angle. Therefore, although the absorption axis of the first linear polarizer 41 is perpendicular to the absorption axis of the second linear polarizer 42 at a front viewing angle, directions of the two absorption axes will change at a large viewing angle. FIG. 13 is a diagram characterized by a Poincaré sphere for the liquid crystal display panel shown in FIG. 10 observed at a large viewing angle of (45°, 135°). With reference to FIG. 13, a reference numeral 1 represents a light-through axis of the second linear polarizer 42 at this viewing angle, a reference numeral 2 represents the absorption axis of the first linear polarizer 41 at this viewing angle, and a reference numeral 3 represents a polarization state of the light emitted from the backlight source 5 after passing through the first quarter-wave plate 11. It can be seen that there is a large distance between 3 and 2. It can be known from the previous analysis that when the liquid crystal display panel is in the black state, only in a case where 3 and 2 coincide, light emitted from the first quarter-wave plate 11 can be absorbed by the first linear polarizer 41, thereby avoiding light leakage in the black state.

Compared with FIG. 10, the liquid crystal display panel shown in FIG. 2 additionally includes a second half-wave plate 22. Accordingly, light can experience phase delay twice when passing through the second quarter-wave plate 21 and the second half-wave plate 22. As shown in FIG. 13, a reference numeral 3' represents a polarization state of the light emitted from the backlight source 5 after passing through the first quarter-wave plate 11 in the structure shown in FIG. 2, and the reference numeral 3' coincides with 2. In this way, the emitted light can be absorbed by the first linear polarizer 41, thereby avoiding light leakage in the black state and increasing the contrast at a large viewing angle.

In addition, in this embodiment of the present disclosure, by additionally providing the second half-wave plate 22 and thus superposition of the additionally provided half-wave plate and the quarter-wave plate, color dispersion in the black state can be suppressed to a certain extent, and color shift of the display panel at a large viewing angle can also be suppressed to a certain extent.

Figure 14:
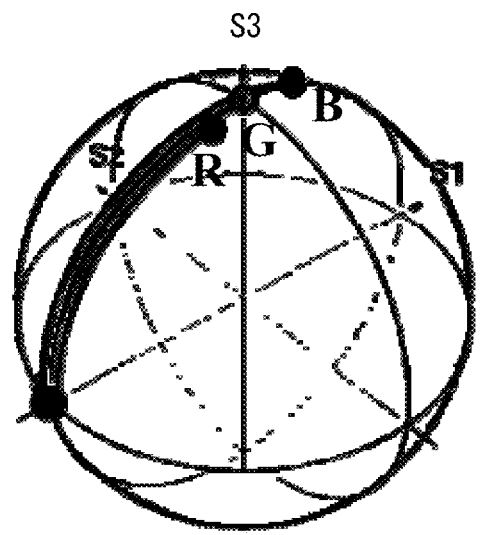
FIG. 14 is a schematic diagram characterized by a Poincaré sphere after white light passes through a single-layer quarter-wave plate.

FIG. 14 is a schematic diagram characterized by a Poincaré sphere after white light passes through a single-layer quarter-wave plate. In an example, as shown in FIG. 14, due to limitation of a material of the wave plate, after the white light passes through the single-layer quarter-wave plate, only green light is transformed into circularly polarized light, and red and blue light are still elliptically polarized light. As a result, color shift occurs.

Figure 15:
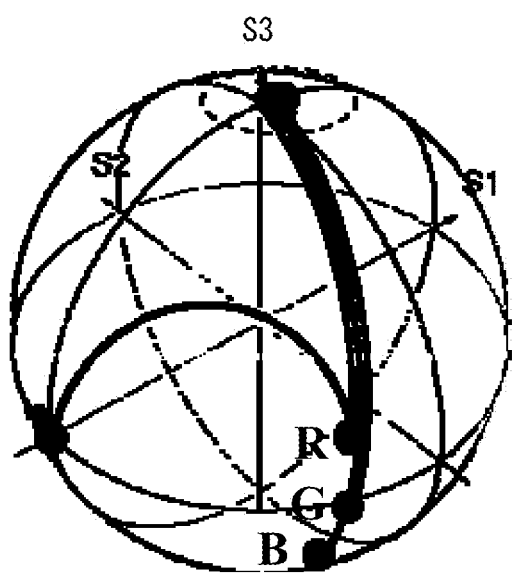
FIG. 15 is a schematic diagram characterized by a Poincaré sphere after white light passes through a second half-wave plate and a second quarter-wave plate.

However, in this embodiment of the present disclosure, a second half-wave plate is additionally provided. FIG. 15 is a schematic diagram characterized by a Poincaré sphere after white light passes through a second half-wave plate and a second quarter-wave plate. As shown in FIG. 15, it can be seen that, in this embodiment of the present disclosure, red, green and blue light passes through the second half-wave plate and the second quarter-wave plate and experiences delay of two rotations. In these two processes, color dispersion of these three colors can be cancelled out, and finally all the red, green and blue light become circularly polarized light, thereby eliminating color shift.

In an example, the liquid crystal display panel based on the A1-B1 design may further adopt a second scheme for setting the rotation direction. The second scheme for setting the rotation direction based on the A1-B1 design represents that ambient light emitted towards the liquid crystal display panel becomes right rotation circularly polarized light after passing through the first linear polarizer 41 and the first phase delay structure 1. The second scheme for setting the rotation direction based on the A1-B1 design is denoted by A1-B1-C2 in the following.

The liquid crystal display panel based on the A1-B1-C2 design can still be illustrated by the structure shown in FIG. 2. Different from the A1-B1-C1 design, in the A1-B1-C2 design, in a case where the first quarter-wave plate 11 is made of a positive material, the angle $θ_2$ formed between the slow axis of the first quarter-wave plate 11 and the first direction can be set as 135°, and in a case where the first quarter-wave plate 11 is made of a negative material, the angle $θ_2$ formed between the slow axis of the first quarter-wave plate 11 and the first direction can be set as 45°. In this way, by providing the first quarter-wave plate 11, the reflected ambient light can be prevented from exiting.

In an example, after entering the liquid crystal display panel and passing through the first linear polarizer 41, ambient light becomes linear polarized light having a polarization direction being the second direction. After linear polarized light having a polarization direction being the second direction passes through the first quarter-wave plate 11, the polarization direction of the light rotates by 90° about the slow axis of the first quarter-wave plate 11.

In a case where the first quarter-wave plate 11 is made of a positive material, the angle $\theta_2$ formed between the slow axis of the first quarter-wave plate 11 and the first direction is 135°, and the slow axis of the first quarter-wave plate 11 is represented by the negative axis OK of S2 in FIG. 4 and FIG. 5. The polarization direction of the light rotates clockwise by 90° about the slow axis of the first quarter-wave plate 11, and this process is represented in FIG. 4 by the point A rotating clockwise by 90° on the sphere surface of the Poincare sphere about OK to the point C located on the positive axis of S3. That is, after passing through the first quarter-wave plate 11, the linear polarized light having a polarization direction being the second direction becomes right rotation circularly polarized light.

The right rotation circularly polarized light becomes left rotation circularly polarized light after being reflected. Considering changing of an observation position, the left rotation circularly polarized light when originally observed at the position a becomes right rotation circularly polarized light when observed at the position b, so it is still denoted by the point C in FIG. 4.

When observed at the position b, the right rotation circularly polarized light is emitted towards the light-exiting side of the liquid crystal display panel. After light passes through the first quarter-wave plate 11, the polarization direction of the light rotates clockwise by 90° about the slow axis of the first quarter-wave plate 11. This process is represented in FIG. 4 by the point C rotating clockwise by 90° on the sphere surface of the Poincare sphere about OK to the point D located on the positive axis of S1. That is, after passing through the first quarter-wave plate 11, the right rotation circularly polarized light becomes linear polarized light having a polarization direction being the first direction. Subsequently, the linear polarized light is absorbed by the first linear polarizer 41 and cannot exit, thereby preventing reflected ambient light from exiting from the liquid crystal display panel.

In a case where the first quarter-wave plate 11 is made of a negative material, the angle $\theta_2$ formed between the slow axis of the first quarter-wave plate 11 and the first direction is 45°, and the slow axis of the first quarter-wave plate 11 is represented by the positive axis OI of S2 in FIG. 4 and FIG. 5. The polarization direction of the light rotates counterclockwise by 90° about the slow axis of the first quarter-wave plate 11, and this process is represented in FIG. 4 by the point A rotating counterclockwise by 90° on the sphere surface of the Poincare sphere about OI to the point C located on the positive axis of S3. That is, after passing through the first quarter-wave plate 11, the linear polarized light having a polarization direction being the second direction becomes right rotation circularly polarized light.

The right rotation circularly polarized light becomes left rotation circularly polarized light after being reflected. The left rotation circularly polarized light when originally observing at the position a becomes right rotation circularly polarized light when observed at the position b, so it is still denoted by the point C on the Poincare sphere shown in FIG. 4.

When being observed at the position b, the right rotation circularly polarized light is emitted towards the light-exiting side of the liquid crystal display panel. After light passes through the first quarter-wave plate 11, the polarization direction of the light rotates counterclockwise by 90° about the slow axis of the first quarter-wave plate 11. This process is represented in FIG. 4 by the point C rotating counterclockwise by 90° on the sphere surface of the Poincare sphere about OI to the point D located on the positive axis of S1. That is, after passing through the first quarter-wave plate 11, the right rotation circularly polarized light becomes linear polarized light having a polarization direction being the first direction. Subsequently, the linear polarized light is absorbed by the first linear polarizer 41 and cannot exit, thereby preventing reflected ambient light from exiting from the liquid crystal display panel.

Based on the structure shown in FIG. 2, in a case where the A1-B1-C2 design is adopted and it is satisfied that $\theta_2=135°$ (the first quarter-wave plate 11 is made of a positive material) or $\theta_2=45°$ (the first quarter-wave plate 11 is made of a negative material), when setting the second quarter-wave plate 21 and the second half-wave plate 22 in the liquid crystal cell, for the second quarter-wave plate 21 made of a positive material, an angle $\theta_3$ formed between the slow axis of the second half-wave plate 22 and the first direction and an angle $\theta_4$ formed between the slow axis of the second quarter-wave plate 21 and the first direction are set to satisfy $\theta_4=2\theta_3+45°$, and for the second quarter-wave plate 21 made of a negative material, the angle $\theta_3$ and the angle $\theta_4$ are set to satisfy $\theta_4=2\theta_3+4135°$. In this way, the contrast of the liquid crystal display panel can be increased.

In an example, when the liquid crystal display panel is in the black state, after passing through the second linear polarizer 42, the light emitted from the backlight source 5 becomes linear polarized light having a polarization direction being the first direction. After linear polarized light passes through liquid crystal layer 30, the polarization direction of the linear polarized light does not change. Then, the linear polarized light having a polarization direction being the first direction, passes through the second half-wave plate 22. It is still assumed that the slow axis of the second half-wave plate 22 is denoted by OE in FIG. 4. The linear polarized light having a polarization direction being the first direction, passes through the second half-wave plate 22, and this process is represented in FIG. 4 by the point D rotating by 180° on the sphere surface of the Poincaré sphere about OE to a point F. That is, after passing through the second half-wave plate 22, the linear polarized light having a polarization direction being the first direction becomes linear polarized light having a polarization direction being the fourth direction.

Then, the linear polarized light having a polarization direction being the fourth direction passes through the second quarter-wave plate 21, and the polarization direction of the light rotates by 90° about the slow axis of the second quarter-wave plate 21.

In a case where the second quarter-wave plate 21 is made of a positive material and $\theta_4=2\theta_3+45°$, $2\theta_4=4\theta_3+90°$. As shown in FIG. 5, $4\theta_3+90°=\angle DOF+90°=\angle DOJ=2\theta_4$. Therefore, OJ is the slow axis of the second quarter-wave plate 21 made of a positive material. The polarization direction of the linear polarized light rotates clockwise by 90° about the slow axis of the second quarter-wave plate 21. This process is represented in FIG. 4 by the point F rotating clockwise by 90° on the sphere surface of the Poincaré sphere about OJ to the point C located on the positive axis of S3.

In a case where the second quarter-wave plate 21 is made of a negative material and $\theta_4=2\theta_3+135°$, $2\theta_4=4\theta_3+270°=4\theta_3+180°+90°$. As shown in FIG. 5, $4\theta_3+180°=\angle DOH$, and $4\theta_3+180°+90°=\angle DOH+90°=\angle DOG$ (obtuse angle)=$2\theta_4$. Therefore, OG is the slow axis of the second quarter-wave plate 21 made of a negative material. The polarization direction of the linear polarized light rotates counterclockwise by 90° about the slow axis of the second quarter-wave plate 21. This process is represented in FIG. 4 by the point F rotating counterclockwise by 90° on the sphere surface of the Poincare sphere about OG to the point C located on the positive axis of S3.

After passing through the second quarter-wave plate 21, the linear polarized light having a polarization direction being the fourth direction becomes right rotation circularly polarized light. Then, the right rotation circularly polarized light is further emitted towards the light-exiting side of the liquid crystal display panel and passes through the first quarter-wave plate 11 to become linear polarized light having a polarization direction being the first direction. This process is the same as an emission process of the above-mentioned ambient light after being reflected by the liquid crystal display panel based on the A1-B1-C2 design, and will not be repeated herein. Subsequently, the linear polarized light is absorbed by the first linear polarizer 41 and cannot exit, thereby avoiding light leakage in a black state.

When the liquid crystal display panel is in a white state, after passing through the liquid crystal layer 30, the polarization direction of the linear polarized light changes from the first direction to the second direction. Then, the linear polarized light having the polarization direction being the second direction passes through the second half-wave plate 22. The slow axis of the second half-wave plate 22 is denoted by OE in FIG. 4 and FIG. 5. The linear polarized light having the polarization direction being the second direction passes through the second half-wave plate 22, and this process is represented in FIG. 4 by the point A rotating by 180° on the sphere surface of the Poincaré sphere about OE to the point H. That is, after passing through the second half-wave plate 22, the linear polarized light having the polarization direction being the second direction becomes the linear polarized light having a polarization direction being the fifth direction. Then, the linear polarized light having a polarization direction being the fifth direction passes through the second quarter-wave plate 21, and the polarization direction of the light rotates by 90° on the sphere surface of the Poincare sphere about the slow axis of the second quarter-wave plate 21.

In a case where the second quarter-wave plate 21 is made of a positive material, as mentioned above, the slow axis of the second quarter-wave plate 21 made of a positive material is denoted by OJ in FIG. 4 and FIG. 5, and H rotates clockwise by 90° on the sphere surface of the Poincare sphere about OJ to the point B.

In a case where the second quarter-wave plate 21 is made of a negative material, as mentioned earlier, the slow axis of the second quarter-wave plate 21 made of a negative material is represented by OG in FIG. 4 and FIG. 5, and the point H rotates counterclockwise by 90° on the sphere surface of the Poincare sphere about OG to the point B.

After passing through the second quarter-wave plate 21, the linear polarized light having a polarization direction being the fifth direction becomes left rotation circularly polarized light. Then, the left rotation circularly polarized light is further emitted towards the light-exiting side of the liquid crystal display panel and passes through the first quarter-wave plate 11, and the polarization direction of the light rotates by 90° about the slow axis of the first quarter-wave plate 11.

In a case where the first quarter-wave plate 11 is made of a positive material, the angle $\theta_2$ formed between the slow axis of the first quarter-wave plate 11 and the first direction is 135°. The polarization direction of the left rotation circularly polarized light rotates clockwise by 90° about the slow axis of the first quarter-wave plate 11, and this process is represented in FIG. 4 by the point B rotating clockwise by 90° on the sphere surface of the Poincaré sphere to the point A.

In a case where the first quarter-wave plate 11 is made of a negative material, the angle $\theta_2$ formed between the slow axis of the first quarter-wave plate 11 and the first direction is 45°. The polarization direction of the left rotation circularly polarized light rotates counterclockwise by 90° about the slow axis of the first quarter-wave plate 11, and this process is represented in FIG. 4 by the point B rotating counterclockwise by 90° on the sphere surface of the Poincaré sphere about OI to the point A.

After passing through the first quarter-wave plate 11, the left rotation circularly polarized light becomes linear polarized light having a polarization direction being the second direction. The linear polarized light can exit without any loss when passing through the first linear polarizer 41, thereby ensuring the brightness in the white state of the liquid crystal display panel and increasing the contrast of the liquid crystal display panel.

Figure 16:
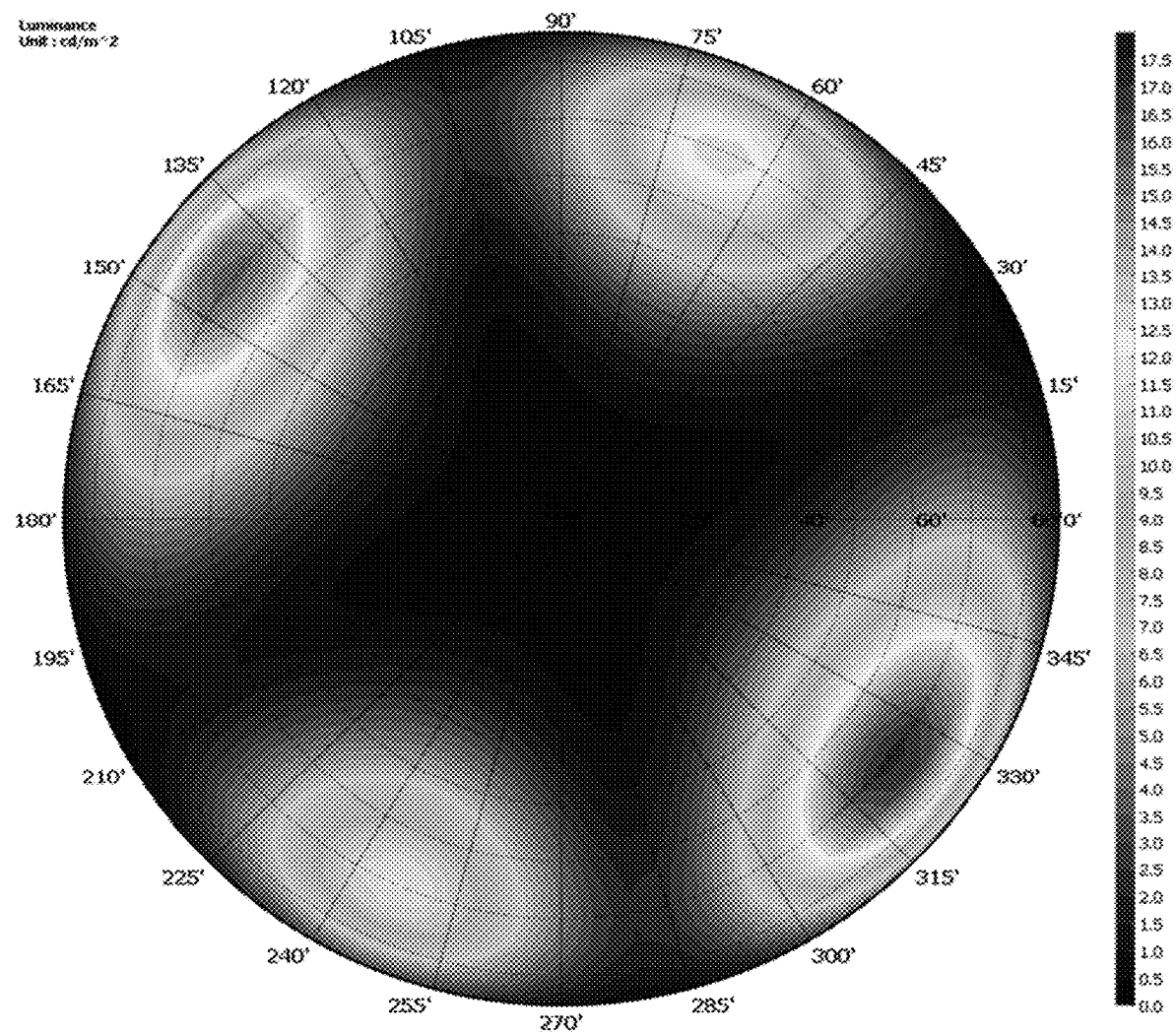
FIG. 16 is another black-state simulation effect diagram of the liquid crystal display panel shown in FIG. 2 at different viewing angles.
Figure 17:
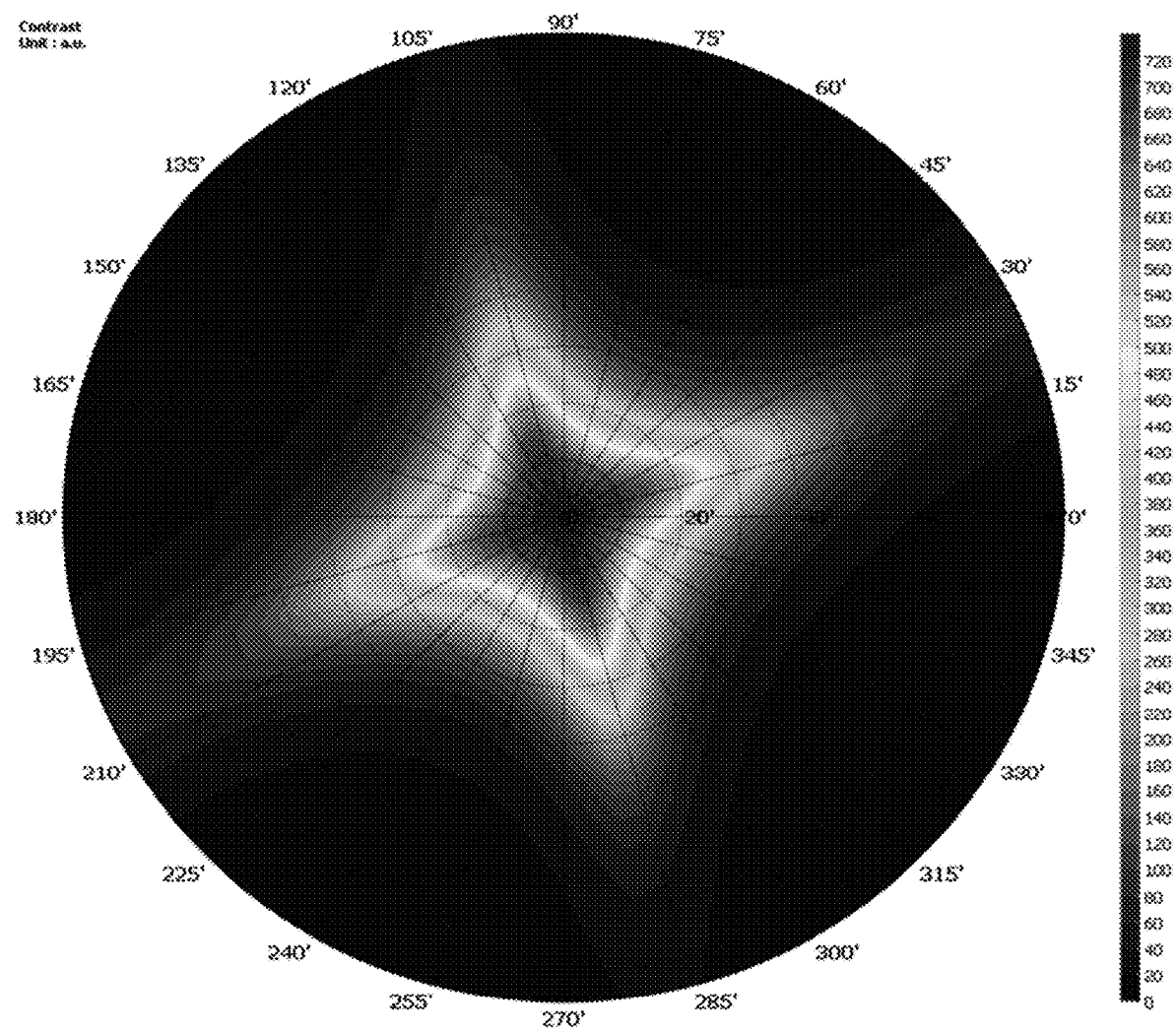
FIG. 17 is another contrast simulation effect diagram of the liquid crystal display panel shown in FIG. 2 at different viewing angles.

On this basis, in a case where the second quarter-wave plate 21 is made of a positive material, it is satisfied that $340° \leq \theta_3 \leq 350°$ in this embodiment of the present disclosure. In a case where the second quarter-wave plate 21 is made of a negative material, it satisfies the relationship $45° \leq \theta_3 \leq 55°$ in this embodiment of the present disclosure. The second quarter-wave plate 21 can cooperate with the second half-wave plate 22 to alleviate light leakage in the black state of the liquid crystal display panel at a large viewing angle and increase the contrast of the liquid crystal display panel at a large viewing angle. FIG. 16 is another black-state simulation effect diagram of the liquid crystal display panel shown in FIG. 2 at different viewing angles. FIG. 17 is another contrast simulation effect diagram of the liquid crystal display panel shown in FIG. 2 at different viewing angles. As shown in FIG. 16 and FIG. 17, the first quarter-wave plate 11 is made of a positive material, the second quarter-wave plate 21 is made of a negative material, $\theta_2=135°$, $\theta_3=50°$, and $\theta_4=235°$. It can be seen that a viewing angle range of the strong light (light-colored part) in FIG. 16 is smaller than that in FIG. 11. A viewing angle range where the contrast is large in FIG. 17 is significantly larger than that in FIG. 12. Moreover, comparing FIG. 17 with FIG. 12, it can be seen that at the same large viewing angle such as a viewing angle of (45° and 135°), the contrast in FIG. 17 is higher than the contrast in FIG. 12. This shows that the liquid crystal display panel based on the A1-B1-C2 design has an increased contrast at a large viewing angle.

In an embodiment, the liquid crystal display panel based on the A1 design may further adopt a second scheme for setting positions of wave plates, and a second scheme for setting the number of wave plates based on the A1 design represents that the second quarter-wave plate 21 is located between the second half-wave plate 22 and the second linear polarizer 42. The second scheme for setting positions of wave plates based on the A1 design is denoted by A1-B2 in the following.

In an embodiment, the liquid crystal display panel based on the A1-B2 design may further adopt a first scheme for setting a rotation direction. The first scheme for setting rotation direction based on the A1-B2 design represents that ambient light emitted towards the liquid crystal display panel becomes left rotation circularly polarized light after passing through the first linear polarizer 41 and the first phase delay structure 1. The first scheme for setting the rotation direction based on the A1-B2 design is denoted by A1-B2-C1 in the following.

Figure 18:
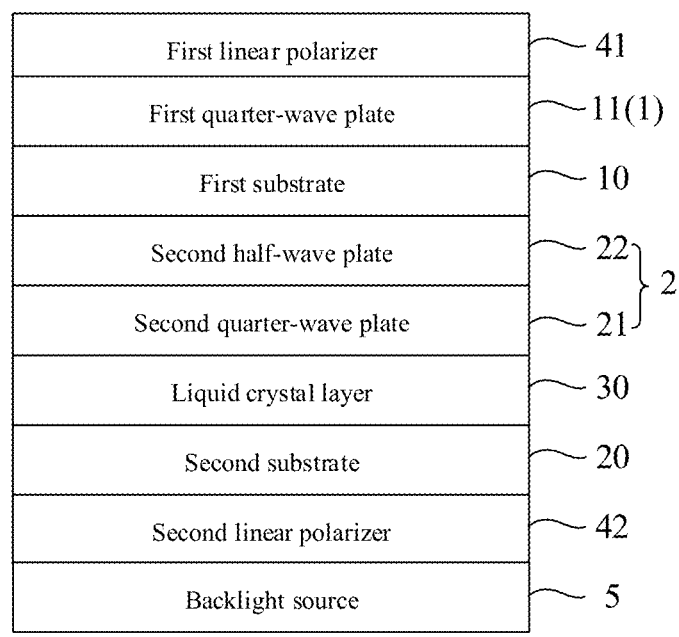
FIG. 18 is a schematic cross-sectional view of another liquid crystal display panel according to an embodiment of the present disclosure.

FIG. 18 is a schematic cross-sectional view of another liquid crystal display panel according to an embodiment of the present disclosure. In an example, as shown in FIG. 18, the liquid crystal display panel adopts the above-mentioned A1-B2-C1 design. That is, the second half-wave plate 22 is disposed in the liquid crystal cell of the liquid crystal display panel, and there is no first half-wave plate 12 disposed outside the liquid crystal cell. In addition, relative positions of the second half-wave plate 22 and the second quarter-wave plate 21 change compared to the structure shown in FIG. 2. In this embodiment, the second quarter-wave plate 21 is located between the second linear polarizer 42 and the second half-wave plate 22. After passing through the first linear polarizer 41 and the first quarter-wave plate 11, ambient light emitted towards the liquid crystal display panel becomes left rotation circularly polarized light.

In an example, the liquid crystal display panel adopts the A1-B2-C1 design based on the structure shown in FIG. 18. In a case where the first quarter-wave plate 11 is made of a positive material, the angle $\theta_2$ formed between the slow axis of the first quarter-wave plate 11 and the first direction can still be set as 45° in this embodiment of the present disclosure. In a case where the first quarter-wave plate 11 is made of a negative material, the angle $\theta_2$ formed between the slow axis of the first quarter-wave plate 11 and the first direction can still be set as 135°. This can prevent the reflected ambient light from exiting from the liquid crystal display panel. A principle of preventing the reflected ambient light from exiting from the liquid crystal display panel is the same as that of the above-mentioned A1-B1-C1 design, and will not be repeated herein.

Based on the structure shown in FIG. 18, in a case where the A1-B2-C1 design is adopted and it is satisfied that $\theta_2=45°$ (the first quarter-wave plate 11 is made of a positive material) or $\theta_2=135°$ (the first quarter-wave plate 11 is made of a negative material), when setting the second quarter-wave plate 21 and the second half-wave plate 22 in the liquid crystal cell, for the second quarter-wave plate 21 made of a positive material, the angle $\theta_4$ formed between the slow axis of the second quarter-wave plate 21 and the first direction is set to satisfy $\theta_4=45°$, and for the second quarter-wave plate 21 made of a negative material, the $\theta_4$ is set to satisfy $\theta_4=135°$. In this way, the contrast of the liquid crystal display panel can be increased.

In this case, the material of the second half-wave plate 22 can be freely selected. For example, the material of the second half-wave plate 22 may be a positive material or a negative material. Moreover, the angle $\theta_3$ formed between the slow axis of the second half-wave plate 22 and the first direction can also be freely selected, and is not limited by this embodiment of the present disclosure.

In an example, when the liquid crystal display panel is in a black state, after passing through the second linear polarizer 42, the light emitted from the backlight source 5 becomes linear polarized light having a polarization direction being the first direction. The polarization direction of the linear polarized light does not change after the linear polarized light passes through the liquid crystal layer 30. Then, the linear polarized light having the polarization direction being the first direction passes through the second quarter-wave plate 21, and the polarization direction of the light rotates by 90° about the slow axis of the second quarter-wave plate 21.

In a case where the second quarter-wave plate 21 is made of a positive material and it is satisfied that $\theta_4=45°$, the slow axis of the second quarter-wave plate 21 is denoted by OI in FIG. 4 and FIG. 5. The polarization direction of the light rotates clockwise by 90° about the slow axis of the second quarter-wave plate 21, and this process is represented in FIG. 4 by the point D rotating clockwise by 90° on the sphere surface of the Poincaré sphere about OI to the point C.

In a case where the second quarter-wave plate 21 is made of a negative material and it is satisfied that $\theta_4=135°$, the slow axis of the second quarter-wave plate 21 is denoted by OK in FIG. 4 and FIG. 5. The polarization direction of the light rotates clockwise by 90° about the slow axis of the second quarter-wave plate 21, and this process is represented in FIG. 4 by the point D rotating counterclockwise by 90° on the sphere surface of the Poincaré sphere about OK to the point C.

That is, after passing through the second quarter-wave plate 21, the linear polarized light having a polarization direction being the first direction becomes right rotation circularly polarized light. Then, the right rotation circularly polarized light is further emitted towards the light-exiting side of the liquid crystal display panel and passes through the second half-wave plate 22 to become left rotation circularly polarized light.

Then, the left rotation circularly polarized light is further emitted towards the light-exiting side of the liquid crystal display panel and passes through the first quarter-wave plate 11 to become linear polarized light having a polarization direction being the first direction. This process is the same as that based on the above-mentioned A1-B1-C1 design and will not be repeated herein. Subsequently, the linear polarized light will be absorbed by the first linear polarizer 41 and cannot exit, thereby avoiding light leakage in the black state.

When the liquid crystal display panel is in a white state, after passing through the liquid crystal layer 30, the polarization direction of the linear polarized light changes from the first direction to the second direction. Then, the linear polarized light having the polarization direction being the second direction passes through the second quarter-wave plate 21, and the polarization direction of the light rotates by 90° about the slow axis of the second quarter-wave plate 21.

In a case where the second quarter-wave plate 21 is made of a positive material and it is satisfied that $\theta_4=45°$, the slow axis of the second quarter-wave plate 21 is denoted by OI in FIG. 4 and FIG. 5. The polarization direction of the light rotates clockwise by 90° about the slow axis of the second quarter-wave plate 21, and this process is represented in FIG. 4 by the point A rotating clockwise by 90° on the sphere surface of the Poincare sphere about OI to the point B.

In a case where the second quarter-wave plate 21 is made of a negative material and it is satisfied that $\theta_4=135°$, the slow axis of the second quarter-wave plate 21 is denoted by OK in FIG. 4 and FIG. 5. The polarization direction of the light rotating counterclockwise by 90° about the slow axis of the second quarter-wave plate 21 is represented in FIG. 4 by the point A rotating counterclockwise by 90° on the sphere surface of the Poincare sphere about OK to the point B.

That is, after passing through the second quarter-wave plate 21, the linear polarized light having a polarization direction being the second direction becomes left rotation circularly polarized light. Then, the left rotation circularly polarized light is further emitted towards the light-exiting side of the liquid crystal display panel and passes through the second half-wave plate 22 to become right rotation circularly polarized light.

Then, the right rotation circularly polarized light is further emitted towards the light-exiting side of the liquid crystal display panel and passes through the first quarter-wave plate 11 to become linear polarized light having a polarization direction being the second direction. This process is the same as that based on the above-mentioned A1-B1-C1 design and will not be repeated herein. Subsequently, the linear polarized light can exit without any loss when passing through the first linear polarizer 41, thereby ensuring the brightness in the white state of the liquid crystal display panel.

Figure 19:
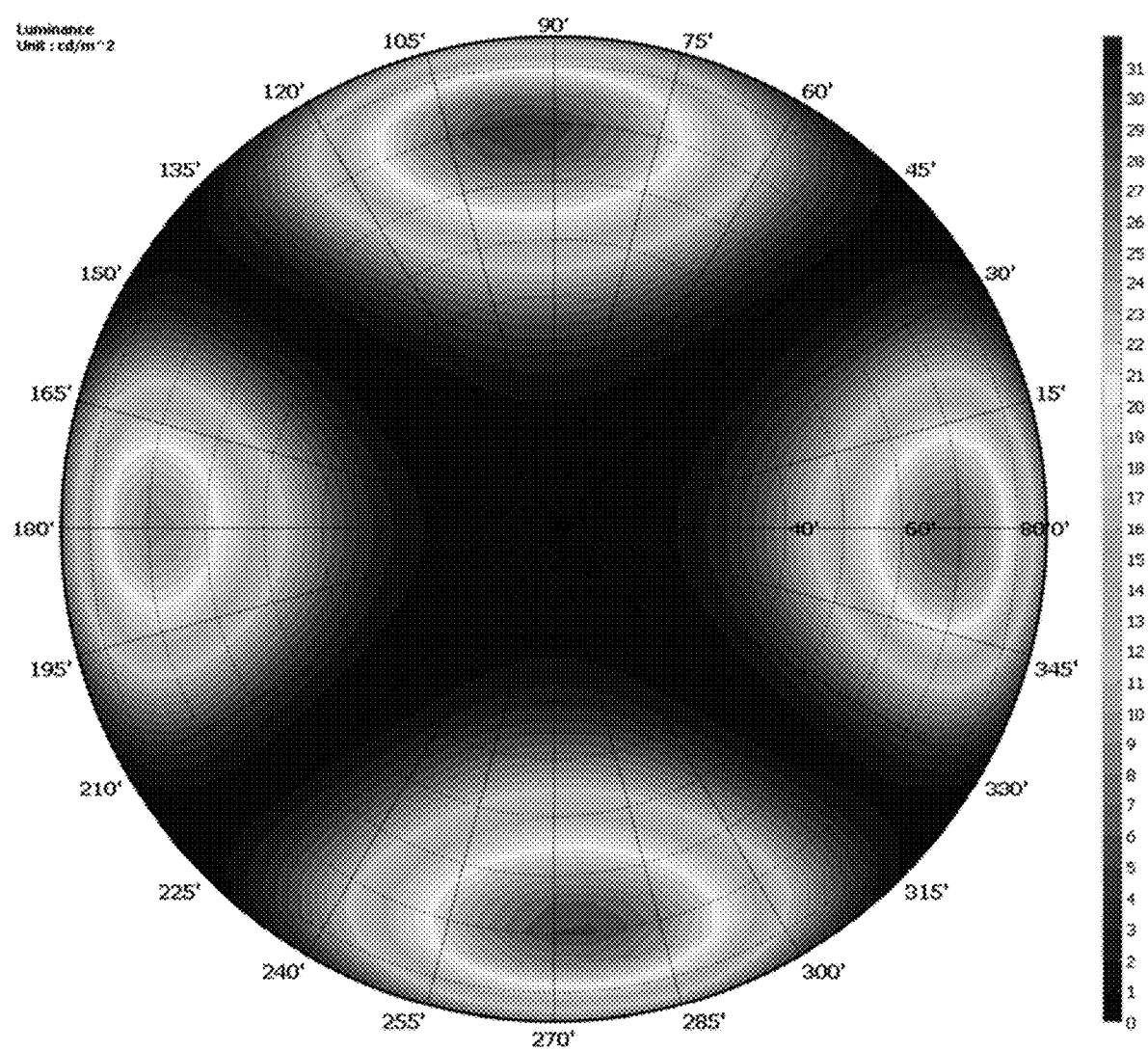
FIG. 19 is a black-state simulation effect diagram of the liquid crystal display panel shown in FIG. 18 at different viewing angles.
Figure 20:
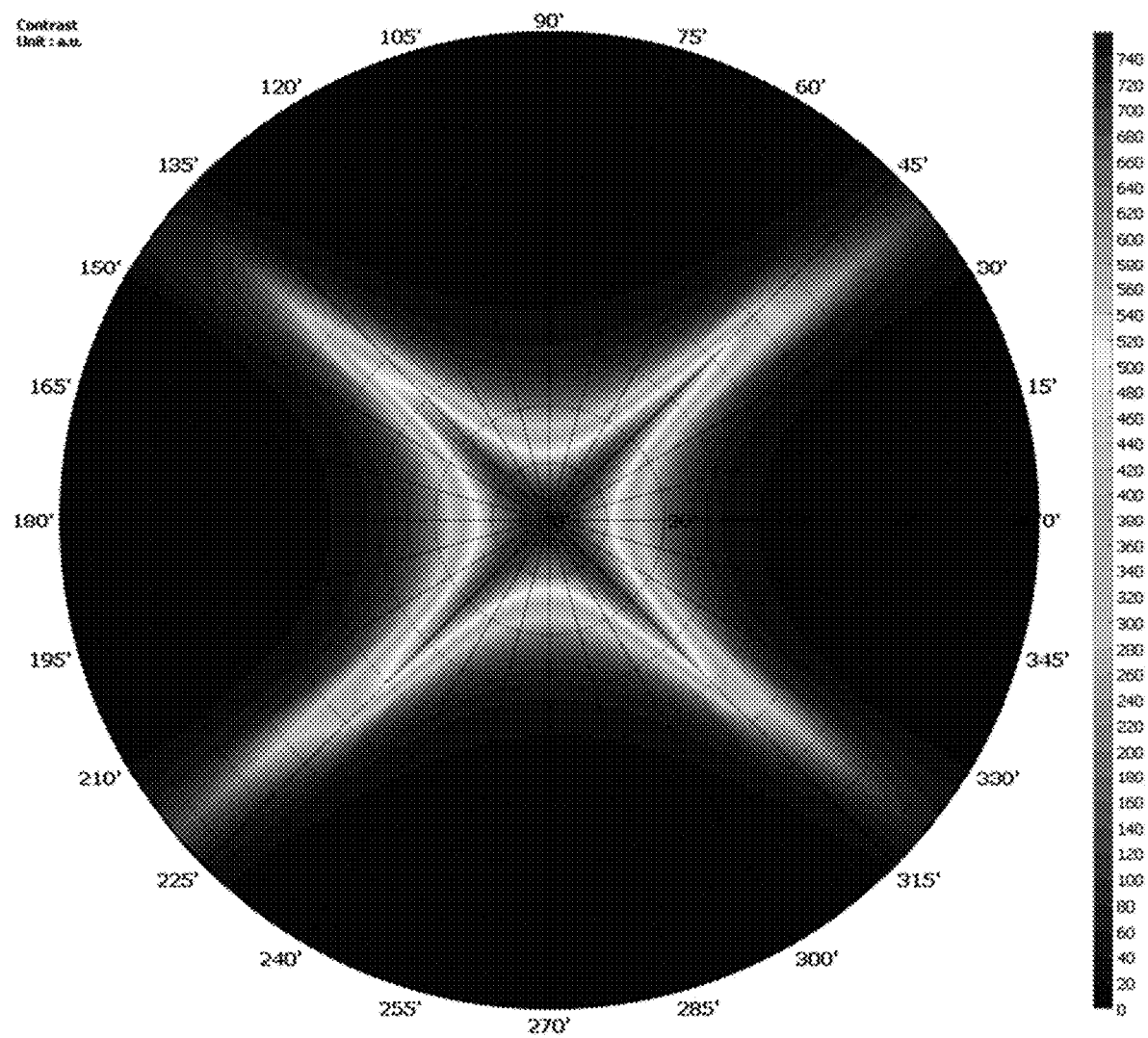
FIG. 20 is a contrast simulation effect diagram of the liquid crystal display panel shown in FIG. 18 at different viewing angles.
Figure 21:
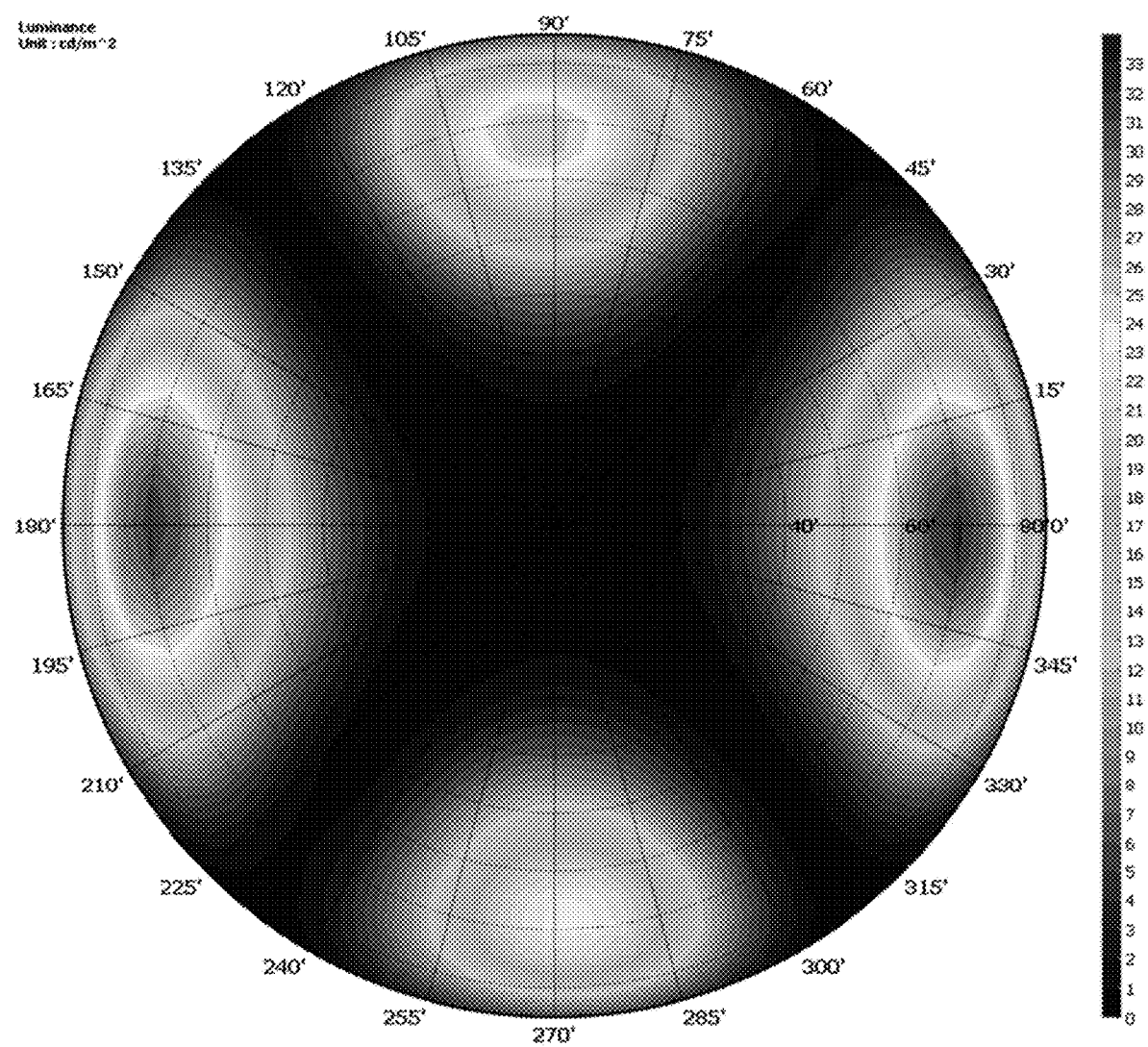
FIG. 21 is another black-state simulation effect diagram of the liquid crystal display panel shown in FIG. 18 at different viewing angles.
Figure 22:
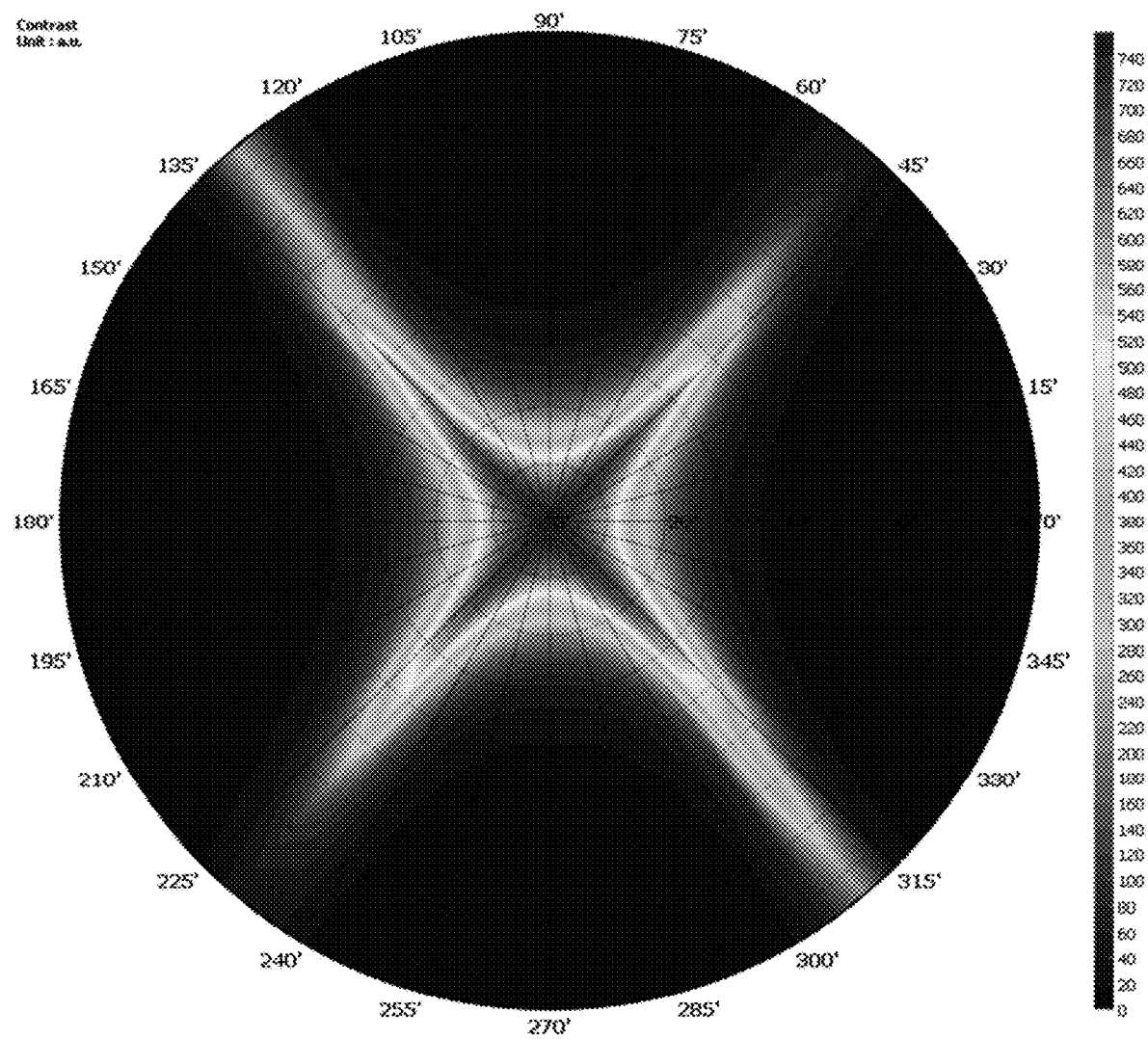
FIG. 22 is another contrast simulation effect diagram of the liquid crystal display panel shown in FIG. 18 at different viewing angles.

FIG. 19 is a black-state simulation effect diagram of the liquid crystal display panel shown in FIG. 18 at different viewing angles, and FIG. 20 is a contrast simulation effect diagram of the liquid crystal display panel shown in FIG. 18 at different viewing angles. As shown in FIG. 18, FIG. 19 and FIG. 20, the first quarter-wave plate 11 and the second quarter-wave plate 21 in the liquid crystal display panel shown in FIG. 18 each are made of a positive material, $\theta_2=45°$, $\theta_3=0°$, and $\theta_4=45°$. FIG. 21 is another black-state simulation effect diagram of the liquid crystal display panel shown in FIG. 18 at different viewing angles, and FIG. 22 is another contrast simulation effect diagram of the liquid crystal display panel shown in FIG. 18 at different viewing angles. As shown in FIG. 18, FIG. 19 and FIG. 20, the first quarter-wave plate 11 and the second quarter-wave plate 21 in the liquid crystal display panel shown in FIG. 18 each are made of a positive material, $\theta_2=45°$, $\theta_3=90°$, and $\theta_4=45°$. Comparing with FIG. 11 and FIG. 12, it can be seen that a viewing angle range of strong light (light-colored part) in each of FIG. 19 and FIG. 21 is significantly smaller than that in FIG. 11, indicating that light leakage in the black state of the liquid crystal display panel shown in FIG. 18 at a large viewing angle can be significantly alleviated. A viewing angle range having a large contrast in each of FIG. 20 and FIG. 22 is significantly larger than that in FIG. 12. This shows that the liquid crystal display panel based on the A1-B2-C1 design has an increased contrast at a large viewing angle.

In an example, the liquid crystal display panel based on the A1-B2 design may further adopt a second scheme for setting the rotation direction. The second scheme for setting the rotation direction based on the A1-B2 design represents that ambient light emitted towards the liquid crystal display panel becomes right rotation circularly polarized light after passing through the first linear polarizer 41 and the first phase delay structure 1. The second scheme for setting the rotation direction based on the A1-B2 design is denoted by A1-B2-C2 in the following.

The liquid crystal display panel based on the A1-B2-C2 design can still be represented by the structure shown in FIG. 18. Different from the A1-B2-C1 design, in the A1-B2-C2 design, in a case where the first quarter-wave plate 11 is made of a positive material, the angle $\theta_2$ formed between the slow axis of the first quarter-wave plate 11 and the first direction can be set as 135° in this embodiment of the present disclosure, and in a case where the first quarter-wave plate 11 is made of a negative material, the angle $\theta_2$ formed between the slow axis of the first quarter-wave plate 11 and the first direction can be set as 45° in this embodiment of the present disclosure. In this way, by providing the first quarter-wave plate 11, the reflected ambient light can be prevented from exiting. In an example, a principle of preventing the reflected ambient light from exiting from the liquid crystal display panel is the same as that based on the above-mentioned A1-B1-C2 design, and will not be repeated herein.

Based on the structure shown in FIG. 18, when the A1-B2-C2 design is adopted, and it is satisfied that $\theta_2=135°$ (in a case where the first quarter-wave plate 11 is made of a positive material) or $\theta_2=45°$ (in a case where the first quarter-wave plate 11 is made of a negative material), when setting the second quarter-wave plate 21 and the second half-wave plate 22 in the liquid crystal cell, in a case where the second quarter-wave plate 21 is made of a positive material, the angle $\theta_4$ formed between the slow axis of the second quarter-wave plate 21 and the first direction can satisfy $\theta_4=135°$, and in a case where the second quarter-wave plate 21 is made of a negative material, the angle $\theta_4$ formed between the slow axis of the second quarter-wave plate 21 and the first direction is set to satisfy $\theta_4=45°$. In this way, the contrast of the liquid crystal display panel can be increased.

In this case, the material of the second half-wave plate 22 can be freely selected. For example, the material of the second half-wave plate 22 may be a positive material or a negative material. Moreover, the angle $\theta_3$ formed between the slow axis of the second half-wave plate 22 and the first direction can also be freely selected, and is not limited by this embodiment of the present disclosure.

In an example, when the liquid crystal display panel is in a black state, after passing through the second linear polarizer 42, the light emitted from the backlight source 5 becomes linear polarized light having a polarization direction being the first direction. The polarization direction of the linear polarized light does not change after the linear polarized light passes through the liquid crystal layer 30. Then, the linear polarized light having the polarization direction being the first direction passes through the second quarter-wave plate 21.

In a case where the second quarter-wave plate 21 is made of a positive material and it is satisfied that $\theta_4=135°$, the linear polarized light having a polarization direction being the first direction passes through the second quarter-wave plate 21, and this process is represented in FIG. 4 by the point D rotating clockwise by 90° on the sphere surface of the Poincaré sphere about OK to the point B.

In a case where the second quarter-wave plate 21 is made of a negative material and it is satisfied that $\theta_4=45°$, the linear polarized light having a polarization direction being the first direction passes through the second quarter-wave plate 21, and this process is represented in FIG. 4 by the point D rotating counterclockwise by 90° on the sphere surface of the Poincaré sphere about OI to the point B.

That is, after passing through the second quarter-wave plate 21, the linear polarized light having a polarization direction being the first direction becomes left rotation circularly polarized light. Then, the left rotation circularly polarized light passes through the second half-wave plate 22, and the polarization direction of the light rotates by 180° about the slow axis of the second half-wave plate 22 to become right rotation circularly polarized light.

Then, the right rotation circularly polarized light is further emitted towards the light-exiting side of the liquid crystal display panel and passes through the first quarter-wave plate 11. The angle $\theta_2$ formed between the slow axis of the first quarter-wave plate 11 and the first direction is 135°, and the right rotation circularly polarized light becomes linear polarized light having a polarization direction being the first direction. This process is the same as that in the above-mentioned A1-B1-C2 design, and will not be repeated herein. Subsequently, the linear polarized light will be absorbed by the first linear polarizer 41 and cannot exit, thereby avoiding light leakage in the black state.

When the liquid crystal display panel is in a white state, after the linear polarized light passes through the liquid crystal layer 30, the polarization direction of the linear polarized light changes from the first direction to the second direction. Then, the linear polarized light having the polarization direction being the second direction passes through the second quarter-wave plate 21.

In a case where the second quarter-wave plate 21 is made of a positive material and it is satisfied that $\theta_4=135°$, the linear polarized light having the polarization direction being the second direction passes through the second quarter-wave plate 21, and this process is represented in FIG. 4 by the point A rotating clockwise by 90° on the sphere surface of the Poincaré sphere about OK to the point C.

In a case where the second quarter-wave plate 21 is made of a negative material and it is satisfied that $\theta_4=45°$, the linear polarized light having the polarization direction being the second direction passes through the second quarter-wave plate 21, and this process is represented in FIG. 4 by the point A rotating counterclockwise by 90° on the sphere surface of the Poincaré sphere about OI to the point C.

That is, after passing through the second quarter-wave plate 21, the linear polarized light having the polarization direction being the second direction becomes right rotation circularly polarized light. Then, the right rotation circularly polarized light passes through the second half-wave plate 22, and the polarization direction rotates by 180° about the slow axis of the second half-wave plate 22. This process is represented in FIG. 4 by the point C rotating by 180° on the sphere surface of the Poincaré sphere to the point B, that is, the light becomes left rotation circularly polarized light.

Then, the left rotation circularly polarized light is further emitted towards the light-exiting side of the liquid crystal display panel and passes through the first quarter-wave plate 11. The angle $\theta_2$ formed between the slow axis of the first quarter-wave plate 11 and the first direction is 135°, and the left rotation circularly polarized light becomes linear polarized light having a polarization direction being the second direction. This process is the same as that based on the above-mentioned A1-B1-C2 design, and will not be repeated herein. Then, the linear polarized light can exit without any loss when passing through the first linear polarizer 41, thereby ensuring the brightness in the white state of the liquid crystal display panel.

On this basis, in a case where the second quarter-wave plate is made of a negative material, the angle $\theta_3$ formed between the slow axis of the second half-wave plate and the first direction can satisfy $45°\le\theta_3\le55°$ in this embodiment of the present disclosure. In a case where the second quarter-wave plate is made of a positive material, the angle $\theta_3$ formed between the slow axis of the second half-wave plate and the first direction can be set as 0° or 90° in this embodiment of the present disclosure. This can increase the contrast of the liquid crystal display panel at a large viewing angle.

Figure 23:
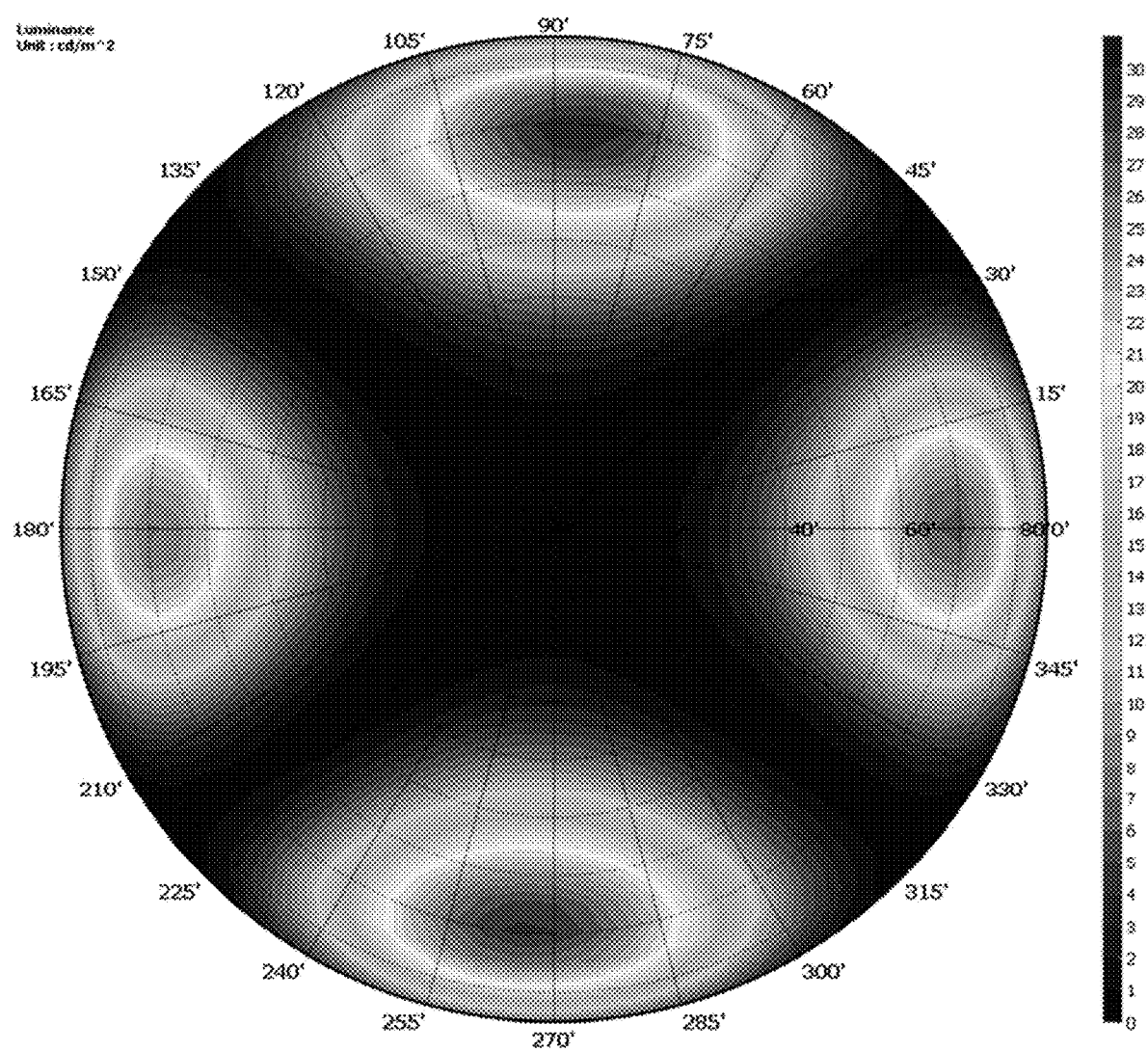
FIG. 23 is still another black-state simulation effect diagram of the liquid crystal display panel shown in FIG. 18 at different viewing angles.
Figure 24:
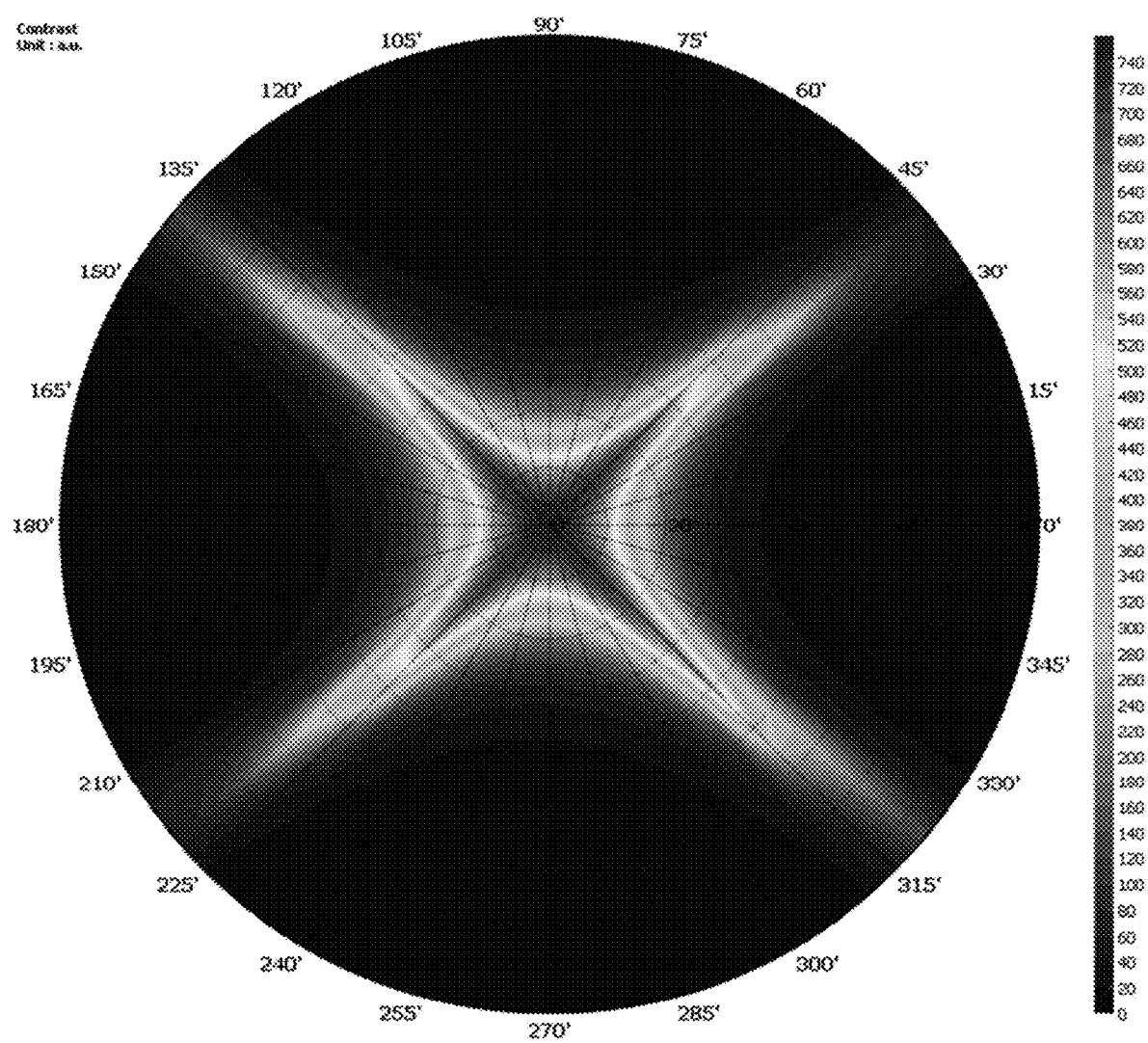
FIG. 24 is still another contrast simulation effect diagram of the liquid crystal display panel shown in FIG. 18 at different viewing angles.
Figure 25:
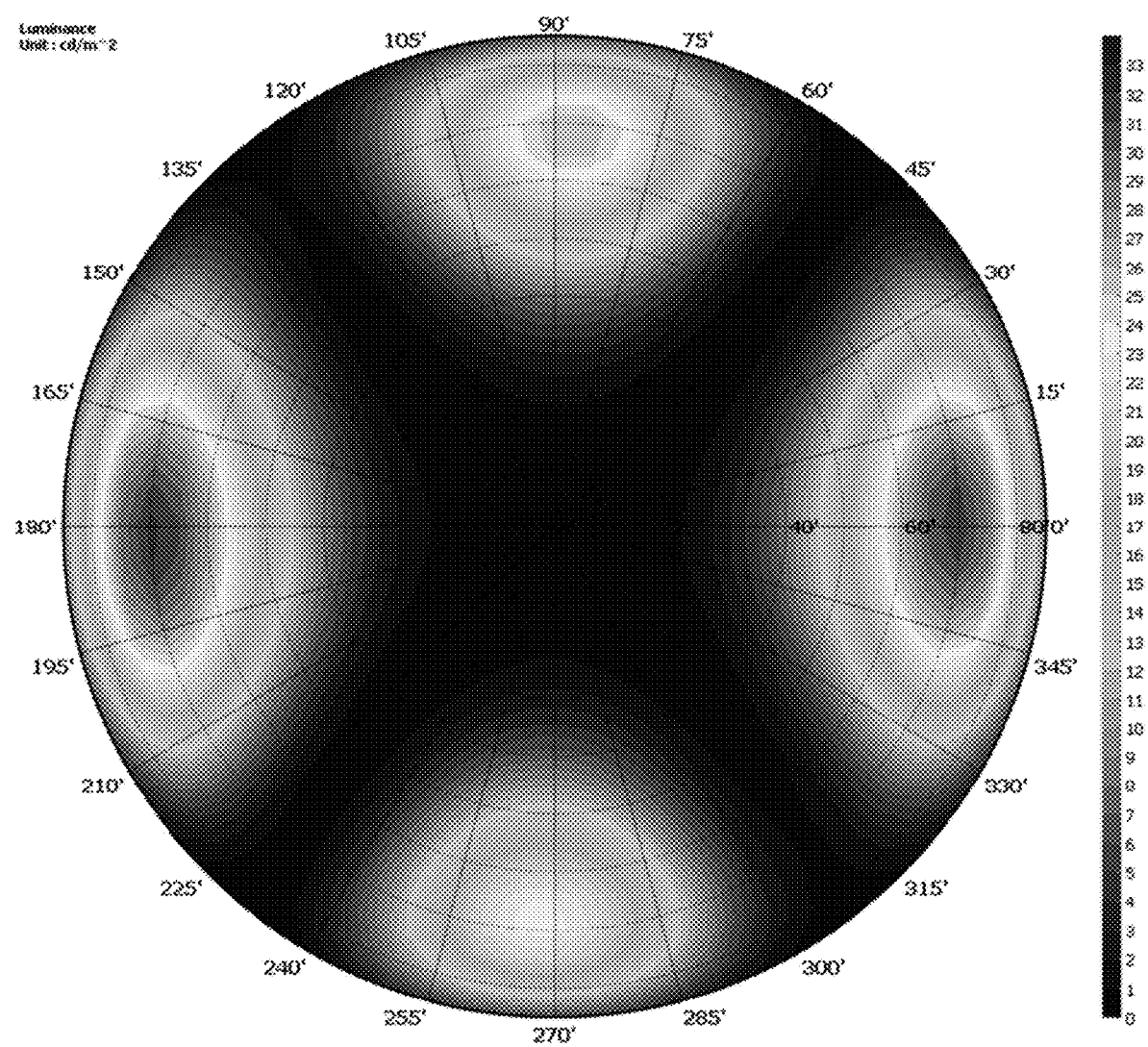
FIG. 25 is still another black-state simulation effect diagram of the liquid crystal display panel shown in FIG. 18 at different viewing angles.
Figure 26:
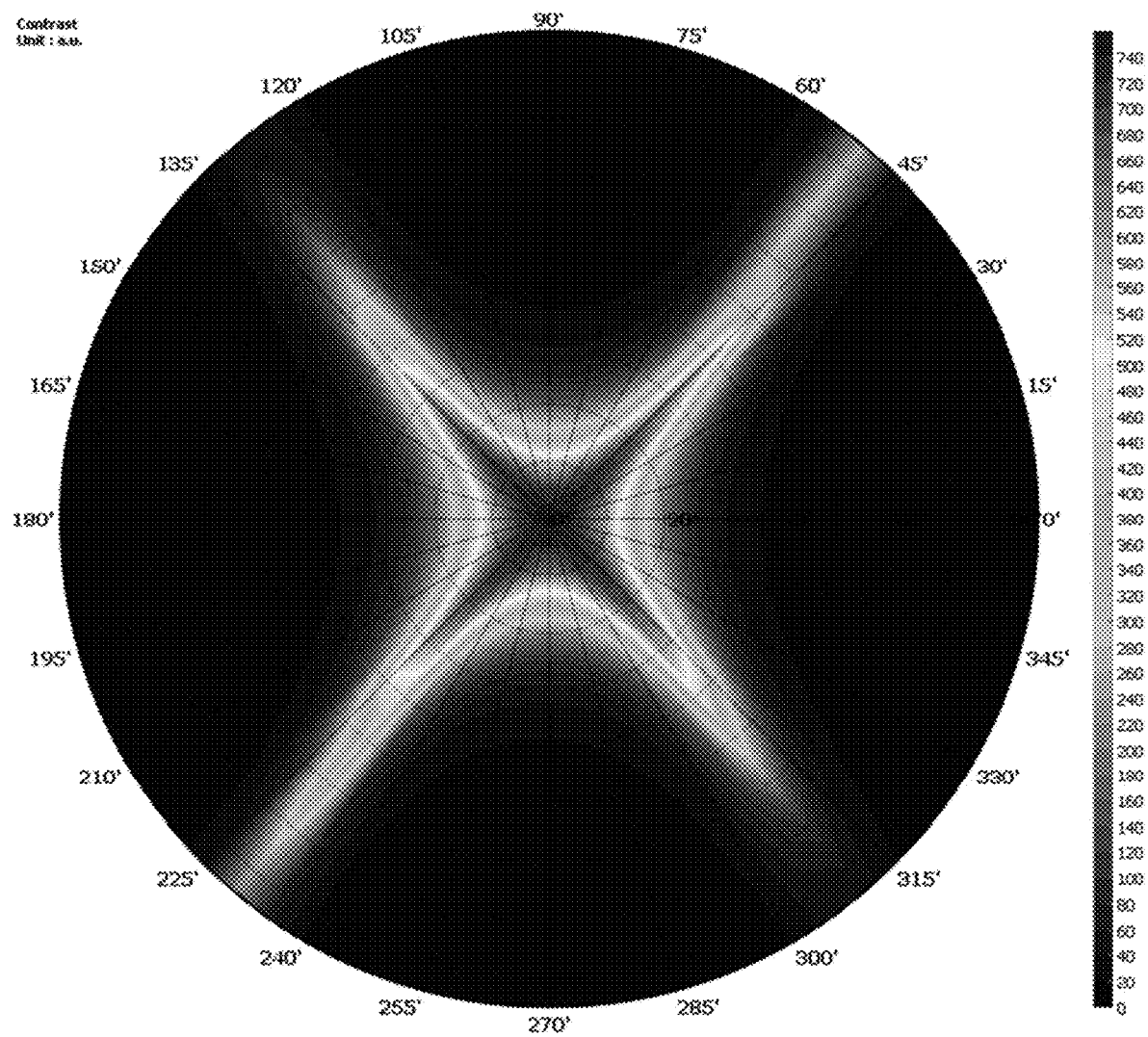
FIG. 26 is still another contrast simulation effect diagram of the liquid crystal display panel shown in FIG. 18 at different viewing angles.

FIG. 23 is still another black-state simulation effect diagram of the liquid crystal display panel shown in FIG. 18 at different viewing angles, and FIG. 24 is still another contrast simulation effect diagram of the liquid crystal display panel shown in FIG. 18 at different viewing angles. As shown in FIG. 18, FIG. 23 and FIG. 24, the first quarter-wave plate 11 and the second quarter-wave plate 21 in the liquid crystal display panel shown in FIG. 18 each are made of a positive material, $\theta_2=135°$, $\theta_3=0°$, and $\theta_4=135°$. FIG. 25 is still another black-state simulation effect diagram of the liquid crystal display panel shown in FIG. 18 at different viewing angles, and FIG. 26 is still another contrast simulation effect diagram of the liquid crystal display panel shown in FIG. 18 at different viewing angles. As shown in FIG. 25 and FIG. 26, $\theta_2=135°$, $\theta_3=90°$, $\theta_4=135°$. Comparing with FIG. 11 and FIG. 12, it can be seen that a viewing angle range of strong light in each of FIG. 23 and FIG. 25 is significantly smaller than that in FIG. 11, and a viewing angle range having a large contrast in each of FIG. 20 and FIG. 22 is significantly larger than that in FIG. 12. This shows that the liquid crystal display panel based on the A1-B2-C2 design has an increased contrast at a large viewing angle.

Figure 27:
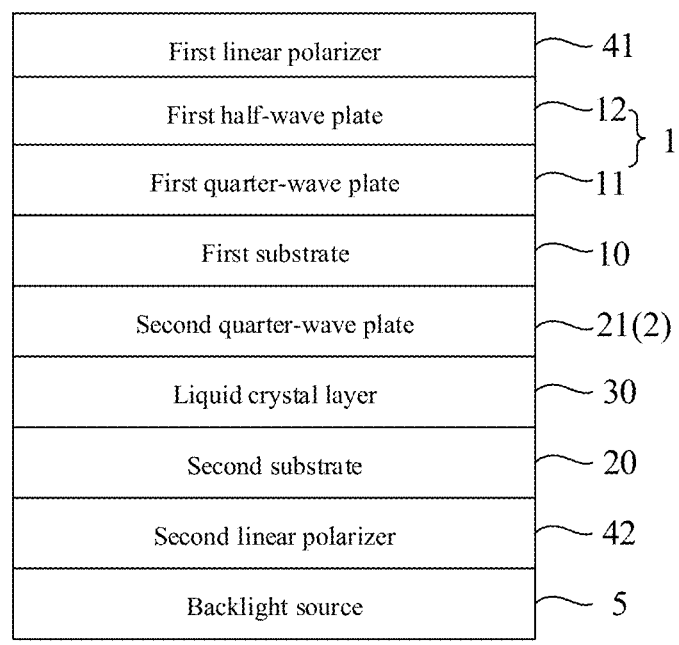
FIG. 27 is a schematic cross-sectional view of still another liquid crystal display panel according to an embodiment of the present disclosure.

FIG. 27 is a schematic cross-sectional view of still another liquid crystal display panel according to an embodiment of the present disclosure. As shown in FIG. 27, in this embodiment of the present disclosure, the liquid crystal display panel may further adopt a second scheme for setting the number of wave plates. The second scheme for setting the number of wave plates represents that the second phase delay structure 2 in the liquid crystal cell only includes the second quarter-wave plate 21, and the first phase delay structure 1 disposed outside the liquid crystal cell includes the first quarter-wave plate 11 and the first half-wave plate 12. The second scheme for setting the number of wave plates is denoted by A2 in the following.

In an embodiment, the liquid crystal display panel based on the A2 design may further adopt a first scheme for setting positions of wave plates, and the first scheme for setting positions of wave plates based on the A2 design represents that the first half-wave plate 12 is located between the first quarter-wave plate 11 and the first linear polarizer 41. The first scheme for setting positions of wave plates based on the A2 design is denoted by A2-B1 in the following.

In an embodiment, the liquid crystal display panel based on the A2-B1 design may further adopt a first scheme for setting the rotation direction. The first scheme for setting the rotation direction based on the A2-B1 design represents that ambient light emitted towards the liquid crystal display panel becomes left rotation circularly polarized light after passing through the first linear polarizer 41 and the first phase delay structure 1. The first scheme for setting the rotation direction based on the A2-B1 design is denoted by A2-B1-C1 in the following.

In the A2-B1-C1 design, the first phase delay structure 1 formed by the first half-wave plate 12 and the first quarter-wave plate 11 is equivalent to the first phase delay structure 1 including only one first quarter-wave plate 11 in the A1-B1-C1 design and in the A1-B2-C1 design.

In an embodiment, when the liquid crystal display panel adopts the A2-B1-C1 design, in a case where the first quarter-wave plate 11 is made of a positive material, the angle $\theta_1$ formed between the slow axis of the first half-wave plate 12 and the first direction and the angle $\theta_2$ formed between the slow axis of the first quarter-wave plate 11 and the first direction are set to satisfy $\theta_2=2\theta_1+45°$ in this embodiment of the present disclosure. In a case where the first quarter-wave plate 11 is made of a negative material, the angle $\theta_1$ and the angle $\theta_2$ are set to satisfy $\theta_2=2\theta_1+135°$ in this embodiment of the present disclosure. In this way, ambient light emitted towards the liquid crystal display panel passes through the first linear polarizer 41, the first half-wave plate 12, and the first quarter-wave plate 11 to become left rotation circularly polarized light, thereby preventing the reflected ambient light from exiting.

Figure 28:
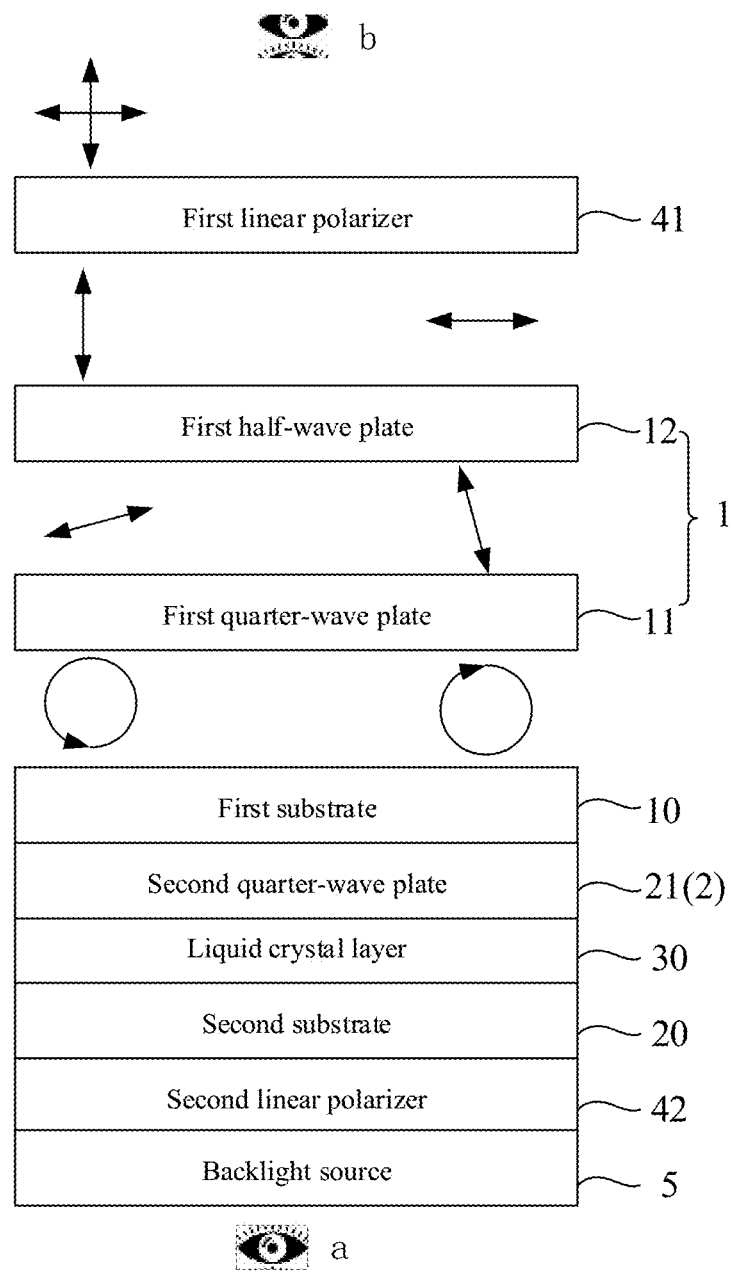
FIG. 28 is a schematic diagram illustrating light changes after ambient light is emitted towards the liquid crystal display panel shown in FIG. 27.

FIG. 28 is a schematic diagram illustrating light changes after ambient light is emitted towards the liquid crystal display panel shown in FIG. 27. With reference to FIG. 28, ambient light is emitted towards the liquid crystal display panel and passes through the first linear polarizer 41 to become linear polarized light having a polarization direction being the second direction. Then, the linear polarized light having the polarization direction being the second direction is further emitted towards the liquid crystal display panel and passes through the first half-wave plate 12. It is assumed that the slow axis of the first half-wave plate 12 is denoted by OL on the Poincare sphere shown in FIG. 3. The linear polarized light having a polarization direction being the second direction passes through the first half-wave plate 12, and this process is represented in FIG. 4 by the point A rotating by 180° on the sphere surface of the Poincare sphere about the OL to a point M. That is, after passing through the first half-wave plate 12, the linear polarized light having a polarization direction being the second direction becomes linear polarized light having a polarization direction being a sixth direction. As shown in FIG. 5, A and M are symmetric to each other about OL, $\angle DOL=2\theta_1$, and $\angle DON=2\angle DOL=4\theta_1$, where M, O, N are collinear.

Then, the linear polarized light having the polarization direction being the sixth direction passes through the first quarter-wave plate 11, and the polarization direction of the light rotates by 90° about the slow axis of the first quarter-wave plate 11.

In a case where the first quarter-wave plate 11 is made of a positive material and $\theta_2=2\theta_1+45°$, $2\theta_2=4\theta_1+90°$. As shown in FIG. 5, OP is perpendicular to ON, and $4\theta_1+90°=\angle DON+90°=\angle DOP=2\theta_2$. Therefore, the slow axis of the first quarter-wave plate 11 is denoted by OP in FIG. 4. The polarization direction of the light rotates by 90° about the slow axis of the first quarter-wave plate 11, and this process is represented in FIG. 4 by the point M rotating clockwise by 90° on the sphere surface of the Poincare sphere about OP to the point B located on the negative axis of S3. That is, after passing through the first quarter-wave plate 11 made of the positive material, the linear polarized light having the polarization direction being the sixth direction becomes left rotation circularly polarized light.

The left rotation circularly polarized light subsequently becomes right rotation circularly polarized light after being reflected, and this process is represented in FIG. 4 by the point B moving to the point C. However, when the reflected light is being observed, as shown in FIG. 28, the viewing angle changes from an original position a to a position b. When being observed at the position b, the right rotation circularly polarized light originally observed at the position a becomes left rotation circularly polarized light observed at the position b, so it is still denoted by the point B in FIG. 4.

When being observed at the position b, the left rotation circularly polarized light is emitted towards the light-exiting side of the liquid crystal display panel. After the light passes through the first quarter-wave plate 11, the polarization direction of the light rotates clockwise by 90° about the slow axis of the first quarter-wave plate 11. This process is represented in FIG. 4 by the point B rotating clockwise by 90° on the sphere surface of the Poincare sphere about OP to a point N. That is, the light becomes linear polarized light having a polarization direction being a seventh direction.

In a case where the first quarter-wave plate 11 is made of a negative material and $\theta_2=2\theta_1+135°$, $2\theta_2=4\theta_1+270°=4\theta_1+180°+90°$. As shown in FIG. 5, $4\theta_1+180°=\angle DOM$, and $4\theta_1+180°+90°=\angle DOM+90°=\angle DOQ=2\theta_2$. Here, OQ is perpendicular to OM. Therefore, OQ represents the slow axis of the first quarter-wave plate 11 made of the negative material. The polarization direction of the linear polarized light rotates counterclockwise by 90° about the slow axis of the first quarter-wave plate 11, and this process is represented in FIG. 4 by the point M rotating counterclockwise by 90° on the sphere surface of the Poincare sphere about OQ to the point B located on the negative axis of S3. That is, after passing through the first quarter-wave plate 11 made of the negative material, the linear polarized light having a polarization direction being the sixth direction becomes left rotation circularly polarized light.

The left rotation circularly polarized light subsequently becomes right rotation circularly polarized light after being reflected. Considering changes of the observation position, the right rotation circularly polarized light when originally observing at the position a becomes left rotation circularly polarized light when observed at the position b, so it is still denoted by the point B in FIG. 4.

When being observed at the position b, the left rotation circularly polarized light is emitted towards the light-exiting side of the liquid crystal display panel. After the light passes through the first quarter-wave plate 11, the polarization direction of the light rotates counterclockwise by 90° about the slow axis of the first quarter-wave plate 11. This process is represented in FIG. 4 by the point B rotating counterclockwise by 90° on the sphere surface of the Poincare sphere about OQ to the point N. That is, the light becomes linear polarized light having a polarization direction being the seventh direction.

Then, the linear polarized light is further emitted towards the light-exiting side of the liquid crystal display panel, and after the light passes through the first half-wave plate 12, the polarization direction of the light rotates by 180° about the slow axis of the first half-wave plate 12. This process is represented in FIG. 4 by the point N rotating by 180° on the sphere surface of the Poincaré sphere about OL to the point D. That is, after the linear polarized light passes through the first half-wave plate 12, the polarization direction of the linear polarized light changes from the seventh direction to the first direction. Subsequently, the polarized light is absorbed by the first linear polarizer 41 and cannot exit, thereby preventing the reflected ambient light from exiting from the liquid crystal display panel.

Based on the structure shown in FIG. 27, when the A2-B1-C1 design is adopted and it is satisfied that $\theta_2=2\theta_1+45°$ (in a case where the first quarter-wave plate 11 is made of a positive material) or $\theta_2=2\theta_1+135°$ (in a case where the first quarter-wave plate 11 is made of a negative material), when setting the second quarter-wave plate 21 in the liquid crystal cell, for the second quarter-wave plate 21 made of a positive material, the angle $\theta_4$ formed between the slow axis of the second quarter-wave plate 21 and the first direction can be set as 135°, and for the second quarter-wave plate 21 made of a negative material, the angle $\theta_4$ formed between the slow axis of the second quarter-wave plate 21 and the first direction can be set as 45°. In this way, the contrast of the liquid crystal display panel can be increased.

Figure 29:
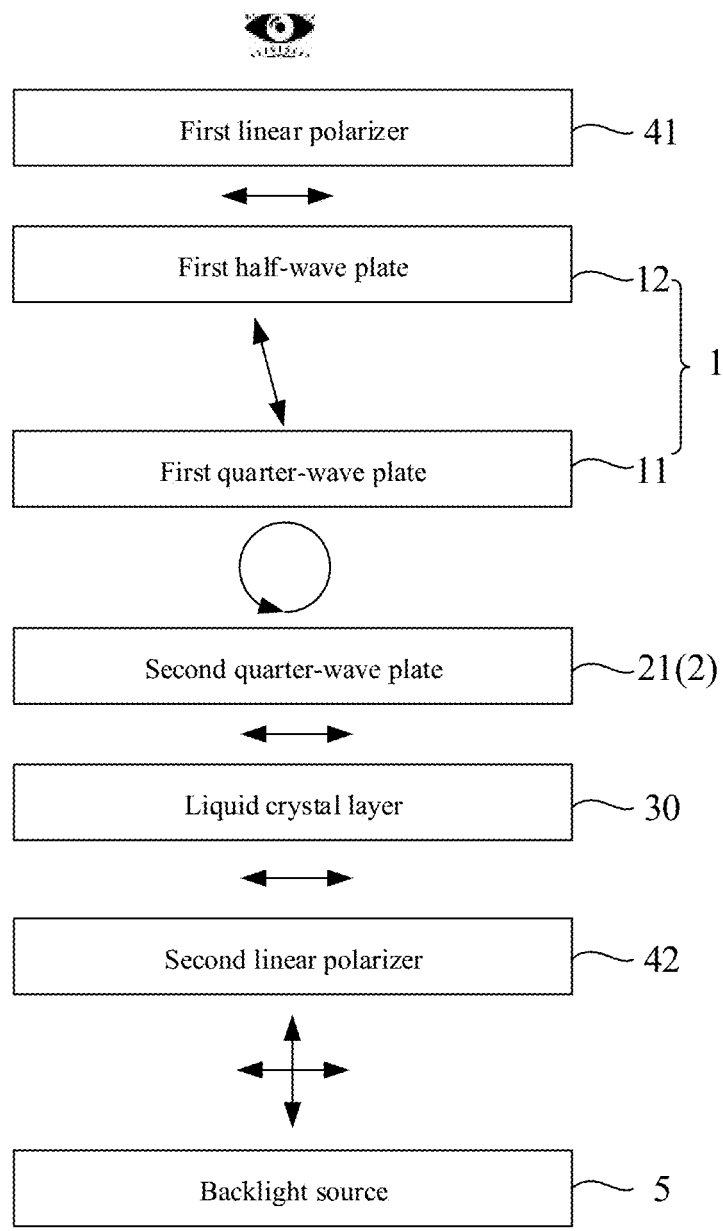
FIG. 29 is a schematic diagram illustrating light changes when the liquid crystal display panel shown in FIG. 27 is in a black state.

FIG. 29 is a schematic diagram illustrating light changes when the liquid crystal display panel shown in FIG. 27 is in a black state. In an example, when the liquid crystal display panel is in a black state, as shown in FIG. 29, after passing through the second linear polarizer 42, light emitted from the backlight source 5 becomes linear polarized light having a polarization direction being the first direction. The polarization direction of the linear polarized light does not change after the linear polarized light passes through the liquid crystal layer 30. Then, the linear polarized light having the polarization direction being the first direction passes through the second quarter-wave plate 21, and the polarization direction of the light rotates by 90° about the slow axis of the second quarter-wave plate 21.

In a case where the second quarter-wave plate 21 is made of a positive material and the angle $\theta_4$ formed between the slow axis of the second quarter-wave plate 21 and the first direction is 135°, the polarization direction of the light rotates clockwise by 90° about the slow axis of the second quarter-wave plate 21. This process is represented in FIG. 4 by the point D rotating clockwise by 90° on the sphere surface of the Poincaré sphere about OK to the point B.

In a case where the second quarter-wave plate 21 is made of a negative material and the angle $\theta_4$ formed between the slow axis of the second quarter-wave plate 21 and the first direction is 45°, the polarization direction of the light rotates counterclockwise by 90° about the slow axis of the second quarter-wave plate 21. This process is represented in FIG. 4 by the point D rotating counterclockwise by 90° on the sphere surface of the Poincaré sphere about OI to the point B.

That is, after passing through the second quarter-wave plate 21, the linear polarized light having the polarization direction being the first direction becomes left rotation circularly polarized light. Then, after sequentially passing through the first quarter-wave plate 11 and the first half-wave plate 12, the left rotation circularly polarized light becomes linear polarized light having a polarization direction being the first direction. This process is the same as an emission process of the above-mentioned ambient light after being reflected by the liquid crystal display panel based on the A1-B1-C1 design, and will not be repeated herein.

Subsequently, the linear polarized light is absorbed by the first linear polarizer 41 and cannot exit, thereby avoiding light leakage in the black state.

Figure 30:
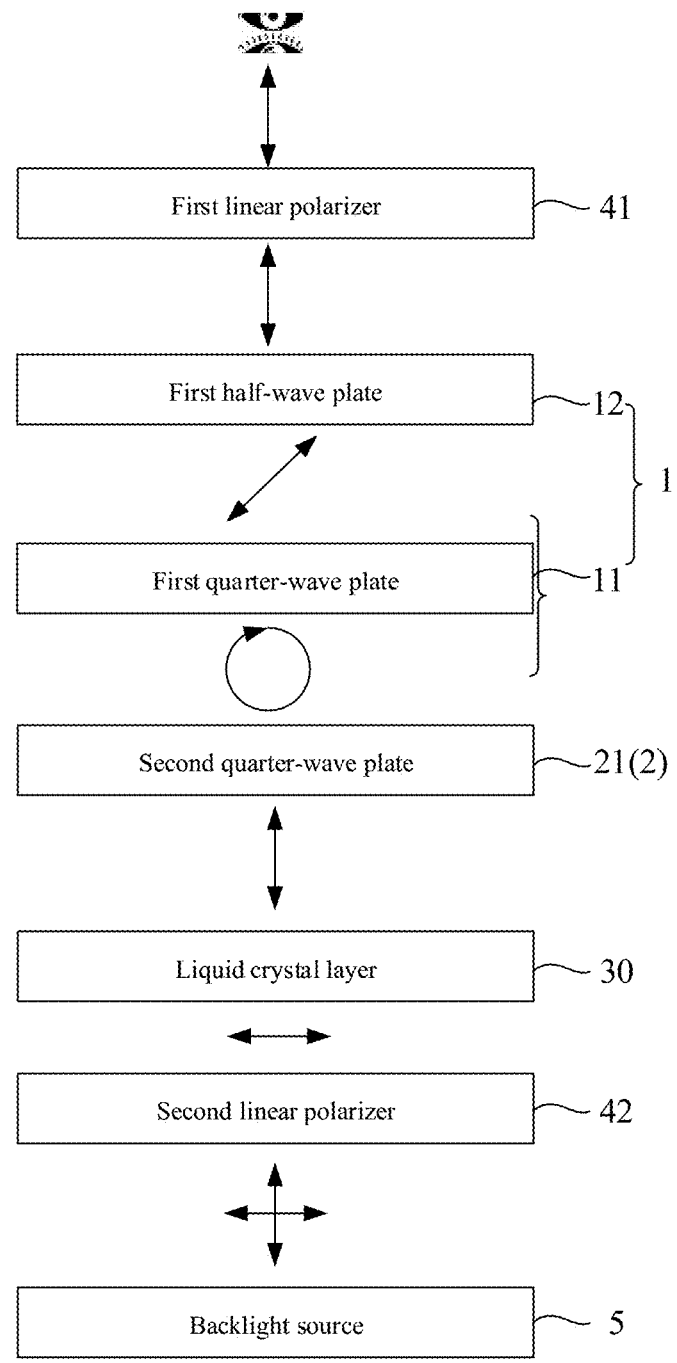
FIG. 30 is a schematic diagram illustrating light changes when the liquid crystal display panel shown in FIG. 27 is in a white state.

FIG. 30 is a schematic diagram illustrating light changes when the liquid crystal display panel shown in FIG. 27 is in a white state. When the liquid crystal display panel is in a white state, as shown in FIG. 30, the polarization direction of the linear polarized light changes from the first direction to the second direction after the linear polarized light passes through the liquid crystal layer 30. Then, the linear polarized light having the polarization direction being the second direction passes through the second quarter-wave plate 21, and the polarization direction of the light rotates by 90° about the slow axis of the second quarter-wave plate 21.

In a case where the second quarter-wave plate 21 is made of a positive material and the angle $\theta_4$ formed between the slow axis of the second quarter-wave plate 21 and the first direction is 135°, the linear polarized light having the polarization direction being the second direction passes through the second quarter-wave plate 21, and the polarization direction rotates clockwise by 90° about the slow axis of the second quarter-wave plate 21. This process is represented in FIG. 4 by the point A rotating clockwise by 90° on the sphere surface of the Poincaré sphere about OK to the point C.

In a case where the second quarter-wave plate 21 is made of a negative material and the angle $\theta_4$ formed between the slow axis of the second quarter-wave plate 21 and the first direction is 45°, the linear polarized light having the polarization direction being the second direction passes through the second quarter-wave plate 21, and the polarization direction rotates counterclockwise by 90° about the slow axis of the second quarter-wave plate 21. This process is represented in FIG. 4 by the point A rotating counterclockwise by 90° on the sphere surface of the Poincaré sphere about OI to the point C.

That is, the linear polarized light having a polarization direction being the second direction becomes right rotation circularly polarized light, after passing through the second quarter-wave plate 21. Then, the right rotation circularly polarized light passes through the first quarter-wave plate 11, and the polarization direction of the light rotates by 90° about the slow axis of the first quarter-wave plate 11.

In a case where the first quarter-wave plate 11 is made of a positive material, the slow axis of the first quarter-wave plate 11 is denoted by OP in FIG. 4, and the polarization direction of the light rotates by 90° about the slow axis of the first quarter-wave plate 11. This process is represented in FIG. 4 by the point C rotating clockwise by 90° on the sphere surface of the Poincare sphere about OP to the point M.

In a case where the first quarter-wave plate 11 is made of a negative material, the slow axis of the first quarter-wave plate 11 is denoted by OQ in FIG. 4, and the polarization direction of the light rotates 90° about the slow axis of the first quarter-wave plate 11. This process is represented in FIG. 4 by the point C rotating counterclockwise by 90° on the sphere surface of the Poincare sphere about OQ to the point M.

That is, after passing through the first quarter-wave plate 11, the right rotation circularly polarized light becomes linear polarized light having a polarization direction being the sixth direction. Then, the linear polarized light is further emitted towards the light-exiting side of the liquid crystal display panel. After the light passes through the first half-wave plate 12, the polarization direction of the light rotates by 180° about the slow axis of the first half-wave plate 12. This process is represented in FIG. 4 by the point M rotating by 180° on the sphere surface of the Poincaré sphere about OL to the point A. That is, after passing through the first half-wave plate 12, the linear polarized light having the polarization direction being the sixth direction becomes linear polarized light having a polarization direction being the second direction. Subsequently, the linear polarized light can exit without any loss when passing through the first linear polarizer 41, thereby ensuring the brightness in the white state of the liquid crystal display panel and increasing the contrast of the liquid crystal display panel.

On this basis, in a case where the first quarter-wave plate 11 is made of a positive material, it is set that $101.5°\leq\theta_1\leq111.5°$, and in a case where the first quarter-wave plate 11 is made of a positive material a negative material, it is set that $172°\leq\theta_1\leq182°$. The first quarter-wave plate 11 can cooperate with the first half-wave plate 12 to alleviate light leakage in the black state of the liquid crystal display panel at a large viewing angle and increase the contrast of the liquid crystal display panel at a large viewing angle.

Figure 31:
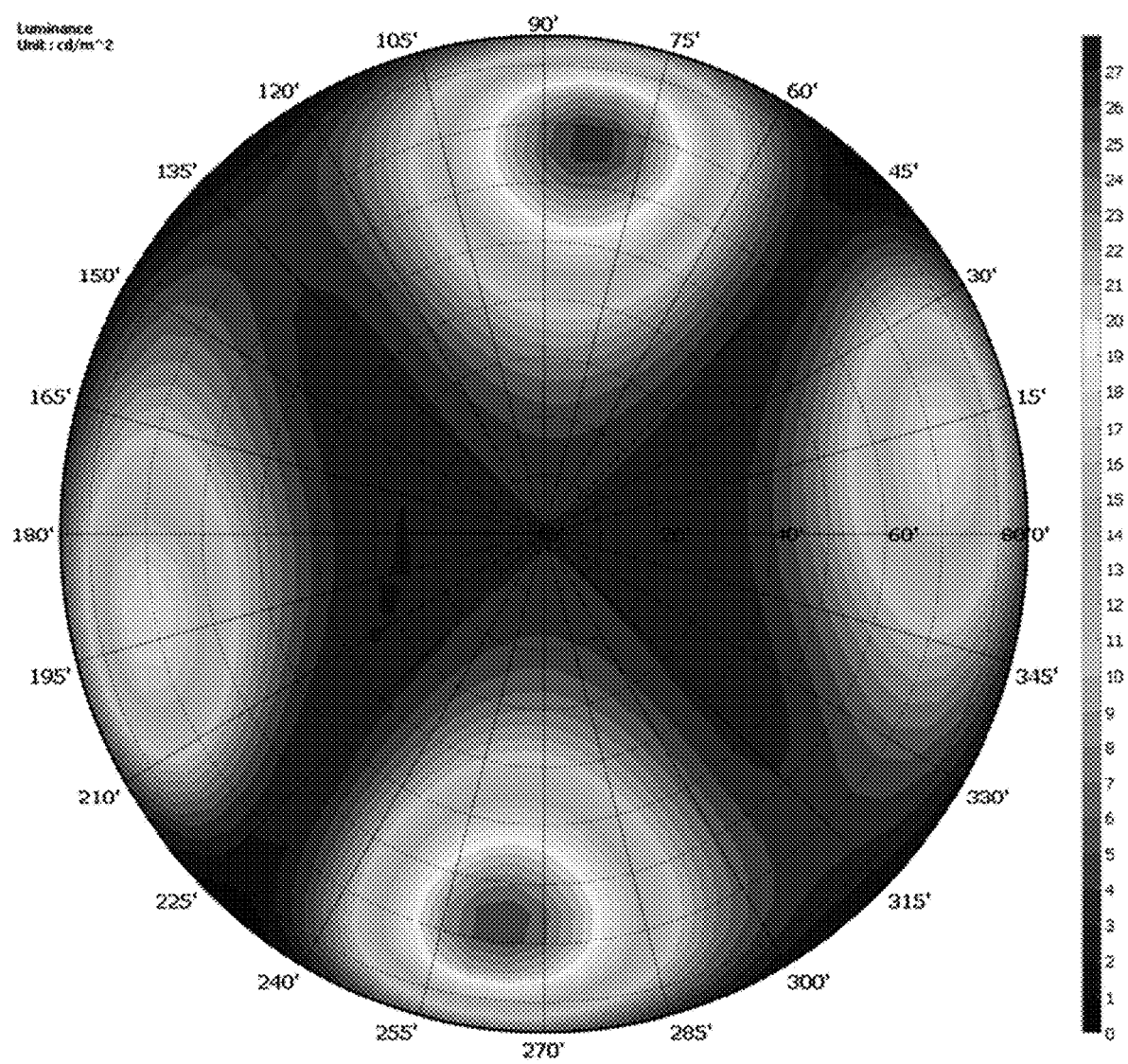
FIG. 31 to FIG. 37 are black-state simulation effect diagrams of the liquid crystal display panel shown in FIG. 27 at different viewing angles.
Figure 32:
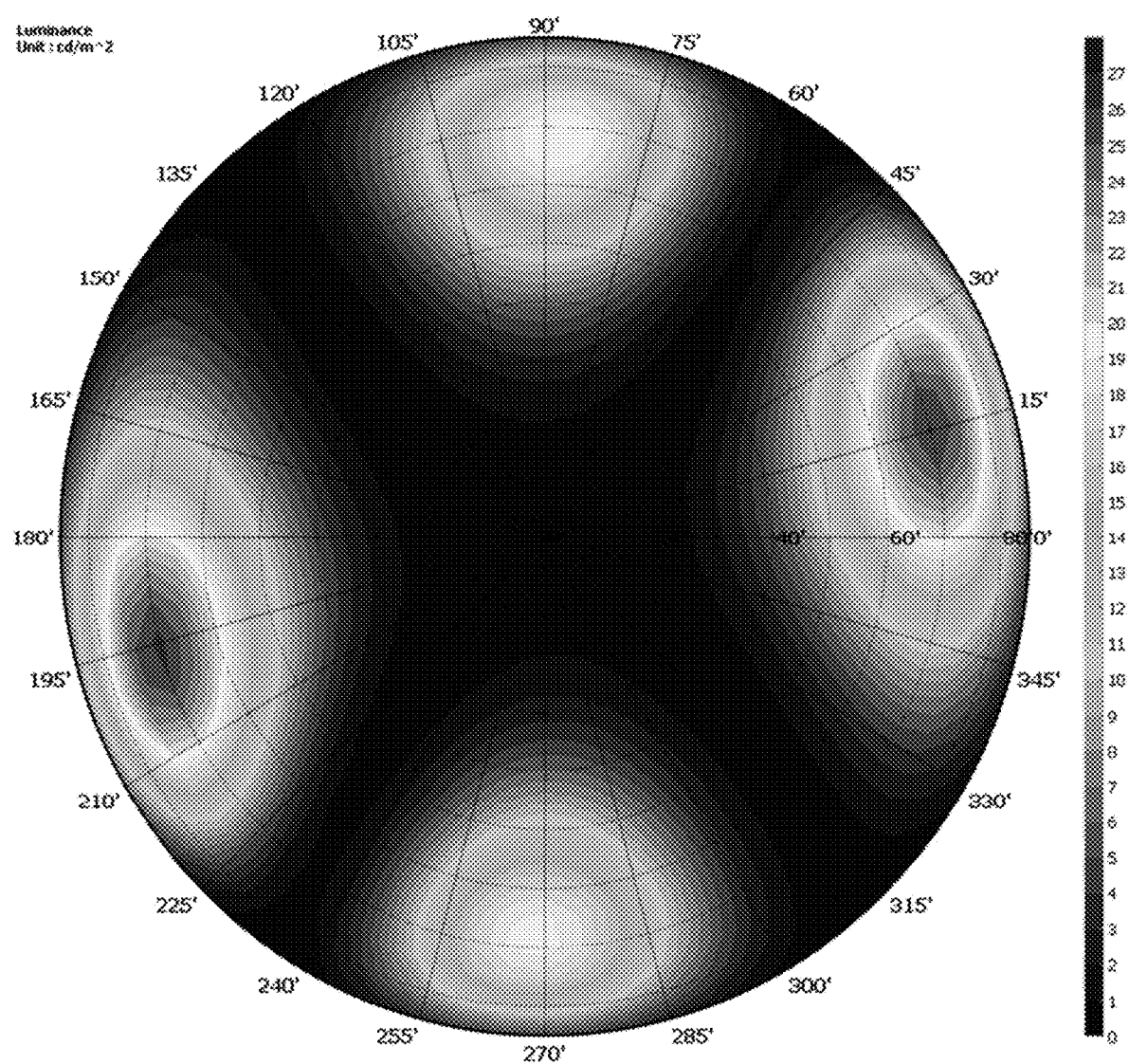
Figure 33:
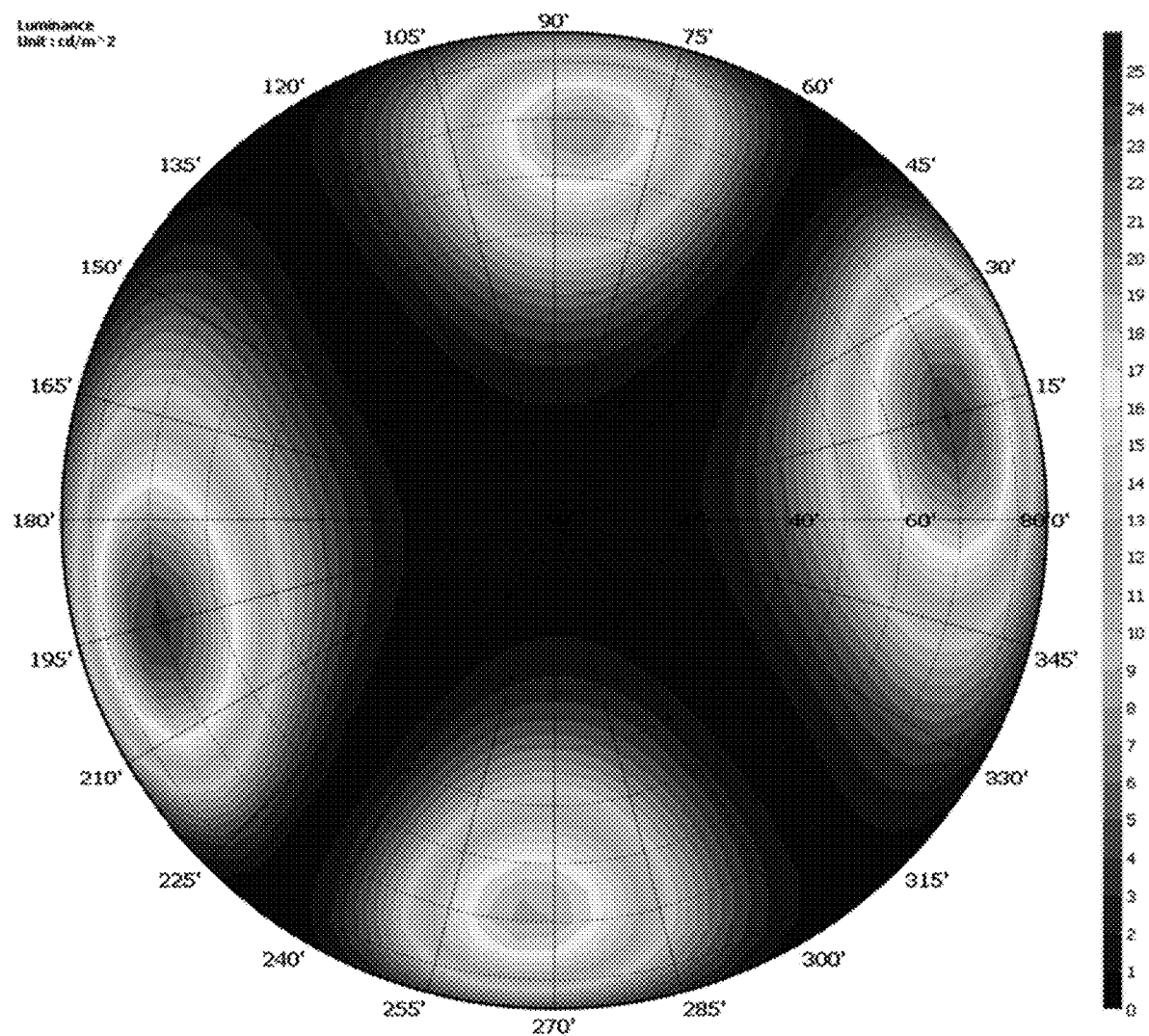
Figure 34:
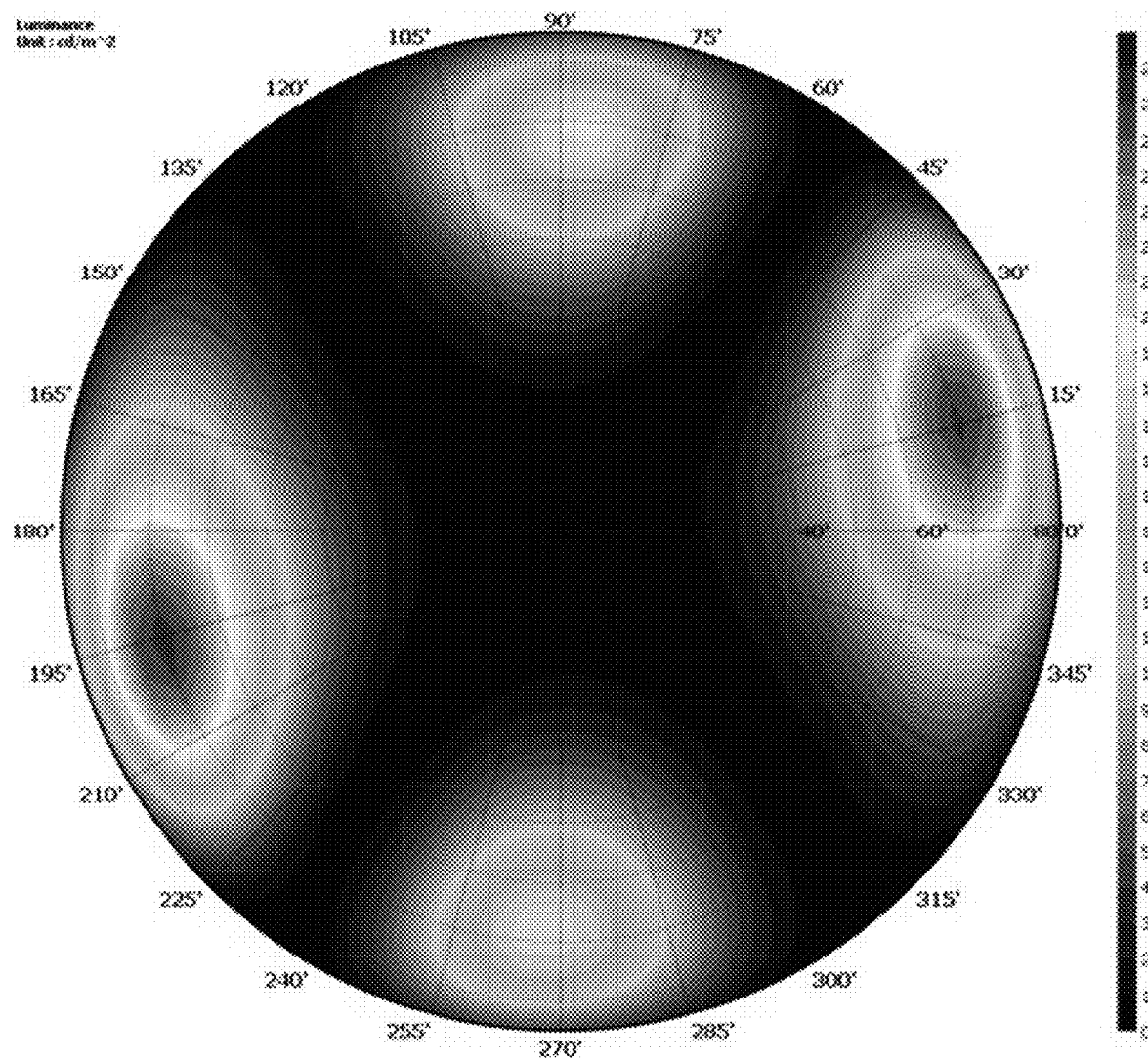
Figure 35:
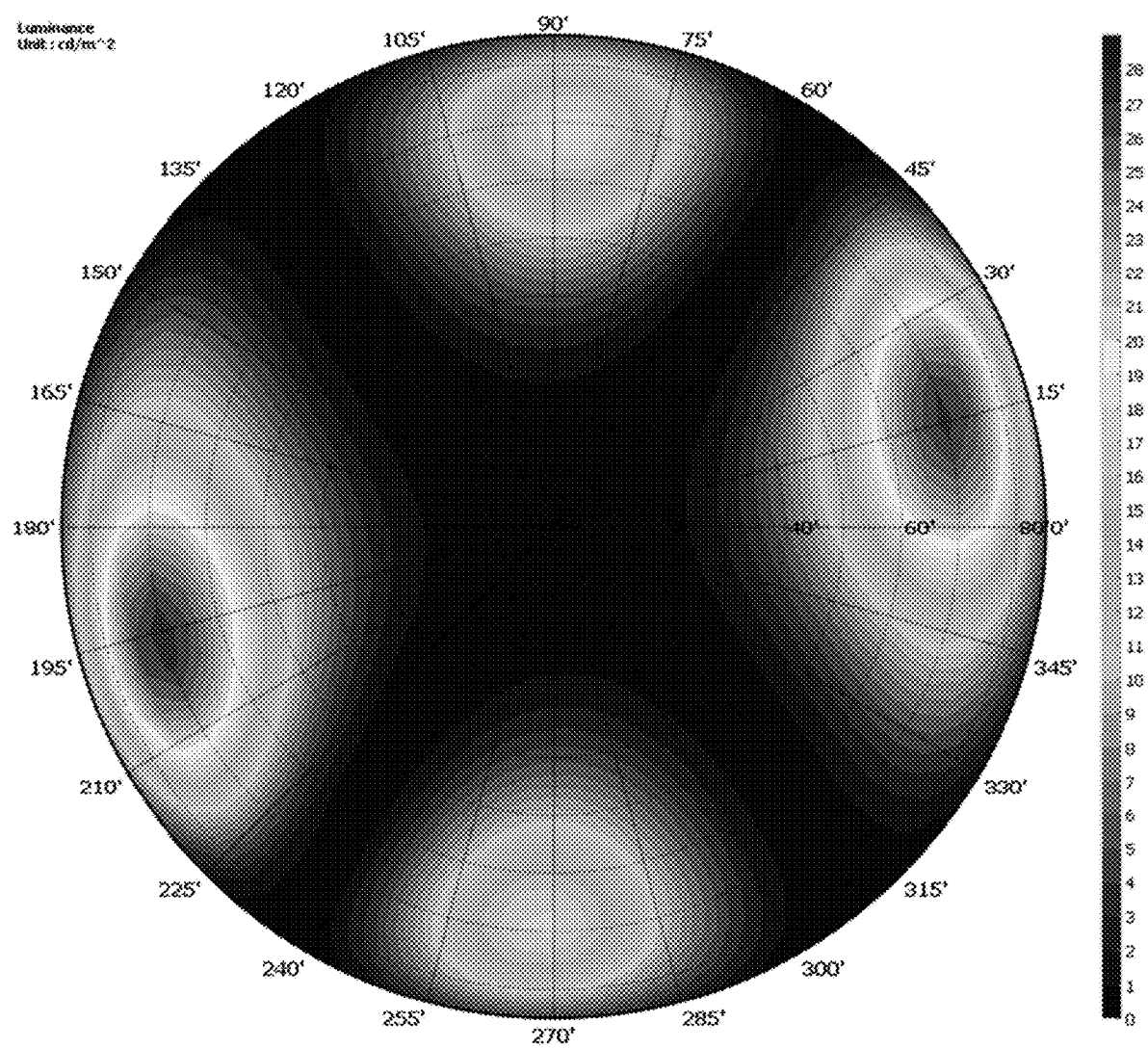
Figure 36:
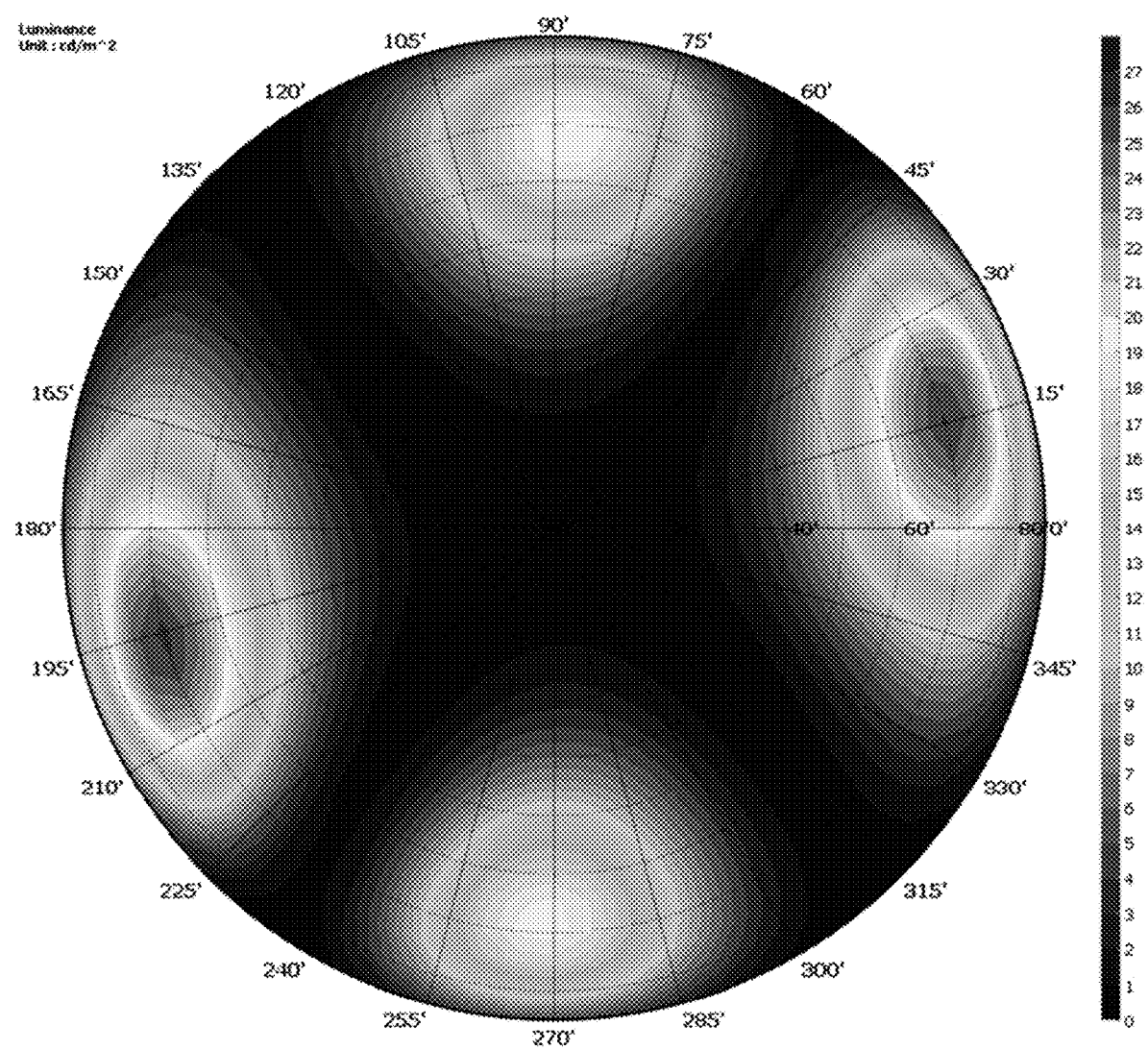
Figure 37:
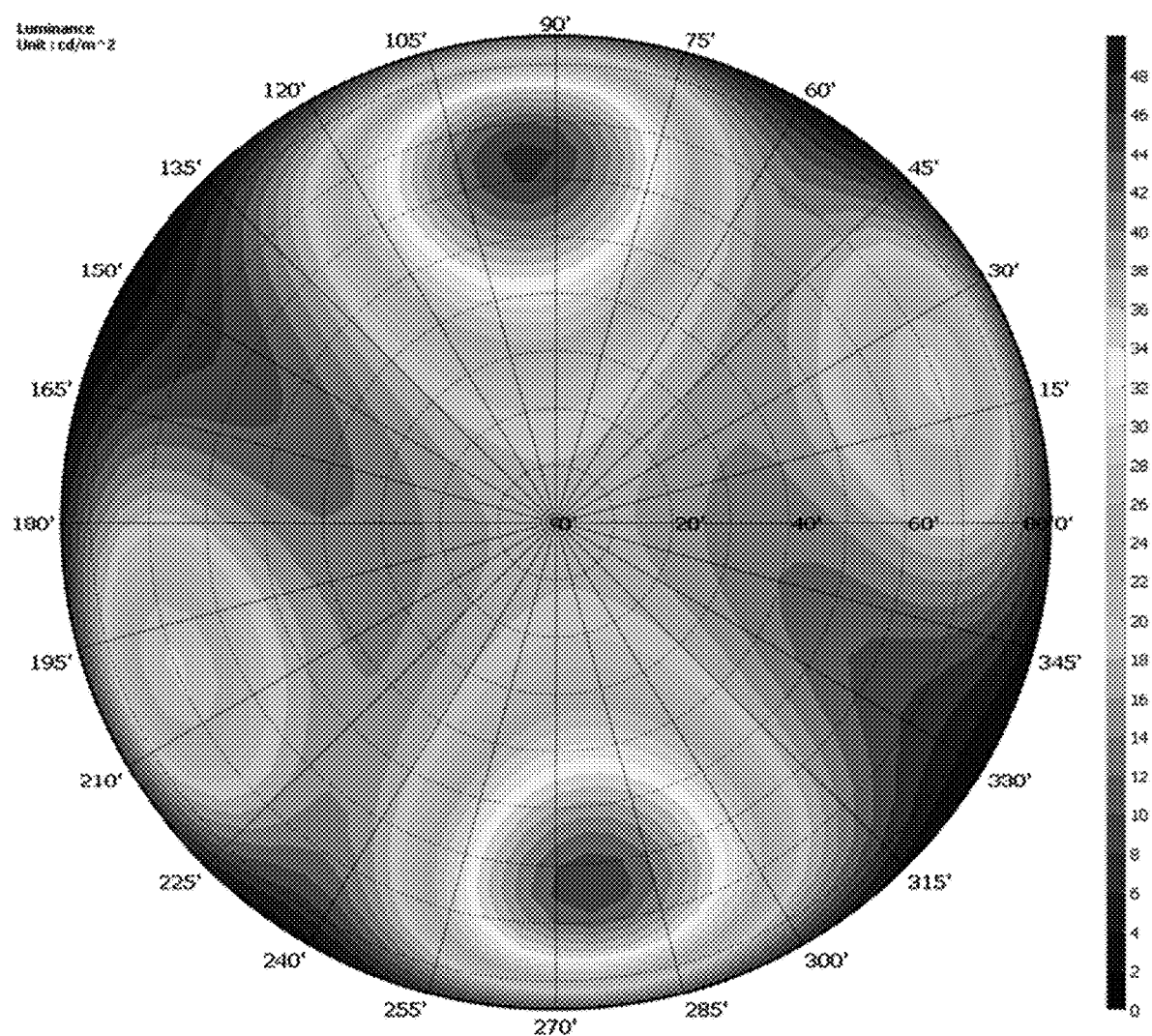
Figure 38:
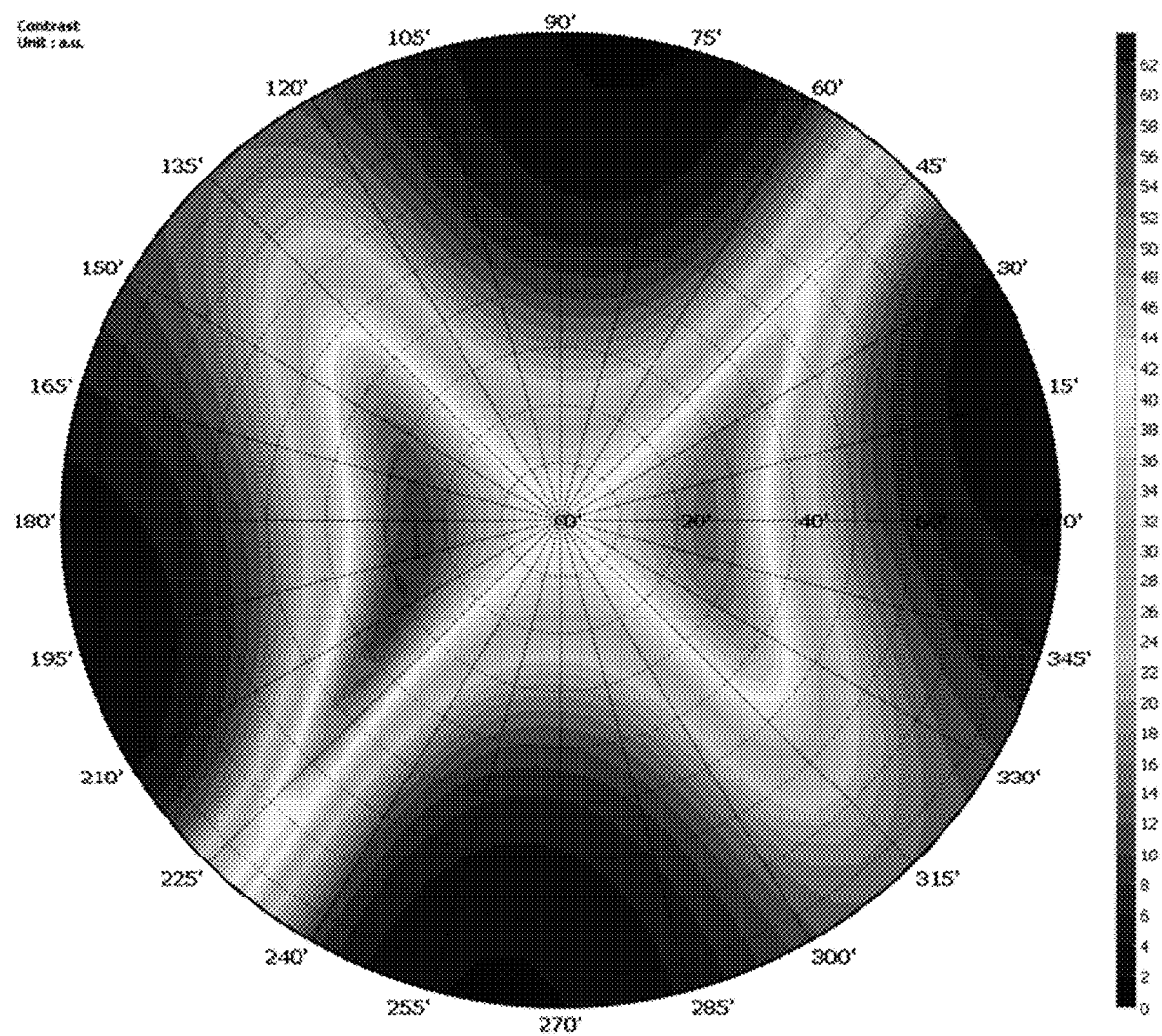
FIG. 38 to FIG. 44 are contrast simulation effect diagrams of the liquid crystal display panel shown in FIG. 27 at different viewing angles.
Figure 39:
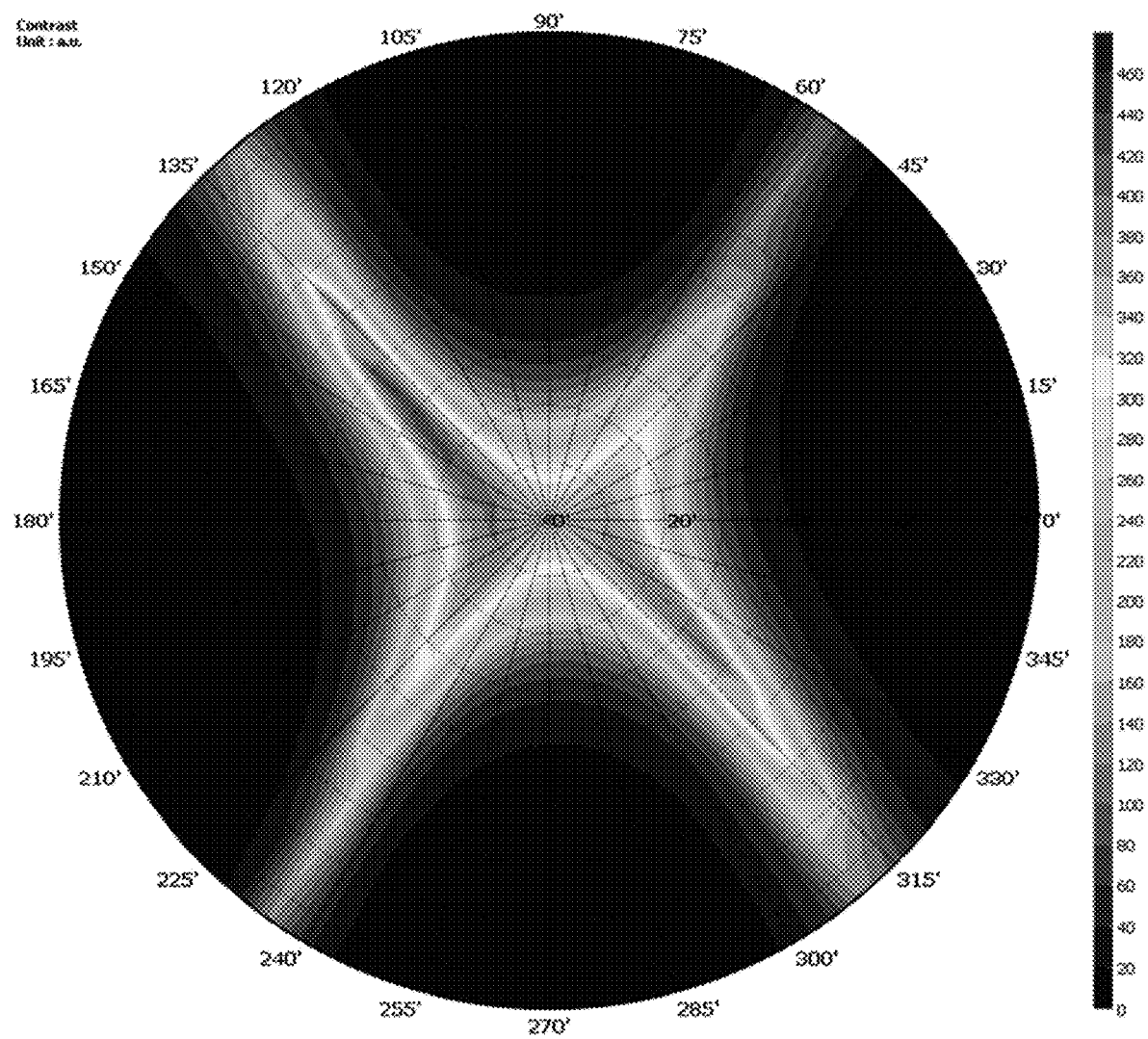
Figure 40:
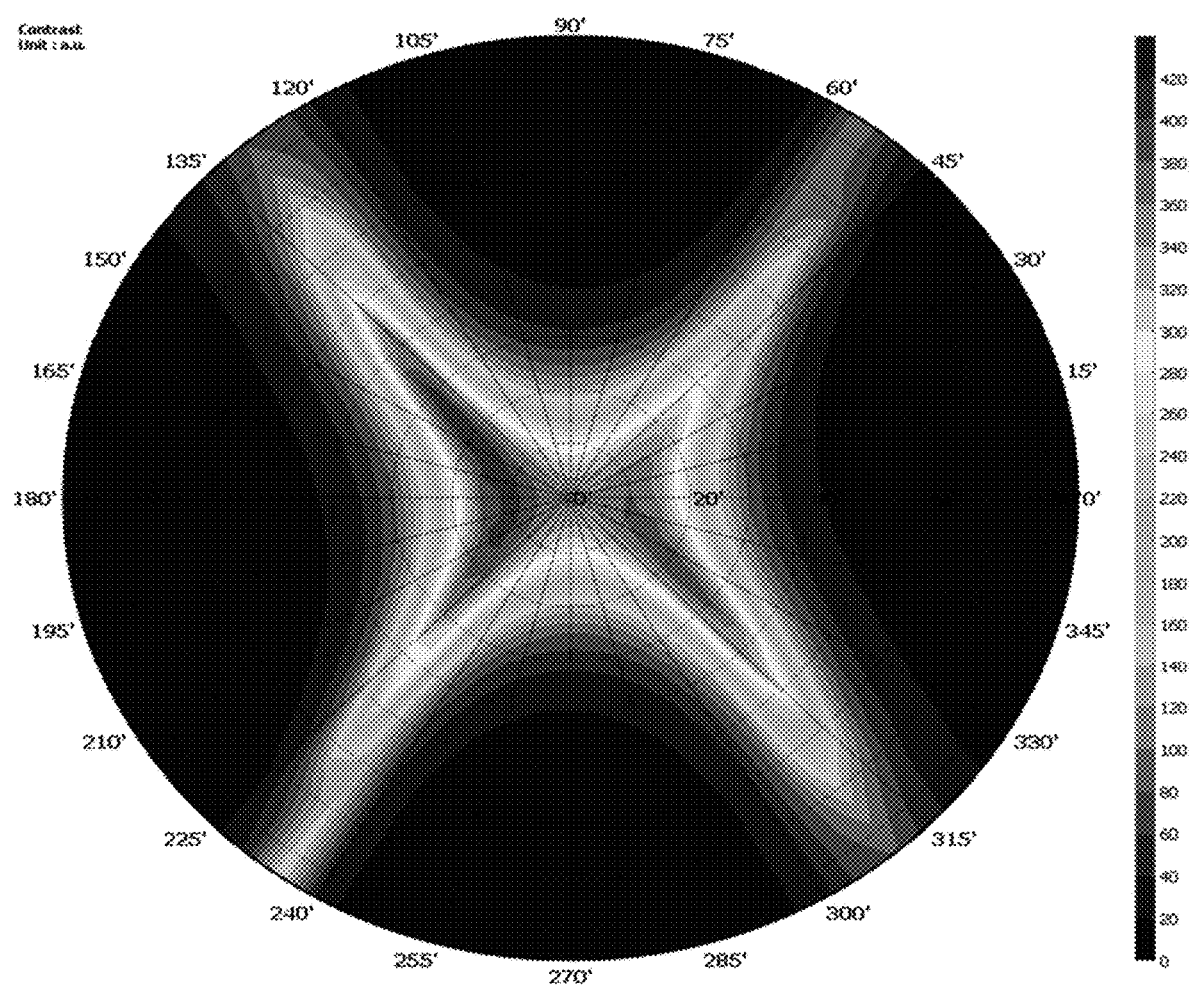
Figure 41:
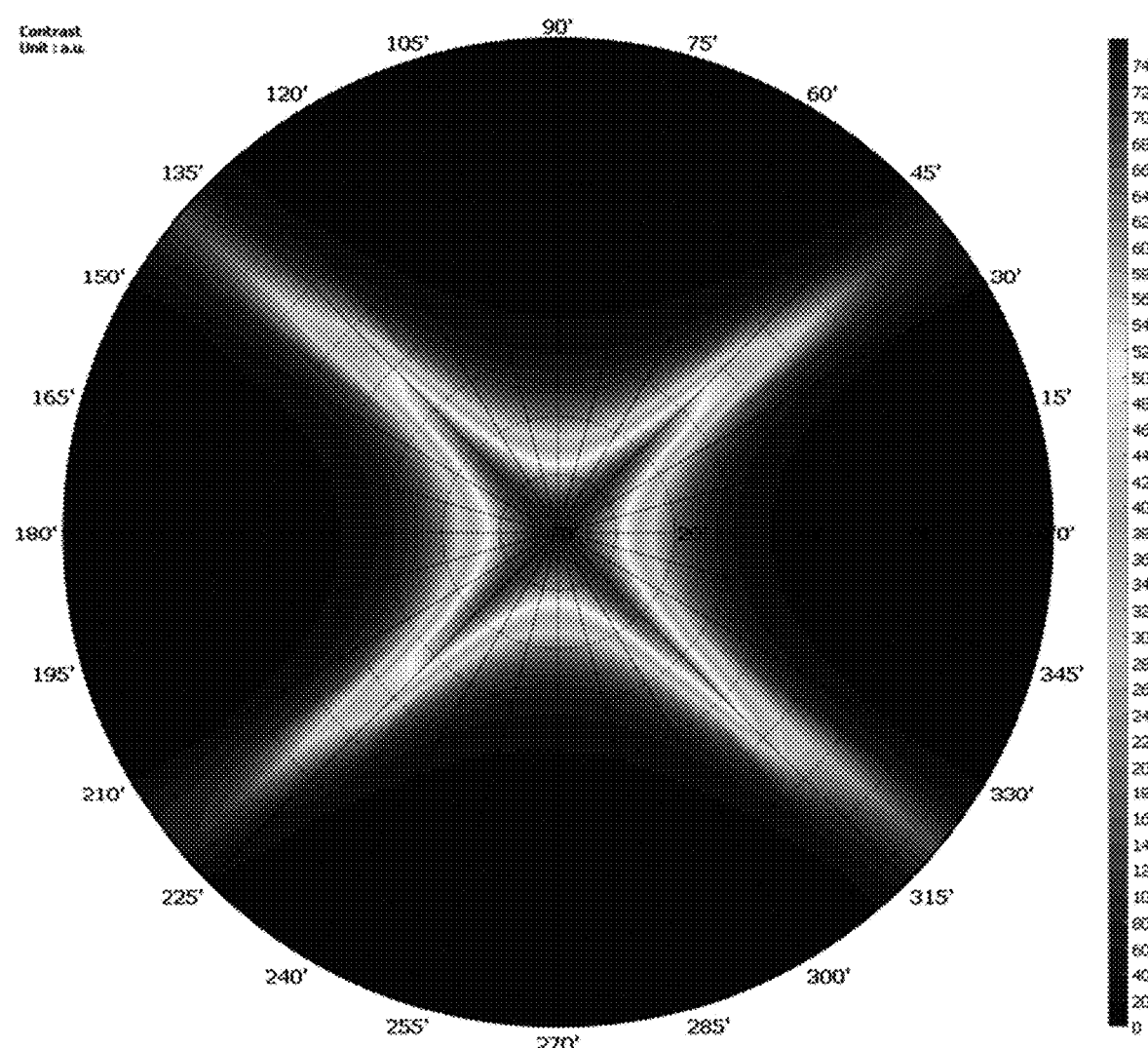
Figure 42:
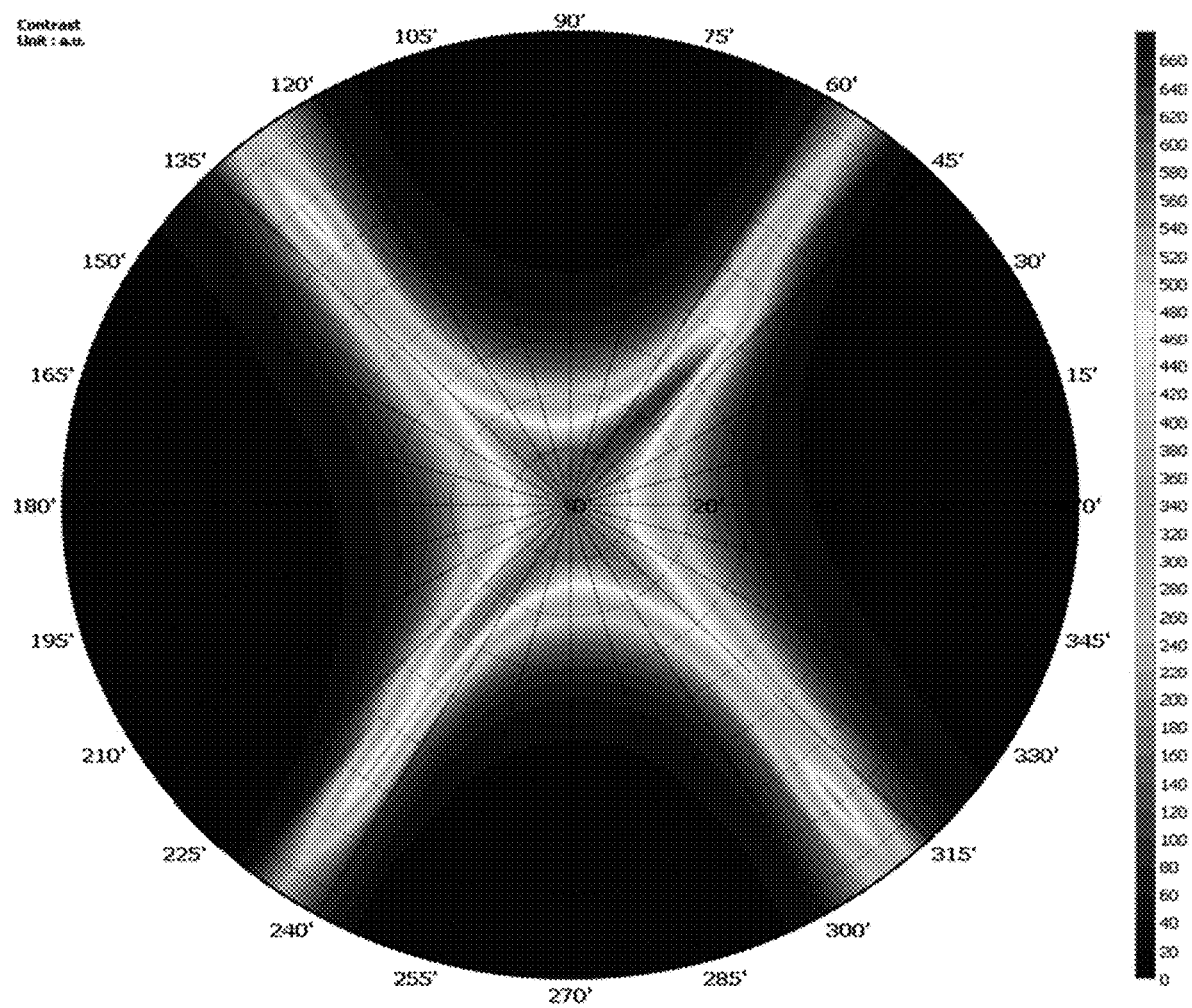
Figure 43:
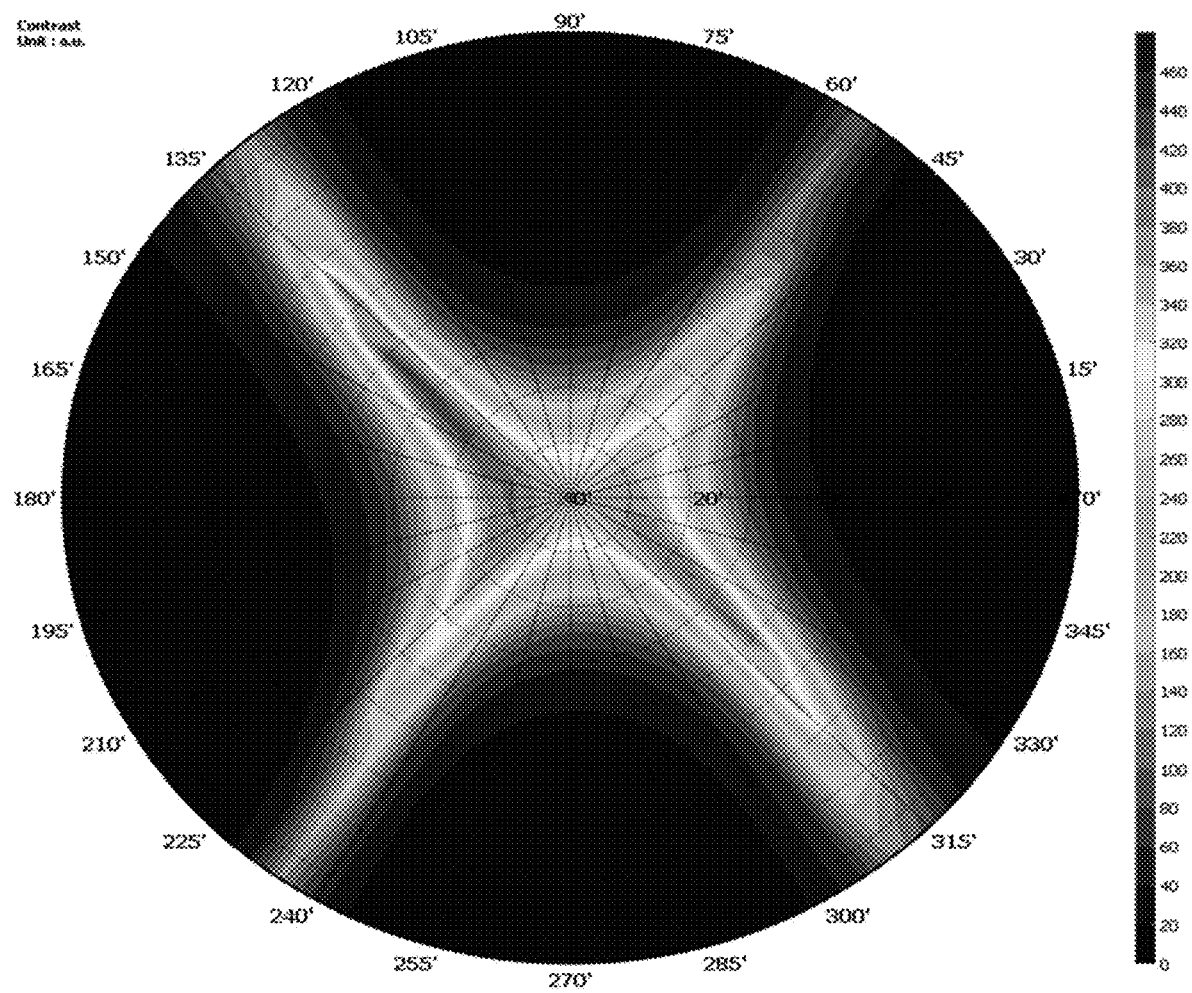
Figure 44:
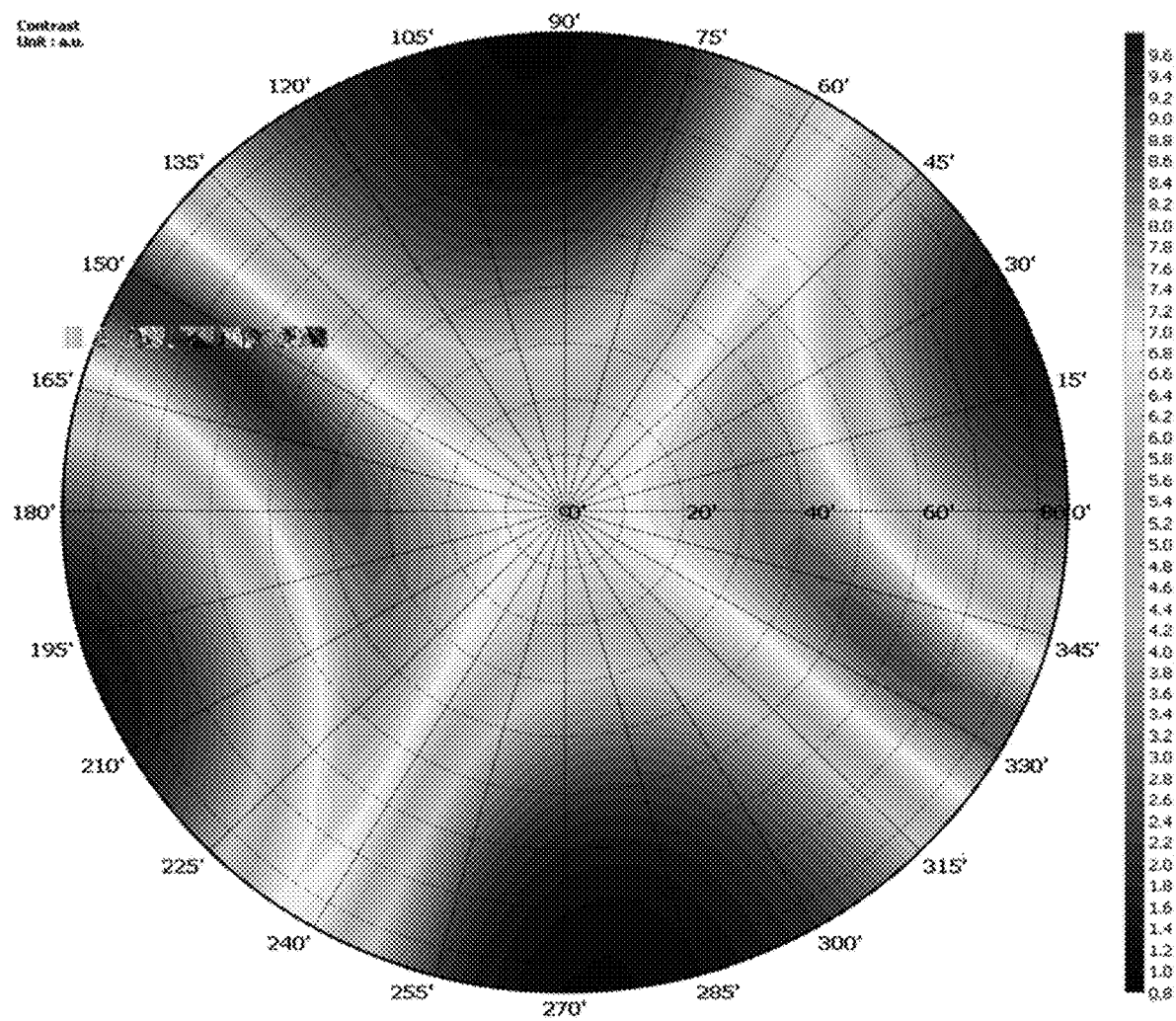

FIG. 31 to FIG. 37 are black-state simulation effect diagrams of the liquid crystal display panel shown in FIG. 27 at different viewing angles, and FIG. 38 to FIG. 44 are contrast simulation effect diagrams of the liquid crystal display panel shown in FIG. 27 at different viewing angles. As shown in FIG. 31 to FIG. 44, the first quarter-wave plate 11 and the second quarter-wave plate 21 each are made of a positive material. In FIG. 31 to FIG. 37, $\theta_4$ is 135°; $\theta_1$ is respectively 98.5°, 101.5°, 103.5°, 106.5°, 108.5°, 111.5°, and 116.5°; and $\theta_2$ is respectively 242°, 248°, 252°, 258°, 262°, 268°, 278°. It can be seen that when $\theta_1$ is 98.5° and 116.5° as shown in FIG. 31 and FIG. 37, respectively, light leakage in the black state is serious at some viewing angles, and the contrast is low at some viewing angles as shown in FIG. 38 and FIG. 44. When it is satisfied that $101.5°\leq\theta_1\leq111.5°$ as shown in FIG. 32 to FIG. 36, a viewing angle range of strong light (light-colored part) is significantly smaller than that in FIG. 11. A viewing angle range having a large contrast in FIG. 32 to FIG. 36 is significantly larger than that in FIG. 12. This shows that the liquid crystal display panel based on the A2-B1-C1 design has an increased contrast at a large viewing angle.

In an example, the liquid crystal display panel based on the A2-B1 design may further adopt a second scheme for setting the rotation direction. The second scheme for setting the rotation direction based on the A2-B1 design represents that ambient light emitted towards the liquid crystal display panel becomes right rotation circularly polarized light after passing through the first linear polarizer 41 and the first phase delay structure 1. The second scheme for setting the rotation direction based on the A2-B1 design is denoted by A2-B1-C2 in the following.

The liquid crystal display panel based on the A2-B1-C2 design can still be represented by the structure shown in FIG. 27. Different from the A2-B1-C1 design, in the A2-B1-C2 design, in a case where the first quarter-wave Plate 11 is made of a positive material, the angle $\theta_1$ formed between the slow axis of the first half-wave plate 12 and the first direction and the angle $\theta_2$ formed between the slow axis of the first quarter-wave plate 11 and the first direction are set to satisfy $\theta_2=2\theta_1+135°$ in this embodiment of the present disclosure. In a case where the first quarter-wave plate 11 is made of a negative material, the angle $\theta_1$ and the angle $\theta_2$ are set to satisfy $\theta_2=2\theta_1+45°$. In this way, ambient light emitted towards the liquid crystal display panel passes through the first linear polarizer 41, the first half-wave plate 12 and the first quarter-wave plate 11 to become right rotation circularly polarized light, thereby preventing the reflected ambient light from exiting. Moreover, in the A2-B1-C2 design, based on the above configuration, the first quarter-wave plate 11 and the first half-wave plate 12 can be equivalent to a single first quarter-wave plate 11 disposed outside the liquid crystal cell in the A1-B1-C2 design and in the A1-B2-C2 design.

In an example, ambient light is emitted towards the liquid crystal display panel and passes through the first linear polarizer 41 to become linear polarized light having a polarization direction being the second direction. Then, the linear polarized light having the polarization direction being the second direction is further emitted towards the liquid crystal display panel and passes through the first half-wave plate 12. It is still assumed that the slow axis of the first half-wave plate 12 is denoted by OL in FIG. 4, then the linear polarized light having the polarization direction being the second direction passes through the first half-wave plate 12. This process is represented in FIG. 4 by the point A rotating by 180° on the sphere surface of the Poincaré sphere about OL to the point M. That is, after passing through the first half-wave plate 12, the linear polarized light having the polarization direction being the second direction becomes linear polarized light having a polarization direction being the sixth direction.

Then, the linear polarized light having the polarization direction being the sixth direction passes through the first quarter-wave plate 11, and the polarization direction of the light rotates by 90° about the slow axis of the first quarter-wave plate 11.

In a case where the first quarter-wave plate 11 is made of a positive material and $\theta_2=2\theta_1+135°$, $2\theta_2=4\theta_1+270°=4\theta_1+180°+90°$. As shown in FIG. 5, $4\theta_1+180°=\angle DOM$, and $4\theta_1+180°+90°=\angle DOM+90°=\angle DOQ=\angle 2\theta_2$. Therefore, OQ represents the slow axis of the first quarter-wave plate 11 made of the positive material. Therefore, the polarization direction of the linear polarized light rotates clockwise by 90° about the slow axis of the first quarter-wave plate 11, and this process is represented in FIG. 4 by the point M rotating clockwise by 90° on the sphere surface of the Poincare sphere about OQ to the point C located on the positive axis of S3.

In a case where the first quarter-wave plate 11 is made of a negative material and $\theta_2=2\theta_1+45°$, $2\theta_2=4\theta_1+90°$. As shown in FIG. 5, $4\theta_1+90°=L$ $DOP=2\theta_2$. Therefore, OP represents the slow axis of the first quarter-wave plate 11 made of the negative material. Therefore, the polarization direction of the linear polarized light rotates counterclockwise by 90° about the slow axis of the first quarter-wave plate 11, and this process is represented in FIG. 4 by the point M rotating counterclockwise by 90° on the sphere surface of the Poincare sphere about OP to the point C located on the positive axis of S3.

That is, after passing through the first quarter-wave plate 11, the linear polarized light having a polarization direction being the sixth direction becomes right rotation circularly polarized light.

The right rotation circularly polarized light is subsequently reflected to become left rotation circularly polarized light. Considering changes of the observation position, it is still denoted by the point C on the Poincare sphere.

After light passes through the first quarter-wave plate 11, the polarization direction of the light rotates by 90° about the slow axis of the first quarter-wave plate 11.

In a case where the first quarter-wave plate 11 is made of a positive material and $\theta_2=2\theta_1+135°$, the slow axis of the first quarter-wave plate 11 is denoted by OQ in FIG. 4. The point C rotates clockwise by 90° about OQ to be located at the point N.

In a case where the first quarter-wave plate 11 is made of a negative material and $\theta_2=2\theta_1+45°$, the slow axis of the first quarter-wave plate 11 is denoted by OP in FIG. 4. The point C rotates counterclockwise by 90° about OP to be located at the point N, That is, after passing through the first quarter-wave plate 11, the reflected light becomes linear polarized light having a polarization direction being the seventh direction. Then, after the linear polarized light passes through the first half-wave plate 12, the polarization direction of the linear polarized light changes from the seventh direction to the first direction. Subsequently, the linear polarized light will be absorbed by the first linear polarizer 41 and cannot exit, thereby avoiding the reflected ambient light from exiting.

Based on the structure shown in FIG. 27, in a case where the A2-B1-C2 design is adopted and it is satisfied that $\theta_2=2\theta_1+135°$ (in a case where the first quarter-wave plate 11 is made of a positive material) or $\theta_2=2\theta_1+45°$ (in a case where the first quarter-wave plate 11 is made of a negative material), when setting the second quarter-wave plate 21 in the liquid crystal cell, for the second quarter-wave plate 21 made of a positive material, the angle $\theta_4$ formed between the slow axis of the second quarter-wave plate 21 and the first direction is set to satisfy $\theta_4=45°$, and for the second quarter-wave plate 21 made of a negative material, the 04 formed between the slow axis of the second quarter-wave plate 21 and the first direction is set to satisfy $\theta_4=135°$. In this way, the contrast of the liquid crystal display panel can be increased.

In an example, when the liquid crystal display panel is in a black state, after passing through the second linear polarizer 42, light emitted from the backlight source 5 becomes linear polarized light having a polarization direction being the first direction. The polarization direction of the linear polarized light does not change after passing through the liquid crystal layer 30. Then, the linear polarized light having the polarization direction being the first direction passes through the second quarter-wave plate 21, and the polarization direction of the light rotates by 90° about the slow axis of the second quarter-wave plate 21.

In a case where the second quarter-wave plate 21 is made of a positive material and the angle $\theta_4$ formed between the slow axis of the second quarter-wave plate 21 and the first direction is 45°, the linear polarized light having the polarization direction being the first direction passes through the second quarter-wave plate 21. The polarization direction rotates clockwise by 90° about the slow axis of the second quarter-wave plate 21, and this process is represented in FIG. 4 by the point D rotating clockwise by 90° on the sphere surface of the Poincaré sphere about OI to the point C.

In a case where the second quarter-wave plate 21 is made of a negative material and the angle formed $\theta_4$ between the slow axis of the second quarter-wave plate 21 and the first direction is 135°, the linear polarized light having the polarization direction being the first direction passes through the second quarter-wave plate 21. The polarization direction rotates counterclockwise by 90° about the slow axis of the second quarter-wave plate 21, and this process is represented in FIG. 4 by the point D rotating counterclockwise by 90° on the sphere surface of the Poincaré sphere about OK to the point C.

That is, after passing through the second quarter-wave plate 21, the linear polarized light having the polarization direction being the first direction becomes right rotation circularly polarized light. Then, the right rotation circularly polarized light passes through the first quarter-wave plate 11 and the first half-wave plate 12 to become linear polarized light having a polarization direction being the first direction. This process is the same as an emission process of the above-mentioned ambient light after being reflected by the liquid crystal display panel based on the A2-B1-C2 design, and will not be repeated herein. Subsequently, the linear polarized light is absorbed by the first linear polarizer 41 and cannot exit, thereby avoiding light leakage in a black state.

When the liquid crystal display panel is in a white state, after passing through the second linear polarizer 42, the light emitted from the backlight source 5 becomes linear polarized light having a polarization direction being the first direction. After passing through the liquid crystal layer 30, the polarization direction of the linear polarized light changes from the first direction to the second direction. Then, the linear polarized light having the polarization direction being the second direction passes through the second quarter-wave plate 21, and the polarization direction of the light rotates by 90° about the slow axis of the second quarter-wave plate 21.

In a case where the second quarter-wave plate 21 is made of a positive material and the angle formed between the slow axis of the second quarter-wave plate 21 and the first direction is 45°, the linear polarized light having the polarization direction being the second direction passes through the second quarter-wave plate 21. The polarization direction rotates 90° about the slow axis of the second quarter-wave plate 21, and this process is represented in FIG. 4 by the point A rotating clockwise by 90° on the sphere surface of the Poincare sphere about OI to the point B.

In a case where the second quarter-wave plate 21 is made of a negative material and the angle formed between the slow axis of the second quarter-wave plate 21 and the first direction is 135°, the linear polarized light having the polarization direction being the second direction passes through the second quarter-wave plate 21. The polarization direction rotates 90° about the slow axis of the second quarter-wave plate 21, and this process is represented in FIG. 4 by the point A rotating counterclockwise by 90° on the sphere surface of the Poincare sphere about OI to the point B.

That is, after passing through the second quarter-wave plate 21, the linear polarized light having the polarization direction being the second direction becomes left rotation circularly polarized light. Then, the left rotation circularly polarized light passes through the first quarter-wave plate 11, and the polarization direction of the light rotates by 90° about the slow axis of the first quarter-wave plate 11.

In a case where the first quarter-wave plate 11 is made of a positive material, the slow axis of the first quarter-wave plate 11 is denoted by OQ in FIG. 4, and the polarization direction of the light rotates by 90° about the slow axis of the first quarter-wave plate 11. This process is represented in FIG. 4 by the point B rotating clockwise by 90° on the sphere surface of the Poincare sphere about OQ to the point M.

In a case where the first quarter-wave plate 11 is made of a negative material, the slow axis of the first quarter-wave plate 11 is denoted by OP in FIG. 4, and the polarization direction of the light rotates by 90° about the slow axis of the first quarter-wave plate 11. This process is represented in FIG. 4 by the point B rotating counterclockwise by 90° on the sphere surface of the Poincare sphere about OP to the point M.

That is, after passing through the second quarter-wave plate 21, the left rotation circularly polarized light becomes linear polarized light having a polarization direction being the sixth direction. Then, the linear polarized light is further emitted towards the light-exiting side of the liquid crystal display panel and passes through the first half-wave plate 12 to become linear polarized light having a polarization direction being the second direction. Subsequently, the linear polarized light can exit without any loss when passing through the first linear polarizer 41, thereby achieving the brightness in the white state of the liquid crystal display panel and increasing the contrast of the liquid crystal display panel.

Figure 45:
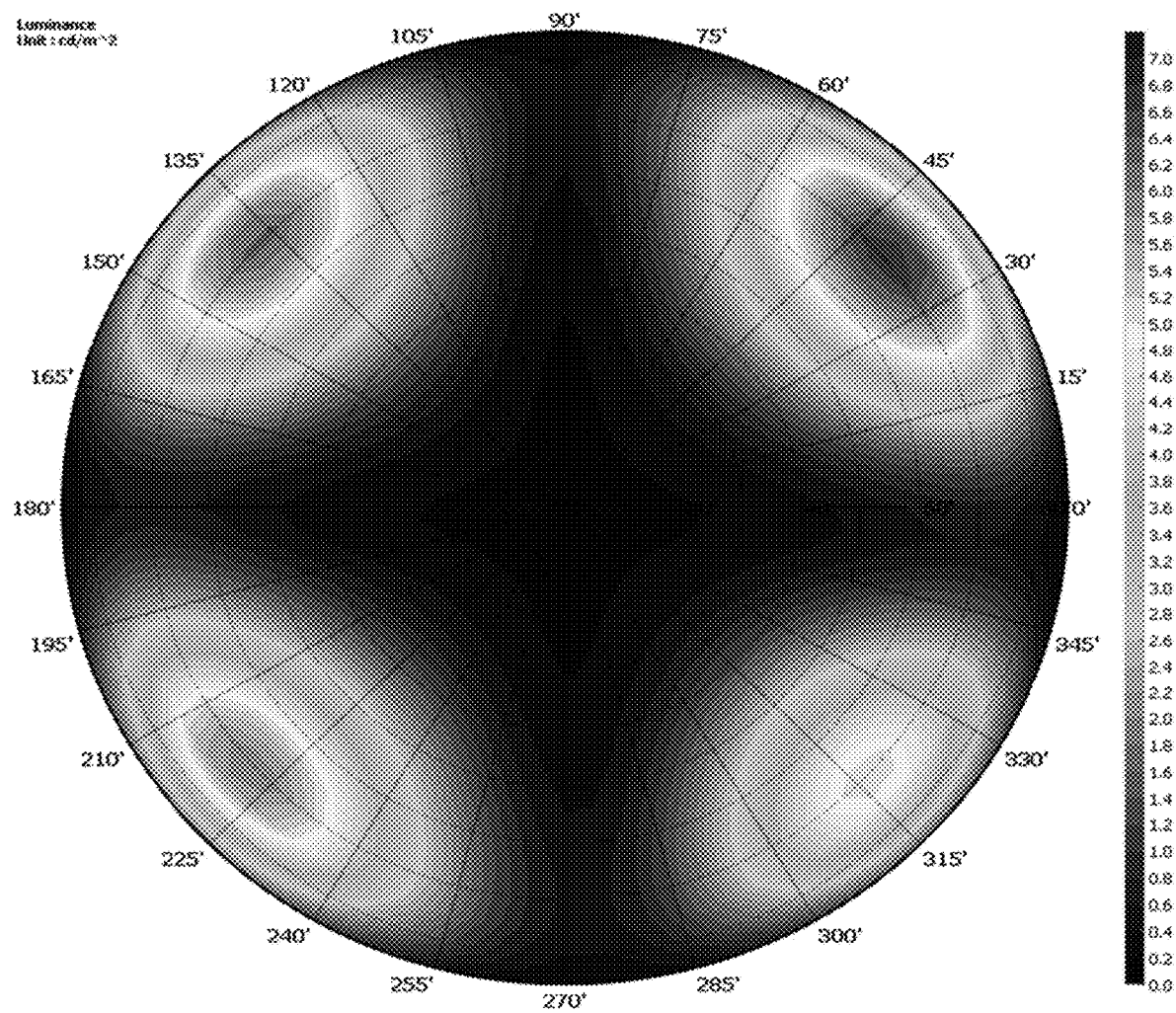
FIG. 45 is another black-state simulation effect diagram of the liquid crystal display panel shown in FIG. 27 at different viewing angles.
Figure 46:
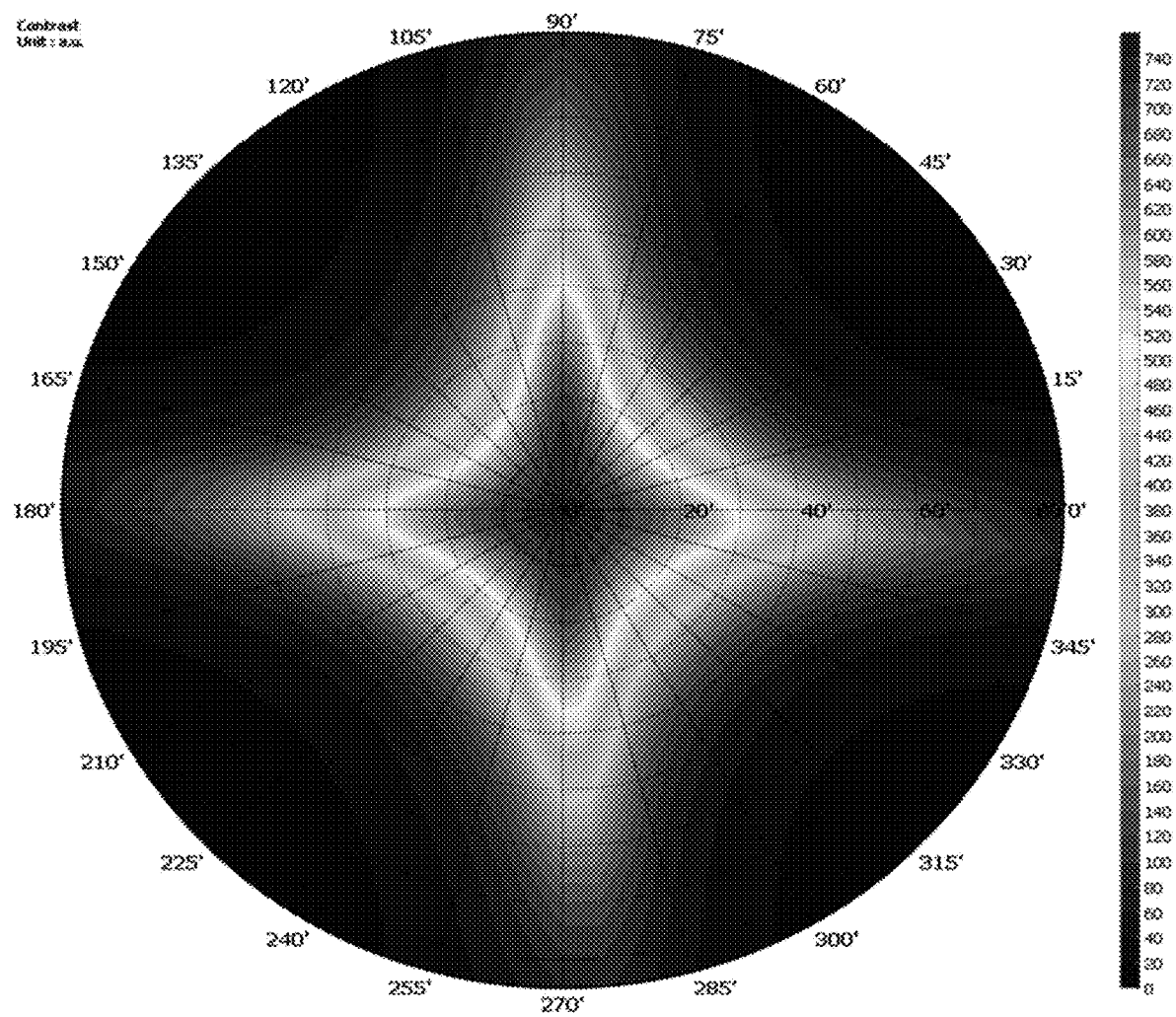
FIG. 46 is another contrast simulation effect diagram of the liquid crystal display panel shown in FIG. 27 at different viewing angles.

On this basis, in a case where the first quarter-wave plate 11 is made of a positive material, it is set to satisfy $284°\leq\theta_1\leq294°$ in this embodiment of the present disclosure. In a case where the first quarter-wave plate 11 is made of a negative material, it is set to satisfy $87.2°\leq\theta_1\leq97.2°$ in this embodiment of the present disclosure. The second quarter-wave plate 21 can cooperate with the second half-wave plate 22 to alleviate light leakage in the black state of the liquid crystal display panel at a large viewing angle and increase the contrast of the liquid crystal display panel at a large viewing angle. FIG. 45 is another black-state simulation effect diagram of the liquid crystal display panel shown in FIG. 27 at different viewing angles. FIG. 46 is another contrast simulation effect diagram of the liquid crystal display panel shown in FIG. 27 at different viewing angles. As shown in FIG. 45 and FIG. 46, the first quarter-wave plate 11 is made of a negative material, the second quarter-wave plate 21 is made of a positive material, $\theta_1=92.2°$, $\theta_2=229.4°$, and $\theta_4=45°$. It can be seen that a viewing angle range of the strong light (light-colored part) in FIG. 45 is smaller than that in FIG. 11. A viewing angle range where the contrast is large in FIG. 46 is significantly larger than that in FIG. 12. This shows that the liquid crystal display panel based on the A2-B1-C2 design has an increased contrast at a large viewing angle.

In an embodiment, the liquid crystal display panel based on the A2 design may further adopt a second scheme for setting positions of wave plates, and the second scheme for setting positions of wave plates based on the A2 design represents that the first quarter-wave plate 11 is located between the first half-wave plate 12 and the first linear polarizer 41. The second scheme for setting positions of wave plates based on the A2 design is denoted by A2-B2 in the following.

In an embodiment, the liquid crystal display panel based on the A2 design may further adopt a first scheme for setting the rotation direction, and the first scheme for setting the rotation direction based on the A2-B2 design represents that ambient light emitted towards the liquid crystal display panel becomes left rotation circularly polarized light after passing through the first linear polarizer 41 and the first phase delay structure 1. The first scheme for setting the rotation direction based on the A2-B2 design is denoted by A2-B2-C1 in the following.

Figure 47:
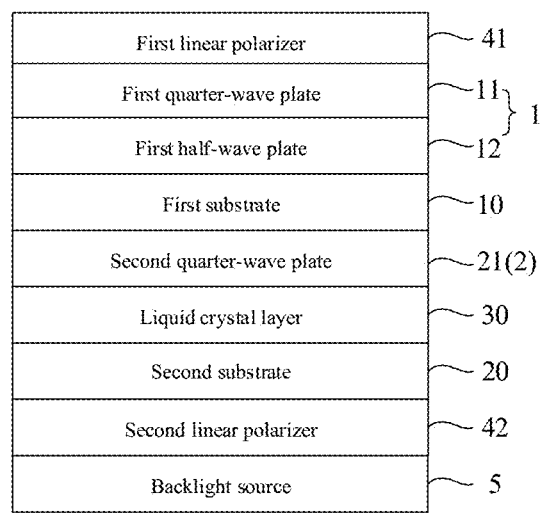
FIG. 47 is a schematic cross-sectional view of still another liquid crystal display panel according to an embodiment of the present disclosure.

FIG. 47 is a schematic cross-sectional view of still another liquid crystal display panel according to an embodiment of the present disclosure. In an example, as shown in FIG. 47, the liquid crystal display panel adopts the above-mentioned A2-B2-C1 design, that is, the second half-wave plate 22 is disposed in the liquid crystal cell of the liquid crystal display panel and there is no first half-wave plate 12 disposed outside the liquid crystal cell. In addition, relative positions of the first quarter-wave plate 11 and the first half-wave plate 12 change compared to the structure shown in FIG. 27. As shown in FIG. 47, the first quarter-wave plate 11 is located between the first linear polarizer 41 and the first half-wave plate 12. After passing through the first linear polarizer 41, the first quarter-wave plate 11, and the first half-wave plate 12, ambient light emitted towards the liquid crystal display panel becomes left rotation circularly polarized light.

In an embodiment, when the liquid crystal display panel adopts the A2-B2-C1 design based on the structure shown in FIG. 47, in a case where the first quarter-wave plate 11 is made of a positive material, the angle $\theta_2$ formed between the slow axis of the first quarter-wave plate 11 and the first direction is set to satisfy $\theta_2=135°$ in this embodiment of the present disclosure. In a case where the first quarter-wave plate 11 is made of a negative material, the angle $\theta_2$ formed between the slow axis of the first quarter-wave plate 11 and the first direction is set to satisfy $\theta_2=45°$ in this embodiment of the present disclosure. This can prevent the reflected ambient light from exiting from the liquid crystal display panel.

In an example, ambient light is emitted towards the liquid crystal display panel and passes through the first linear polarizer 41 to become linear polarized light having a polarization direction being the second direction. Then, the linear polarized light having the polarization direction being the second direction is further emitted towards the liquid crystal display panel and passes through the first quarter-wave plate 11, and the polarization direction rotates 90° about the slow axis of the first quarter-wave plate 11.

In a case where the first quarter-wave plate 11 is made of a positive material and the angle $\theta_2$ formed between the slow axis of the first quarter-wave plate 11 and the first direction is 135°, the polarization direction rotates by 90° about the slow axis of the first quarter-wave plate 11. This process is represented in FIG. 4 by the point A rotating clockwise by 90° on the sphere surface of the Poincaré sphere about OK to the point C.

In a case where the first quarter-wave plate 11 is made of a negative material and the angle $\theta_2$ formed between the slow axis of the first quarter-wave plate 11 and the first direction is 45°, the polarization direction rotates by 90° about the slow axis of the first quarter-wave plate 11. This process is represented in FIG. 4 by the point A rotating counterclockwise by 90° on the sphere surface of the Poincaré sphere about OI to the point C.

That is, after passing through the first quarter-wave plate 11, the linear polarized light having the polarization direction being the second direction becomes right rotation circularly polarized light. Then, the right rotation circularly polarized light is further emitted towards the liquid crystal display panel and passes through the first half-wave plate 12 to become left rotation circularly polarized light.

The left rotation circularly polarized light is reflected to become right rotation circularly polarized light. Considering changes of the observation position, it is still denoted by the point B in FIG. 4.

When being observed from the light-exiting side of the liquid crystal display panel, the left rotation circularly polarized light is emitted towards the light-exiting side of the liquid crystal display panel, and after passing through the first half-wave plate 12, the polarization direction of the light rotates by 180° about the slow axis of the first half-wave plate 12. This process is represented in FIG. 4 by the point B moving to the point C, that is, the light becomes right rotation circularly polarized light.

Then, the right rotation circularly polarized light is further emitted towards the light-exiting side of the liquid crystal display panel, and after passing through the first quarter-wave plate 11, the polarization direction of the light rotates by 90° about the slow axis of the first quarter-wave plate 11.

In a case where the first quarter-wave plate 11 is made of a positive material and the angle $\theta_2$ formed between the slow axis of the first quarter-wave plate 11 and the first direction is 135°, the polarization direction rotates by 90° about the slow axis of the first quarter-wave plat 11. This process is represented in FIG. 4 by the point C rotating clockwise by 90° on the sphere surface of the Poincaré sphere about OK to the point D.

In a case where the first quarter-wave plate 11 is made of a negative material and the angle $\theta_2$ formed between the slow axis of the first quarter-wave plate 11 and the first direction is 45°, the polarization direction rotates by 90° about the slow axis of the first quarter-wave plat 11. This process is represented in FIG. 4 by the point C rotating counterclockwise by 90° on the sphere surface of the Poincaré sphere about OI to the point D.

That is, after passing through the first quarter-wave plate 11, the right rotation circularly polarized light becomes linear polarized light having a polarization direction being the first direction. Subsequently, the linear polarized light is absorbed by the first linear polarizer 41 and cannot exit, thereby preventing the reflected ambient light from exiting from the liquid crystal display panel.

Based on the structure shown in FIG. 47, in a case where the A2-B2-C1 design is adopted and it is satisfied that $\theta_2=135°$ (in a case where the first quarter-wave plate 11 is made of a positive material) or $\theta_2=45°$ (in a case where the first quarter-wave plate 11 is made of a negative material), when setting the second quarter-wave plate 21 in the liquid crystal cell, for the second quarter-wave plate 21 made of a positive material, the angle $\theta_4$ formed between the slow axis of the second quarter-wave plate 21 and the first direction is set to satisfy $\theta_4=135°$, and for the second quarter-wave plate 21 made of a negative material, the angle $\theta_4$ formed between the slow axis of the second quarter-wave plate 21 and the first direction is set to satisfy $\theta_4=45°$. In this way, the contrast of the liquid crystal display panel can be increased.

In an example, when the liquid crystal display panel is in a black state, after passing through the second linear polarizer 42 and the second quarter-wave plate 21, the light emitted from the backlight source 5 becomes left rotation circularly polarized light. This process is the same as a scheme based on the above-mentioned A2-B1-C1 design, and will not be repeated herein.

Then, after passing through the first half-wave plate 12 and the first quarter-wave plate 11, the left rotation circularly polarized light becomes linear polarized light having a polarization direction being the first direction. This process is the same as an emission process of the above-mentioned ambient light after being reflected by the liquid crystal display panel based on the A2-B2-C1 design, and will not be repeated herein. Subsequently, the linear polarized light is absorbed by the first linear polarizer 41 and cannot exit, thereby avoiding light leakage in the black state.

When the liquid crystal display panel is in a white state, after passing through the second linear polarizer 42, the liquid crystal layer 30 and the second quarter-wave plate 21, the light emitted from the backlight source 5 becomes right rotation circularly polarized light. This process is the same as a scheme based on the above-mentioned A2-B1-C1 design, and will not be repeated herein.

Then, after passing through the first half-wave plate 12, the right rotation circularly polarized light becomes left rotation circularly polarized light. Then, the left rotation circularly polarized light passes through the first quarter-wave plate 11, and the polarization direction of the light rotates by 90° about the slow axis of the first quarter-wave plate 11.

In a case where the first quarter-wave plate 11 is made of a positive material and the angle $\theta_2$ formed between the slow axis of the first quarter-wave plate 11 and the first direction is 135°, the polarization direction of the light rotates 90° about the slow axis of the first quarter-wave plate 11. This process is represented in FIG. 4 by the point B rotating clockwise by 90° on the sphere surface of the Poincare sphere about OK to the point A.

In a case where the first quarter-wave plate 11 is made of a negative material and the angle $\theta_2$ formed between the slow axis of the first quarter-wave plate 11 and the first direction is 45°, the polarization direction of the light rotates 90° about the slow axis of the first quarter-wave plate 11. This process is represented in FIG. 4 by the point B rotating counterclockwise by 90° on the sphere surface of the Poincare sphere about OI to the point A.

That is, after passing through the first quarter-wave plate 11, the left rotation circularly polarized light becomes linear polarized light having a polarization direction being the second direction. The linear polarized light can pass through the first linear polarizer 41 without any loss. Therefore, the brightness in the white state of the liquid crystal display panel can be ensured, thereby increasing the contrast.

On this basis, the angle $\theta_1$ formed between the slow axis of the first half-wave plate 12 and the first direction is set as 0° or 90° in this embodiment of the present disclosure, so as to alleviate light leakage in the black state of the liquid crystal display panel at a large viewing angle and increase the contrast of the liquid crystal display panel at a large viewing angle.

Figure 48:
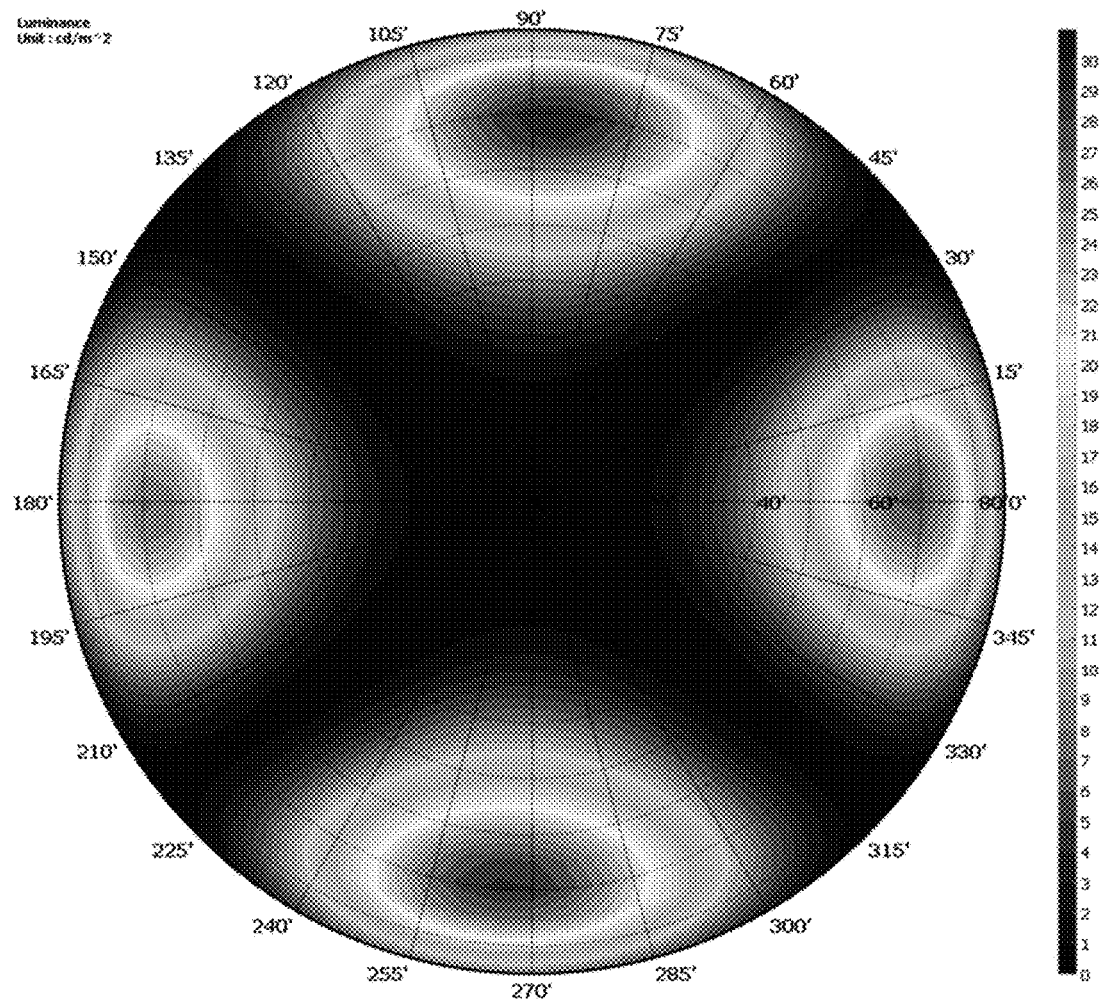
FIG. 48 is a black-state simulation effect diagram of the liquid crystal display panel shown in FIG. 47 at different viewing angles.
Figure 49:
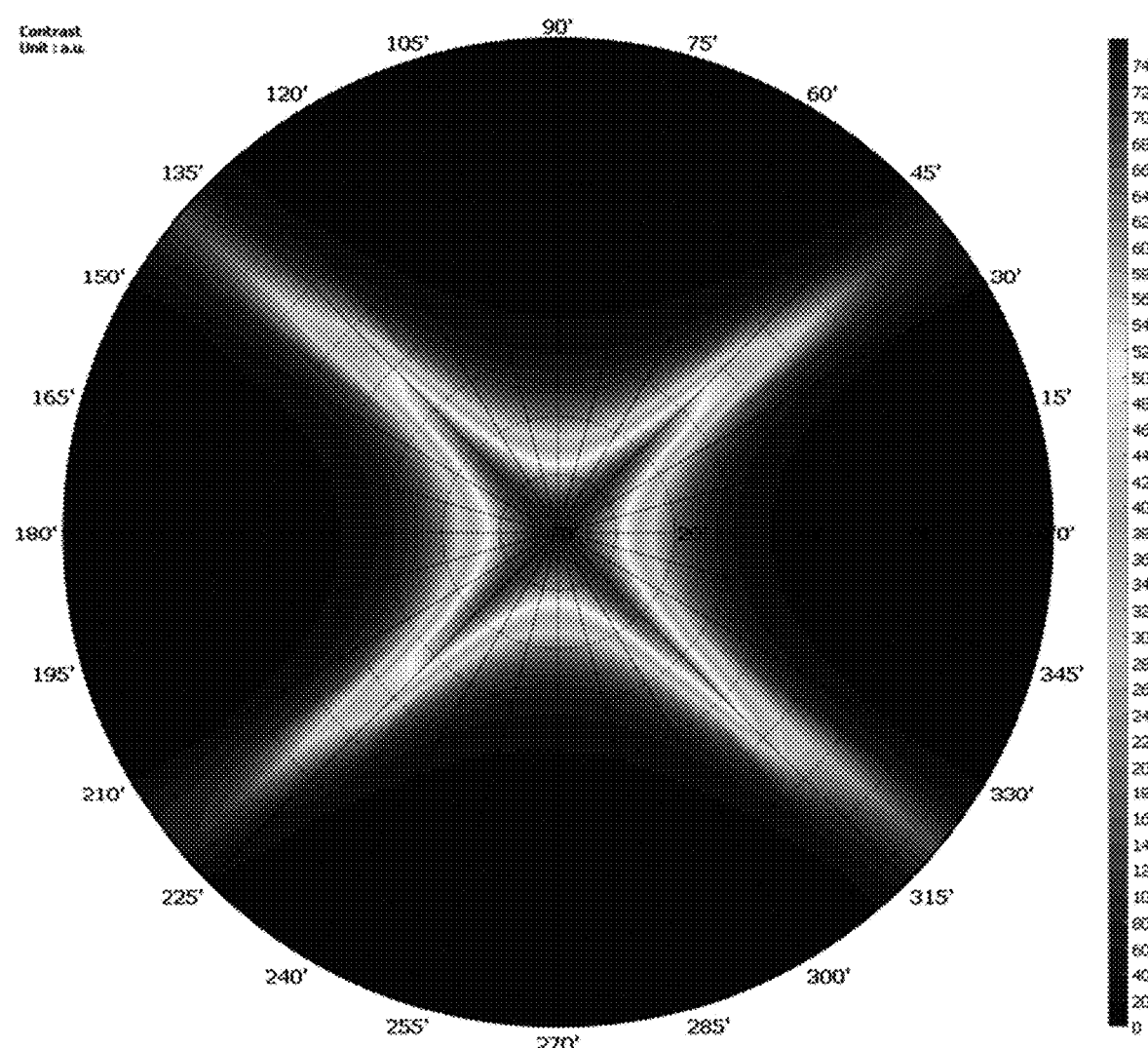
FIG. 49 is a contrast simulation effect diagram of the liquid crystal display panel shown in FIG. 47 at different viewing angles.
Figure 50:
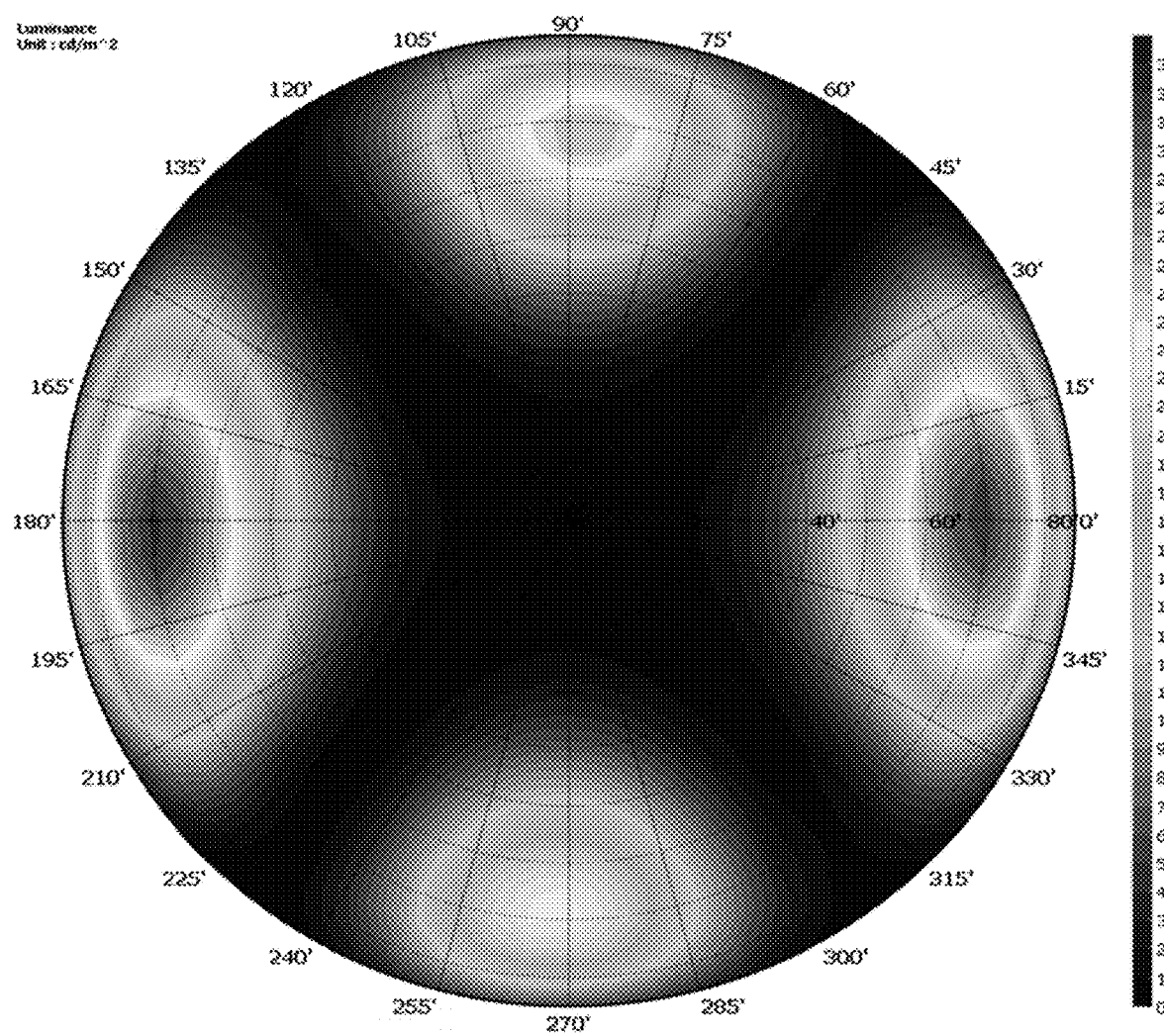
FIG. 50 is another black-state simulation effect diagram of the liquid crystal display panel shown in FIG. 47 at different viewing angles.
Figure 51:
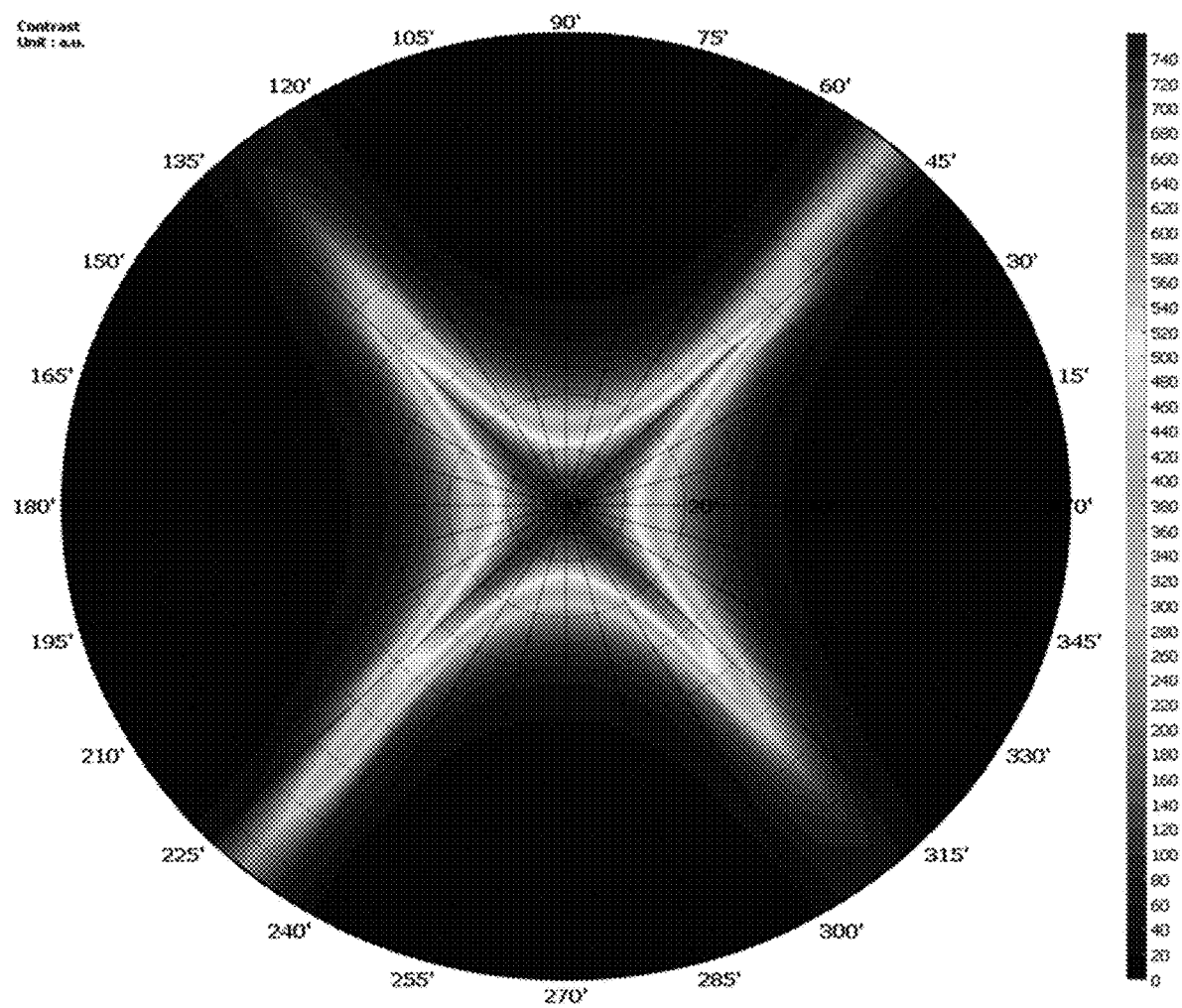
FIG. 51 is another contrast simulation effect diagram of the liquid crystal display panel shown in FIG. 47 at different viewing angles.

FIG. 48 is a black-state simulation effect diagram of the liquid crystal display panel shown in FIG. 47 at different viewing angles, and FIG. 49 is a contrast simulation effect diagram of the liquid crystal display panel shown in FIG. 47 at different viewing angles. As shown in FIG. 48 and FIG. 49, the first quarter-wave plate 11 and the second quarter-wave plate 21 each are made of a positive material, $\theta_1=0°$, $\theta_2=135°$, and $\theta_4=135°$. FIG. 50 is another black-state simulation effect diagram of the liquid crystal display panel shown in FIG. 47 at different viewing angles, and FIG. 51 is another contrast simulation effect diagram of the liquid crystal display panel shown in FIG. 47 at different viewing angles. As shown in FIG. 50 and FIG. 51, the first quarter-wave plate 11 and the second quarter-wave plate 21 each are made of a positive material, $\theta_1=90°$, $\theta_2=135°$, and $\theta_4=135°$. Comparing with FIG. 11 and FIG. 12, it can be seen that a viewing angle range of strong light in each of FIG. 48 and FIG. 50 is significantly smaller than that in FIG. 11, and a viewing angle range having a large contrast in each of FIG. 49 and FIG. 51 is significantly larger than that in FIG. 12. This shows that the liquid crystal display panel based on the A2-B2-C1 design has an increased contrast at a large viewing angle.

In an example, the liquid crystal display panel based on the A2-B2 design may further adopt a second scheme for setting the rotation direction, and the second scheme for setting the rotation direction based on the A2-B2 design represents that ambient light emitted towards the liquid crystal display panel becomes right rotation circularly polarized light after passing through the first linear polarizer 41 and the first phase delay structure 1. The second scheme for setting the rotation direction based on the A2-B2 design is denoted by A2-B2-C2 in the following.

The liquid crystal display panel based on the A2-B2-C2 design can still be represented by the structure shown in FIG. 47. Different from the A2-B2-C1 design, in the A2-B2-C2 design, in a case where the first quarter-wave plate 11 is made of a positive material, the angle $\theta_2$ formed between the first quarter-wave plate 11 and the first direction is set as 45°, and in a case where the first quarter-wave plate 11 is made of a negative material, the angle $\theta_2$ is set as 135°. In this way, after passing through the first linear polarizer 41, the first quarter-wave plate 11 and the first half-wave plate 12, ambient light emitted towards the liquid crystal display panel becomes right rotation circularly polarized light, thereby preventing the reflected ambient light from exiting.

In an example, after passing through the first linear polarizer 41, ambient light emitted towards the liquid crystal display panel becomes linear polarized light having a polarization direction being the second direction. The linear polarized light having the polarization direction being the second direction passes through the first quarter-wave plate 11, and the polarization direction rotates by 90° about the slow axis of the first quarter-wave plate 11.

In a case where the first quarter-wave plate 11 is made of a positive material and the angle $\theta_2$ formed between the slow axis of the first quarter-wave plate 11 and the first direction is 45°, after passing through the first quarter-wave plate 11, the linear polarized light having a polarization direction being the second direction becomes left rotation circularly polarized light. After passing through the first half-wave plate 12, the left rotation circularly polarized light becomes right rotation circularly polarized light. The right rotation circularly polarized light becomes left rotation circularly polarized light after being reflected. Considering changes of the observation position, it is still denoted by the point C on the Poincare sphere shown in FIG. 4. When being observed from the light-exiting side of the liquid crystal display panel, the right rotation circularly polarized light is emitted towards the light-exiting side of the liquid crystal display panel and passes through the first half-wave plate 12 to become left rotation circularly polarized light. Then, the left rotation circularly polarized light is further emitted towards the light-exiting side of the liquid crystal display panel, and after passing through the first quarter-wave plate 11, the polarization direction of the light rotates clockwise by 90° about the slow axis of the first quarter-wave plate 11. This process is represented on the Poincaré sphere shown in FIG. 4 by the point B rotating clockwise by 90° on the sphere surface of the Poincaré sphere about OI to the point D.

In a case where the first quarter-wave plate 11 is made of a negative material and the angle $\theta_2$ formed between the slow axis of the first quarter-wave plate 11 and the first direction is 135°, after passing through the first quarter-wave plate 11, the linear polarized light having a polarization direction being the second direction becomes left rotation circularly polarized light. After passing through the first half-wave plate 12, the left rotation circularly polarized light becomes right rotation circularly polarized light. The right rotation circularly polarized light becomes left rotation circularly polarized light after being reflected. Considering changes of the observation position, it is still denoted by the point C on the Poincaré sphere shown in FIG. 4. When being observed from the light-exiting side of the liquid crystal display panel, the right rotation circularly polarized light is emitted towards the light-exiting side of the liquid crystal display panel and passes through the first half-wave plate 12 to become left rotation circularly polarized light. Then, the left rotation circularly polarized light is further emitted towards the light-exiting side of the liquid crystal display panel, and after passing through the first quarter-wave plate 11, the polarization direction of the light rotates counterclockwise by 90° about the slow axis of the first quarter-wave plate 11 to the point D.

That is, after passing through the first quarter-wave plate 11, the left rotation circularly polarized light becomes linear polarized light having a polarization direction being the first direction. Subsequently, the linear polarized light is absorbed by the first linear polarizer 41 and cannot exit, thereby preventing the reflected ambient light from exiting from the liquid crystal display panel.

Based on the structure shown in FIG. 47, in a case where the A2-B2-C2 design is adopted and it is satisfied that $\theta_2=45°$ (in a case where the first quarter-wave plate 11 is made of a positive material) or $\theta_2=135°$ (in a case where the first quarter-wave plate 11 is made of a negative material), when setting the second quarter-wave plate 21 in the liquid crystal cell, for the second quarter-wave plate 21 made of a positive material, the angle $\theta_4$ formed between the slow axis of the second quarter-wave plate 21 and the first direction is set as 45°, and for the second quarter-wave plate 21 made of a negative material, the angle $\theta_4$ formed between the slow axis of the second quarter-wave plate 21 and the first direction is set as 135°. In this way, the contrast of the liquid crystal display panel can be increased.

In an example, when the liquid crystal display panel is in a black state, after passing through the second linear polarizer 42, light emitted from the backlight source 5 becomes linear polarized light having a polarization direction being the first direction. The polarization direction of linear polarized light does not change after the linear polarized light passes through the liquid crystal layer 30. Then, after passing through the second quarter-wave plate 21, the linear polarized light having the polarization direction being the first direction becomes right rotation circularly polarized light. This process is the same as a scheme based on the above-mentioned A2-B1-C2 design, and will not be repeated herein.

Then, after passing through the first half-wave plate 12 and the first quarter-wave plate 11, the right rotation circularly polarized light becomes linear polarized light having a polarization direction being the first direction. This process is the same as an emission process of the above-mentioned ambient light after being reflected by the liquid crystal display panel based on the A2-B2-C2 design, and will not be repeated herein. Subsequently, the linear polarized light is absorbed by the first linear polarizer 41 and cannot exit, thereby avoiding light leakage in the black state.

When the liquid crystal display panel is in a white state, after passing through the second linear polarizer 42, the liquid crystal layer 30 and the second quarter-wave plate 21, the light emitted from the backlight source 5 becomes left rotation circularly polarized light. This process is the same as a scheme based on the above-mentioned A2-B1-C2 design, and will not be repeated herein.

Then, after passing through the first half-wave plate 12, the left rotation circularly polarized light becomes right rotation circularly polarized light. Then, the left rotation circularly polarized light passes through the first quarter-wave plate 11, and the polarization direction of the light rotates by 90° about the slow axis of the first quarter-wave plate 11.

In a case where the first quarter-wave plate 11 is made of a positive material and the angle $\theta_2$ formed between the slow axis of the first quarter-wave plate 11 and the first direction is 45°, the polarization direction of the light rotates 90° about the slow axis of the first quarter-wave plate 11. This process is represented in FIG. 4 by the point C rotating clockwise by 90° on the sphere surface of the Poincaré sphere about OI to the point A.

In a case where the first quarter-wave plate 11 is made of a negative material and the angle $\theta_2$ formed between the slow axis of the first quarter-wave plate 11 and the first direction is 135°, the polarization direction of the light rotates 90° about the slow axis of the first quarter-wave plate 11. This process is represented in FIG. 4 by the point C rotating counterclockwise by 90° on the sphere surface of the Poincaré sphere about OK to the point A.

That is, after passing through the first quarter-wave plate 11, the right rotation circularly polarized light becomes linear polarized light having a polarization direction being the second direction. The linear polarized light can pass through the first linear polarizer 41 without any loss. Therefore, the brightness in the white state of the liquid crystal display panel can be ensured, thereby increasing the contrast.

On this basis, the angle $\theta_1$ formed between the slow axis of the first half-wave plate 12 and the first direction is set as 0° or 90° in this embodiment of the present disclosure, so as to alleviate light leakage in the black state of the liquid crystal display panel at a large viewing angle and increase the contrast of the liquid crystal display panel at a large viewing angle.

Figure 52:
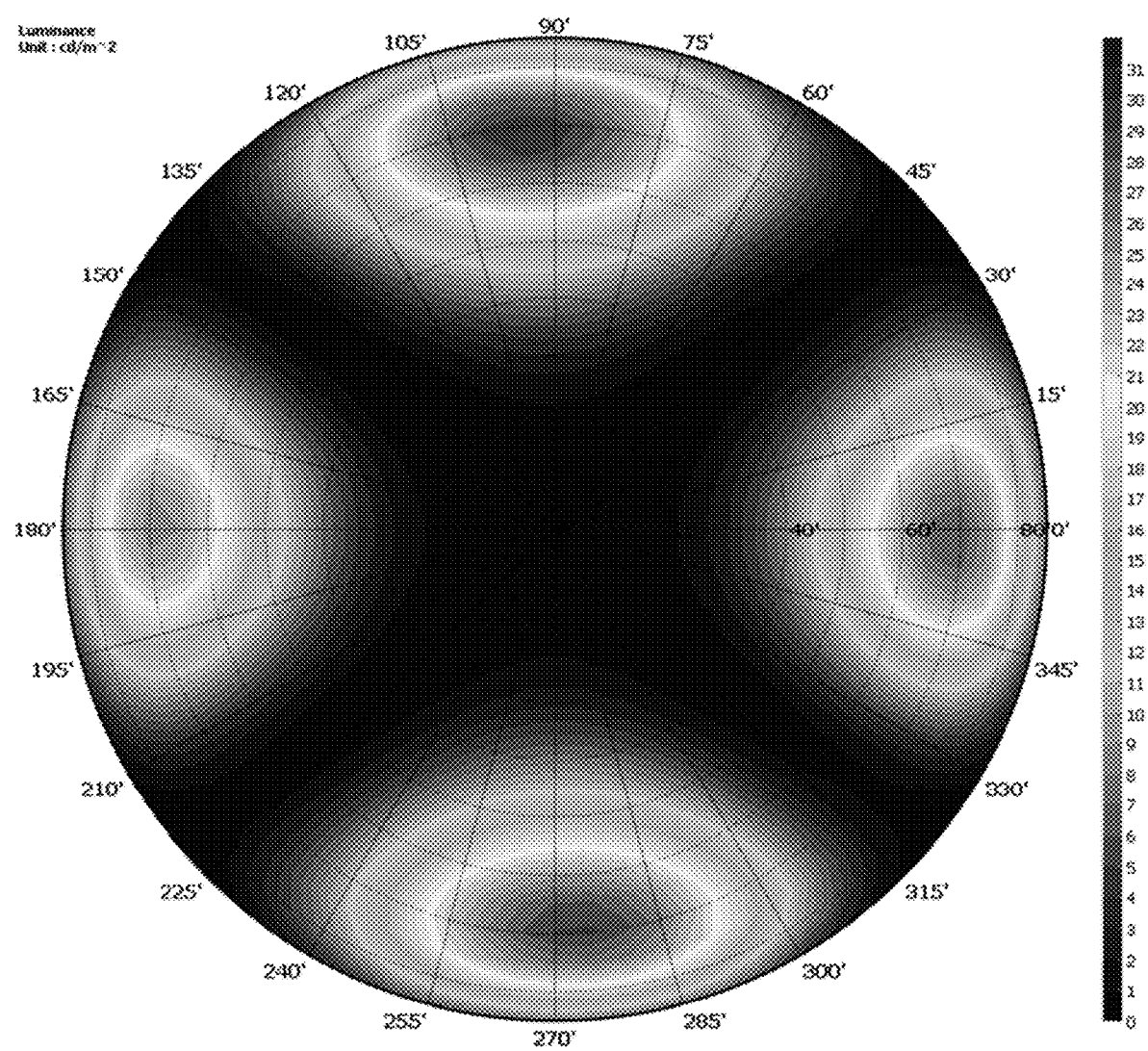
FIG. 52 is still another black-state simulation effect diagram of the liquid crystal display panel shown in FIG. 47 at different viewing angles.
Figure 53:
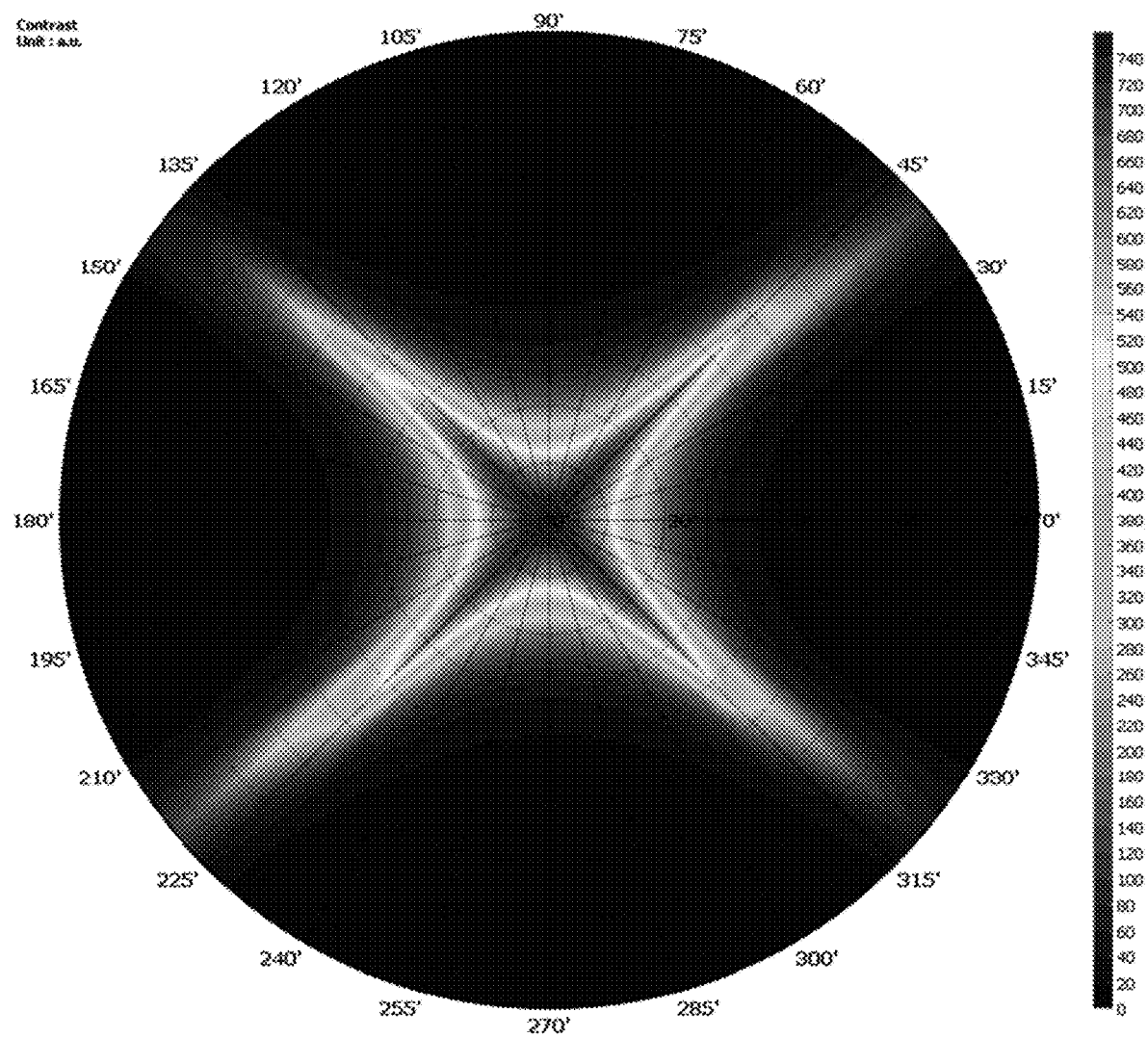
FIG. 53 is still another contrast simulation effect diagram of the liquid crystal display panel shown in FIG. 47 at different viewing angles.
Figure 54:
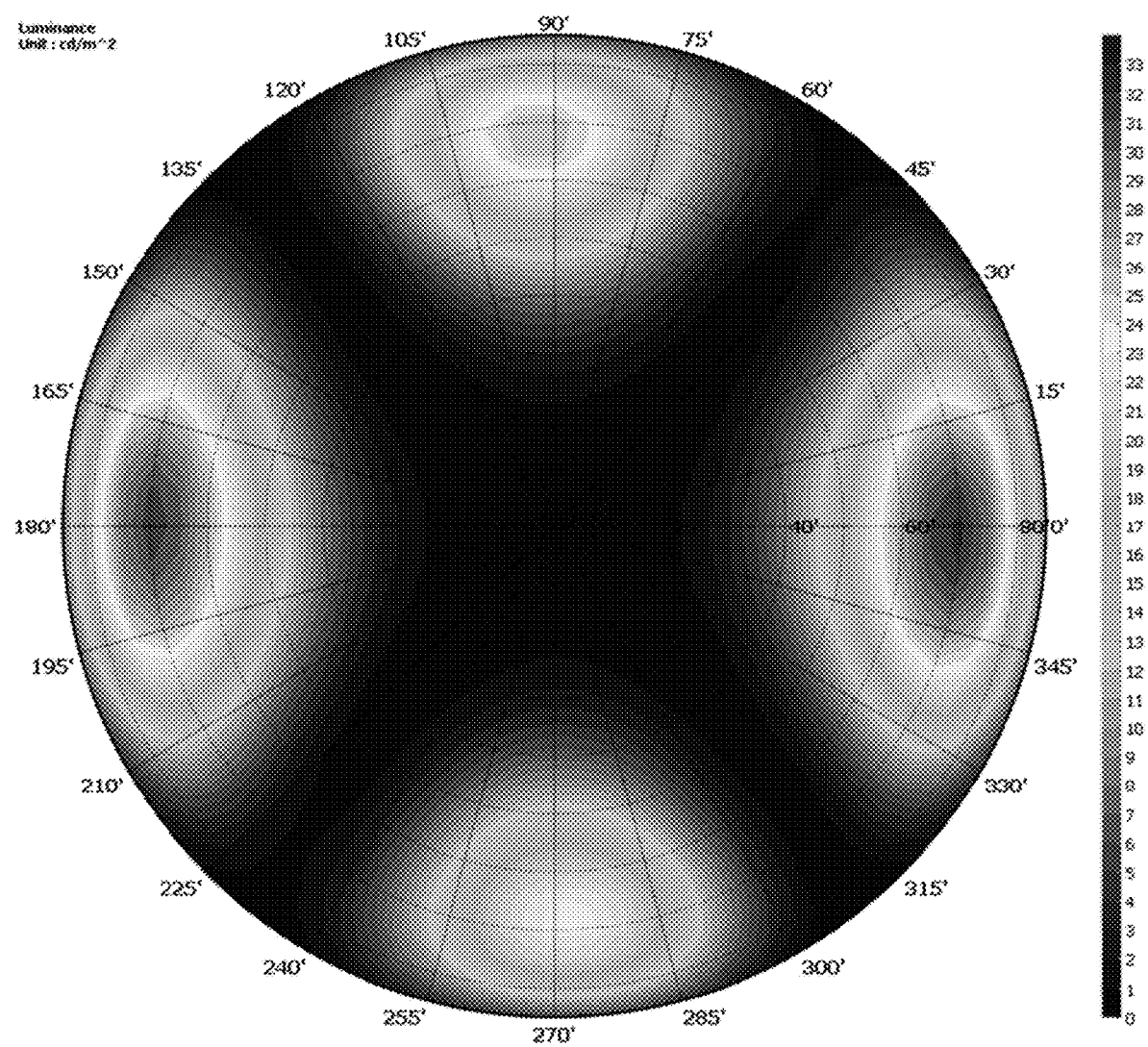
FIG. 54 is still another black-state simulation effect diagram of the liquid crystal display panel shown in FIG. 47 at different viewing angles.
Figure 55:
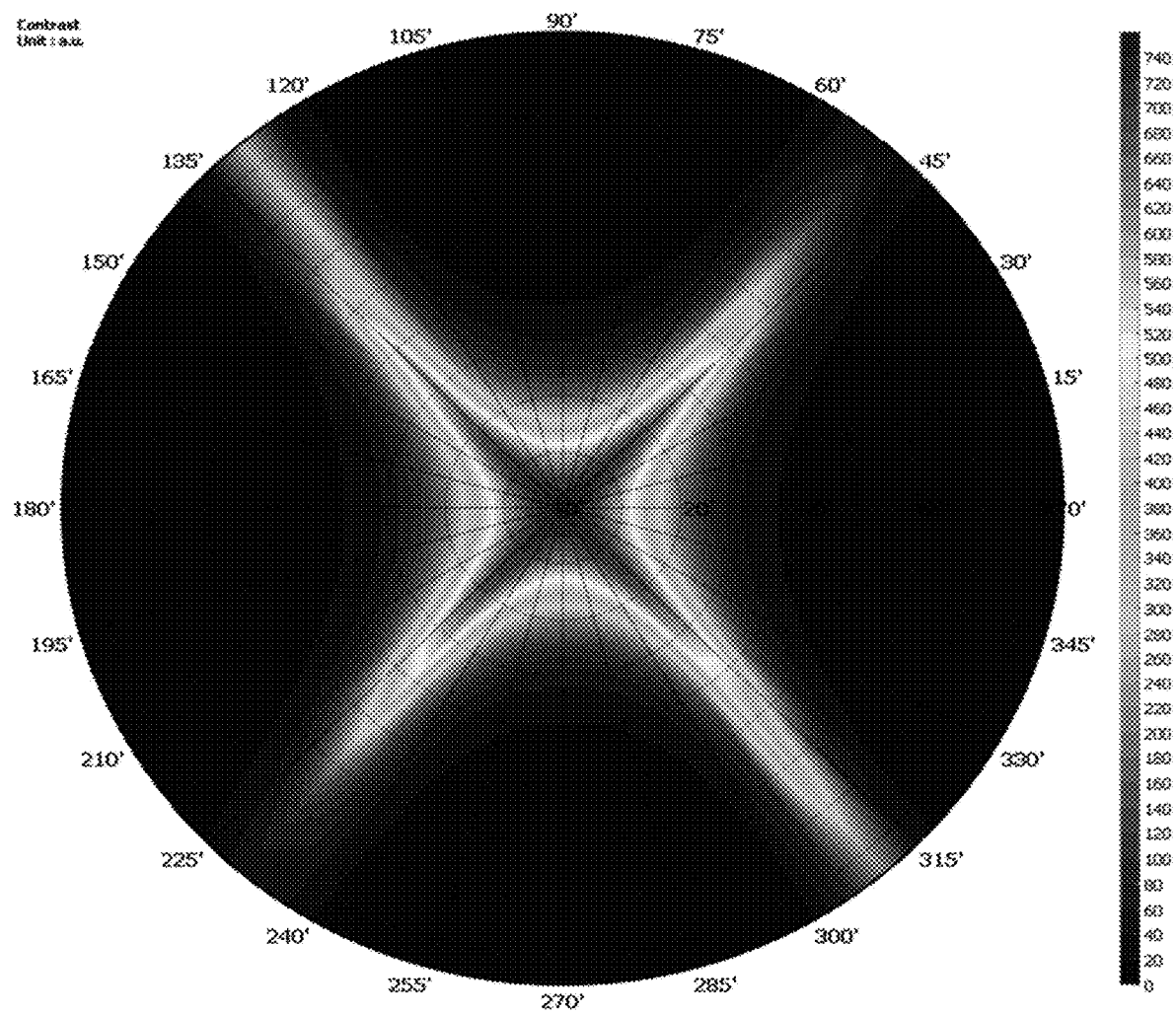
FIG. 55 is still another contrast simulation effect diagram of the liquid crystal display panel shown in FIG. 47 at different viewing angles.

FIG. 52 is still another black-state simulation effect diagram of the liquid crystal display panel shown in FIG. 47 at different viewing angles, and FIG. 53 is still another contrast simulation effect diagram of the liquid crystal display panel shown in FIG. 47 at different viewing angles. As shown in FIG. 52 and FIG. 53, the first quarter-wave plate 11 and the second quarter-wave plate 21 each are made of a positive material, $\theta_1=0°$, $\theta_2=45°$, and $\theta_4=45°$. FIG. 54 is still another black-state simulation effect diagram of the liquid crystal display panel shown in FIG. 47 at different viewing angles, and FIG. 55 is still another contrast simulation effect diagram of the liquid crystal display panel shown in FIG. 47 at different viewing angles. As shown in FIG. 54 and FIG. 55, the first quarter-wave plate 11 and the second quarter-wave plate 21 each are made of a positive material, $\theta_1=90°$, $\theta_2=45°$, and $\theta_4=45°$. Comparing with FIG. 11 and FIG. 12, it can be seen that a viewing angle range of strong light in each of FIG. 52 and FIG. 54 is significantly smaller than that in FIG. 11, and a viewing angle range having a large contrast in each of FIG. 53 and FIG. 55 is significantly larger than that in FIG. 12. This shows that the liquid crystal display panel based on the A2-B2-C2 design has an increased contrast at a large viewing angle.

Figure 56:
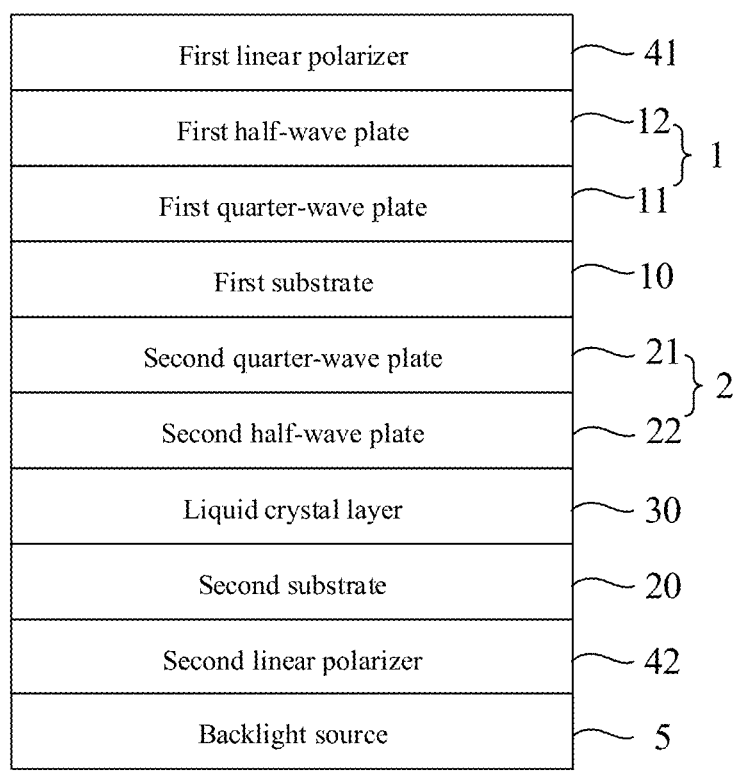
FIG. 56 is a schematic cross-sectional view of still another liquid crystal display panel according to an embodiment of the present disclosure.

FIG. 56 is a schematic cross-sectional view of still another liquid crystal display panel according to an embodiment of the present disclosure. As shown in FIG. 56, in this embodiment of the present disclosure, the liquid crystal display panel may further adopt a third scheme for setting the number of wave plates. The third scheme for setting the number of wave plates represents that the second quarter-wave plate 21 and the second half-wave plate 22 are disposed in the liquid crystal cell, and the first quarter-wave plate 11 and the first half-wave plate 12 are disposed outside the liquid crystal cell. The third scheme for setting the number of wave plates is denoted by A3 in the following.

In an embodiment, the liquid crystal display panel based on the A3 design may further adopt a first scheme for setting positions of wave plates, and the first scheme for setting positions of wave plates based on the A3 design represents that the second half-wave plate 22 of the two wave plates in the liquid crystal cell is located between the second quarter-wave plate 21 and the second linear polarizer 42, and the first half-wave plate 12 of the two wave plates disposed outside the liquid crystal cell is located between the first quarter-wave plate 11 and the first linear polarizer 41. The first scheme for setting positions of wave plates based on the A3 design is denoted by A3-B1 in the following.

In an embodiment, the liquid crystal display panel based on the A3-B1 design may further adopt a first scheme for setting the rotation direction. The first scheme for setting the rotation direction based on the A3-B1 design represents that ambient light emitted towards the liquid crystal display panel becomes left rotation circularly polarized light after passing through the first linear polarizer 41 and the first phase delay structure 1. The first scheme for setting the rotation direction based on the A3-B1 design is denoted by A3-B1-C1 in the following.

When the liquid crystal display panel adopts the A3-B1-C1 design, in a case where the first quarter-wave plate 11 is made of a positive material, it is satisfied that $\theta_2=2\theta_1+45°$ in this embodiment of the present disclosure, and in a case where the first quarter-wave plate 11 is made of a negative material, it is satisfied that $\theta_2=2\theta_1+135°$ in this embodiment of the present disclosure. In this way, after passing through the first linear polarizer 41, the first half-wave plate 12 and the first quarter-wave plate 11, ambient light emitted towards the liquid crystal display panel becomes left rotation circularly polarized light, thereby preventing the reflected ambient light from exiting. A principle of preventing the reflected ambient light from exiting from the liquid crystal display panel is the same as that based on the above-mentioned A2-B1-C1 design, and will not be repeated herein.

Based on the structure shown in FIG. 56, in a case where the A3-B1-C1 design is adopted and it is satisfied that $\theta_2=2\theta_1+45°$ (in a case where the first quarter-wave plate 11 is made of a positive material) or $\theta_2=2\theta_1+135°$ (in a case where the first quarter-wave plate 11 is made of a negative material), when setting the second quarter-wave plate 21 and the second half-wave plate 22 in the liquid crystal cell, for the second quarter-wave plate 21 made of a positive material, it is set to satisfy $\theta_4=2\theta_3+135°$, and for the second quarter-wave plate 21 made of a negative material, it is set to satisfy $\theta_4=2\theta_3+45°$. In this way, the contrast of the liquid crystal display panel can be increased.

In an example, when the liquid crystal display panel is in a black state, after passing through the second half-wave plate 22 and the second quarter-wave plate 21 in the liquid crystal cell, the light emitted from the backlight source 5 becomes left rotation circularly polarized light. This process is the same as that based on the above-mentioned A1-B1-C1 design, and will not be repeated herein.

Subsequently, the left rotation circularly polarized light sequentially passes through the first quarter-wave plate 11 and the first half-wave plate 12 to become linear polarized light having a polarization direction being the first direction. This process is the same as that based on the above-mentioned A2-B1-C1 design, and will not be repeated herein.

Subsequently, the linear polarized light will be absorbed by the first linear polarizer 41 and cannot exit, thereby avoiding light leakage in the black state.

When the liquid crystal display panel is in a white state, after passing through the second half-wave plate 22 and the second quarter-wave plate 21 in the liquid crystal cell, the light emitted from the backlight source 5 becomes right rotation circularly polarized light. This process is the same as that based on the above-mentioned A1-B1-C1 design, and will not be repeated herein.

Subsequently, the right rotation circularly polarized light sequentially passes through the first quarter-wave plate 11 and the first half-wave plate 12 to become linear polarized light having a polarization direction being the second direction. This process is the same as that based on the above-mentioned A2-B1-C1 design, and will not be repeated herein.

Then, the linear polarized light will be emitted by the first linear polarizer 41 without any loss, and brightness in the white state of the liquid crystal display panel can be ensured, thereby increasing the contrast of the liquid crystal display panel.

On this basis, in a case where the first quarter-wave plate 11 is made of a positive material, it is set to satisfy $101.5°\leq\theta_1\leq111.5°$ in this embodiment of the present disclosure, and in a case where the first quarter-wave plate 11 is made of a negative material, it is set to satisfy $172°\leq\theta_1\leq182°$ in this embodiment of the present disclosure. In a case where the second quarter-wave plate 21 is made of a positive material, it is set to satisfy $7°\leq\theta_3\leq17°$, and in a case where the first quarter-wave plate 11 is made of a negative material, it is set to satisfy $40°\leq\theta_3\leq50°$. In this way, the contrast of the liquid crystal display panel at a large viewing angle can be increased.

In an example, the liquid crystal display panel based on the A3-B1 design may further adopt a second scheme for setting the rotation direction. The second scheme for setting the rotation direction based on the A3-B1 design represents that ambient light emitted towards the liquid crystal display panel becomes right rotation circularly polarized light after passing through the first linear polarizer 41 and the first phase delay structure 1. The second scheme for setting the rotation direction based on the A3-B1 design is denoted by A3-B1-C2 in the following.

The liquid crystal display panel based on the A3-B1-C2 design can still be represented by the structure shown in FIG. 56. Different from the A3-B1-C1 design, in the A3-B1-C2 design, in a case where the first quarter-wave plate 11 is made of a positive material, it is set to satisfy $\theta_2=2\theta_1+135°$ in this embodiment of the present disclosure, and in a case where the first quarter-wave plate 11 is made of a negative material, it is set to satisfy $\theta_2=2\theta_1+45°$ in this embodiment of the present disclosure. In this way, after passing through the first linear polarizer 41, the first half-wave plate 12 and the first quarter-wave plate 11, ambient light emitted towards the liquid crystal display panel becomes right rotation circularly polarized light, thereby preventing the reflected ambient light from exiting. This process is the same as that based on the A2-B1-C2 design, and will not be repeated herein. Moreover, in the A3-B1-C2 design, based on the above configuration, a combination of the first quarter-wave plate 11 and the first half-wave plate 12 can be equivalent to a single first quarter-wave plate 11 disposed outside the liquid crystal cell in the A1-B1-C2 design.

Based on the structure shown in FIG. 56, in a case where the A3-B1-C2 design is adopted and it is satisfied that $\theta_2=2\theta_1+45°$ (in a case where the first quarter-wave plate 11 is made of a negative material) or $\theta_2=2\theta_1+135°$ (in a case where the first quarter-wave plate 11 is made of a positive material), when setting the second quarter-wave plate and the second half-wave plate 22 in the liquid crystal cell, for the second quarter-wave plate 21 made of a positive material, it is set to satisfy $\theta_4=2\theta_3+45°$, and for the second quarter-wave plate 21 made of a negative material, it is set to satisfy $\theta_4=2\theta_3+135°$. In this way, the contrast of the liquid crystal display panel can be increased.

In an example, when the liquid crystal display panel is in a black state, after passing through the second half-wave plate 22 and the second quarter-wave plate 21 in the liquid crystal cell, the light emitted from the backlight source 5 becomes right rotation circularly polarized light. This process is the same as that based on the above-mentioned A1-B1-C2 design, and will not be repeated herein.

Subsequently, the right rotation circularly polarized light sequentially passes through the first quarter-wave plate 11 and the first half-wave plate 12 to become linear polarized light having a polarization direction being the first direction. This process is the same as that based on the above-mentioned A2-B1-C2 design, and will not be repeated herein.

Subsequently, the linear polarized light will be absorbed by the first linear polarizer 41 and cannot exit, thereby avoiding light leakage in the black state.

When the liquid crystal display panel is in a white state, after passing through the second half-wave plate 22 and the second quarter-wave plate 21, the light emitted from the backlight source 5 becomes left rotation circularly polarized light. This process is the same as than based on the above-mentioned A1-B1-C2 design, and will not be repeated herein.

Subsequently, the left rotation circularly polarized light sequentially passes through the first quarter-wave plate 11 and the first half-wave plate 12 to become linear polarized light having a polarization direction being the second direction. This process is the same as that based on the above-mentioned A2-B1-C1 design, and will not be repeated herein.

Subsequently, the linear polarized light will be just emitted from the first linear polarizer 41, thereby achieving brightness in the white state of the liquid crystal display panel.

On this basis, in a case where the first quarter-wave plate 11 is made of a positive material, it is set to satisfy $284°\leq\theta_1\leq294°$ in this embodiment of the present disclosure, and in a case where the first quarter-wave plate 11 is made of a negative material, it is set to satisfy $87.2°\leq\theta_1\leq97.2°$ in this embodiment of the present disclosure. In a case where the second quarter-wave plate 21 is made of a positive material, it is set to satisfy $340°\leq\theta_3\leq350°$ in this embodiment of the present disclosure, and in a case where the second quarter-wave plate 21 is made of a negative material, it is set to satisfy $45°\leq\theta_3\leq55°$ in this embodiment of the present disclosure. In this way, the contrast of the liquid crystal display panel at a large viewing angle can be increased.

In an embodiment, the liquid crystal display panel based on the A3 design may further adopt a second scheme for setting positions of wave plates. The second scheme for setting positions of wave plates based on the A3 design represents that the second quarter-wave plate 21 is located between the second half-wave plate 22 and the second linear polarizer 42, and the first half-wave plate 12 is located between the first quarter-wave plate 11 and the first linear polarizer 41. The second scheme for setting positions of wave plates based on the A3 design is denoted by A3-B2 in the following.

In an embodiment, the liquid crystal display panel based on the A3-B2 design may further adopt a first scheme for setting the rotation direction. The first scheme for setting the rotation direction based on the A3-B2 design represents that ambient light emitted towards the liquid crystal display panel becomes left rotation circularly polarized light after passing through the first linear polarizer 41 and the first phase delay structure 1. The first scheme for setting the rotation direction based on the A3-B2 design is denoted by A3-B2-C1 in the following.

Figure 57:
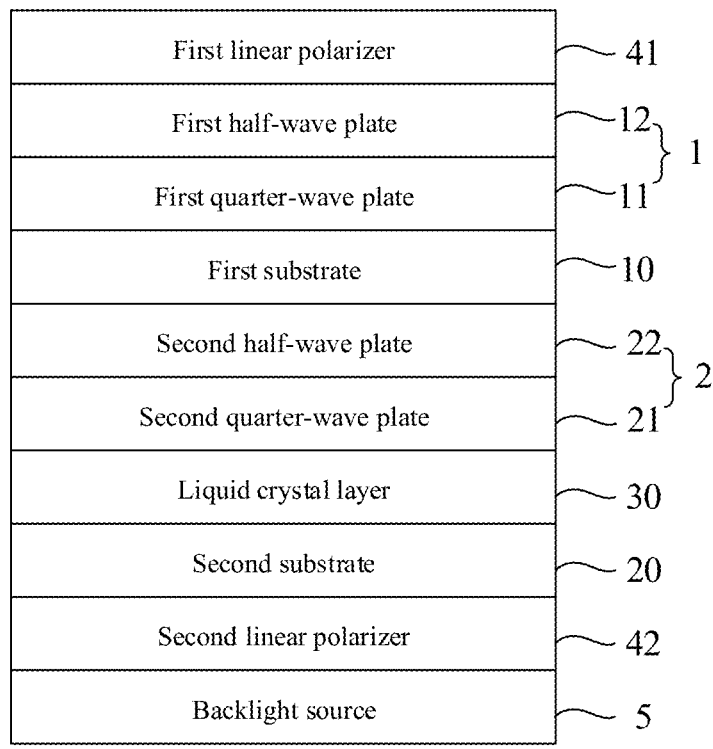
FIG. 57 is a schematic cross-sectional view of still another liquid crystal display panel according to an embodiment of the present disclosure.

FIG. 57 is a schematic cross-sectional view of still another liquid crystal display panel according to an embodiment of the present disclosure. In an example, as shown in FIG. 57, the liquid crystal display panel adopts the A3-B2-C1 design, that is, the second half-wave plate 22 is disposed in the liquid crystal cell of the liquid crystal display panel, and the first half-wave plate 12 is disposed outside the liquid crystal cell. In addition, relative positions of the second half-wave plate 22 and the second quarter-wave plate 21 change compared to the structure shown in FIG. 26. As shown in FIG. 57, the second quarter-wave plate 21 is located between the second linear polarizer 42 and the second half-wave plate 22. After passing through the first linear polarizer 41, the first half-wave plate 12 and the first quarter-wave plate 11, ambient light emitted towards the liquid crystal display panel becomes left rotation circularly polarized light.

In an embodiment, when the liquid crystal display panel adopts the A3-B2-C1 design as shown in FIG. 57, in a case where the first quarter-wave plate 11 is made of a positive material, the angle $\theta_1$ formed between the slow axis of the first half-wave plate 12 and the first direction and the angle $\theta_2$ formed between the slow axis of the first quarter-wave plate 11 and the first direction are set to satisfy $\theta_2=2\theta_1+45°$ in this embodiment of the present disclosure; and in a case where the first quarter-wave plate 11 is made of a negative material, the angle $\theta_1$ and the angle $\theta_2$ are set to satisfy $\theta_2=2\theta_1+135°$ in this embodiment of the present disclosure. In this way, ambient light emitted towards the liquid crystal display panel passes through the first linear polarizer 41, the first half-wave plate 12, and the first quarter-wave plate 11 to become left rotation circularly polarized light, thereby preventing the reflected ambient light from exiting from the liquid crystal display panel. A principle of preventing the reflected ambient light from exiting from the liquid crystal display panel is the same as that based on the above-mentioned A2-B1-C1 design, and will not be repeated herein.

Based on the structure shown in FIG. 57, when the A3-B2-C1 design is adopted, and it is satisfied that $\theta_2=2\theta_1+45°$ (in a case where the first quarter-wave plate 11 is made of a positive material) or $\theta_2=2\theta_1+135°$ (in a case where the first quarter-wave plate 11 is made of a negative material), when setting the second quarter-wave plate 21 and the second half-wave plate 22 in the liquid crystal cell, for the second quarter-wave plate 21 made of a positive material, the angle $\theta_4$ formed between the slow axis of the second quarter-wave plate 21 and the first direction is set as 45°, and for the second quarter-wave plate 21 made of a negative material, the angle $\theta_4$ formed between the slow axis of the second quarter-wave plate 21 and the first direction is set as 135°. In this way, the contrast of the liquid crystal display panel can be increased.

In this case, the material of the second half-wave plate 22 can be freely selected, for example, the material of the second half-wave plate 22 may be a positive material or a negative material. Moreover, the angle $\theta_3$ formed between the slow axis of the second half-wave plate 22 and the first direction can also be freely selected, and is not limited by this embodiment of the present disclosure.

In an example, when the liquid crystal display panel is in a black state, after passing through the second quarter-wave plate 21 and the half-wave plate 22 in the liquid crystal cell, the light emitted from the backlight source 5 becomes left rotation circularly polarized light. This process is the same as that based on the above-mentioned A1-B2-C1 design, and will not be repeated herein.

Then, the left rotation circularly polarized light sequentially passes through the first quarter-wave plate 11 and the first half-wave plate 12 to become linear polarized light having a polarization direction being the first direction. This process is the same as that based on the above-mentioned A2-B1-C1 design, and will not be repeated herein.

Subsequently, the linear polarized light will be absorbed by the first linear polarizer 41 and cannot exit, thereby avoiding light leakage in the black state.

When the liquid crystal display panel is in a white state, after passing through the second quarter-wave plate 21 and the second half-wave plate 22 in the liquid crystal cell, the light emitted from the backlight source 5 becomes right rotation circularly polarized light. This process is the same as that based on the above-mentioned A1-B2-C1 design, and will not be repeated herein.

Then, the right rotation circularly polarized light sequentially passes through the first quarter-wave plate 11 and the first half-wave plate 12 to become linear polarized light having a polarization direction being the second direction. This process is the same as that based on the above-mentioned A2-B1-C1 design, and will not be repeated herein.

Subsequently, the linear polarized light is emitted from the first linear polarizer 41 without any loss, and brightness in the white state of the liquid crystal display panel can be ensured, thereby increasing the contrast of the liquid crystal display panel.

On this basis, in a case where the first quarter-wave plate 11 is made of a positive material, it is set to satisfy $101.5°\leq\theta_1\leq111.5°$ in this embodiment of the present disclosure, and in a case where the first quarter-wave plate 11 is made of a negative material, it is set to satisfy $172°\leq\theta_1\leq182°$ in this embodiment of the present disclosure. In this way, the contrast at a large viewing angle can be increased.

In an example, the liquid crystal display panel based on the A3-B2 design may further adopt a second scheme for setting the rotation direction. The second scheme for setting the rotation direction based on the A3-B2 design represents that ambient light emitted towards the liquid crystal display panel becomes right rotation circularly polarized light after passing through the first linear polarizer 41 and the first phase delay structure 1. The second scheme for setting the rotation direction based on the A3-B2 design is denoted by A3-B2-C2 in the following.

The liquid crystal display panel based on the A3-B2-C2 design can still be represented by the structure shown in FIG. 57. Different from the A3-B2-C1 design, in the A3-B3-C2 design, in a case where the first quarter-wave plate 11 is made of a positive material, the angle $\theta_1$ formed between the slow axis of the first half-wave plate 12 and the first direction and the angle $\theta_2$ formed between the slow axis of the first quarter-wave plate 11 and the first direction are set to satisfy $\theta_2=2\theta_1+135°$; and in a case where the first quarter-wave plate 11 is made of a negative material, the angle $\theta_1$ and the angle $\theta_2$ are set to satisfy $\theta_2=2\theta_1+45°$. In this way, after passing through the first linear polarizer 41, the first half-wave plate 12 and the first quarter-wave plate 11, ambient light emitted towards the liquid crystal display panel becomes right rotation circularly polarized light, thereby avoiding the reflected ambient light from exiting. A principle of preventing the reflected ambient light from exiting from the liquid crystal display panel is the same as that based on the above-mentioned A2-B1-C2 design, and will not be repeated herein.

Based on the structure shown in FIG. 57, in a case where the A3-B2-C2 design is adopted and it is satisfied that $\theta_2=2\theta_1+135°$ (in a case where the first quarter-wave plate 11 is made of a positive material) or $\theta_2=2\theta_1+45°$ (in a case where the first quarter-wave plate 11 is made of a negative material), when setting the second quarter-wave plate and the second half-wave plate 22 in the liquid crystal cell, for the second quarter-wave plate 21 made of a positive material, the angle $\theta_4$ formed between the slow axis of the second quarter-wave plate 21 and the first direction is set as 135°, and for the second quarter-wave plate 21 made of a negative material, the angle $\theta_4$ formed between the slow axis of the second quarter-wave plate 21 and the first direction is set as 45°. In this way, the contrast of the liquid crystal display panel can be increased.

In this case, the material of the second half-wave plate 22 can be freely selected, for example, the material of the second half-wave plate 22 may be a positive material or a negative material.

In an example, when the liquid crystal display panel is in a black state, after passing through the second quarter-wave plate and the second half-wave plate 22 in the liquid crystal cell, the light emitted from the backlight source 5 becomes right rotation circularly polarized light. This process is the same as that based on the above-mentioned A1-B2-C2 design, and will not be repeated herein.

Then, the right rotation circularly polarized light sequentially passes through the first quarter-wave plate 11 and the first half-wave plate 12 to become linear polarized light having a polarization direction being the first direction. This process is the same as that based on the above-mentioned A2-B1-C2 design, and will not be repeated herein.

Subsequently, the linear polarized light will be absorbed by the first linear polarizer 41 and cannot exit, thereby avoiding light leakage in the black state.

When the liquid crystal display panel is in a white state, after passing through the second quarter-wave plate 21 and the second half-wave plate 22 in the liquid crystal cell, the light emitted from the backlight source 5 becomes left rotation circularly polarized light. This process is the same as that based on the above-mentioned A1-B2-C2 design, and will not be repeated herein.

Then, the left rotation circularly polarized light sequentially passes through the first quarter-wave plate 11 and the first half-wave plate 12 to become linear polarized light having a polarization direction being the second direction. This process is the same as that based on the above-mentioned A2-B1-C2 design, and will not be repeated herein.

Subsequently, the linear polarized light is emitted from the first linear polarizer 41 without any loss, brightness in the white state of the liquid crystal display panel can be ensured, thereby increasing the contrast of the liquid crystal display panel.

On this basis, in a case where the first quarter-wave plate 11 is made of a positive material, it is set to satisfy $284°≤θ_1≤294°$ and $θ_3$ is 0° or 90° in this embodiment of the present disclosure, and in a case where the first quarter-wave plate 11 is made of a negative material, it is set to satisfy $87.2°≤θ_1≤97.2°$ and $45°≤θ_3≤55°$ in this embodiment of the present disclosure. In this way, the contrast of the liquid crystal display panel at a large viewing angle can be increased.

In an embodiment, the liquid crystal display panel based on the A3 design may further adopt a third scheme for setting positions of wave plates. The third scheme for setting positions of wave plates based on the A3 design represents that the second half-wave plate 22 is located between the second quarter-wave plate 21 and the second linear polarizer 42, and the first quarter-wave plate 11 is located between the first half-wave plate 12 and the first linear polarizer 41. The third scheme for setting positions of wave plates based on the A3 design is denoted by A3-B3 in the following.

In an embodiment, the liquid crystal display panel based on the A3-B3 design may further adopt a first scheme for setting the rotation direction. The first scheme for setting the rotation direction based on the A3-B3 design represents that ambient light emitted towards the liquid crystal display panel passes through the first linear polarizer 41 and the first phase delay structure 1 to become left rotation circularly polarized light. The first scheme for setting the rotation direction based on the A3-B3 design is denoted by A3-B3-C1 in the following.

Figure 58:
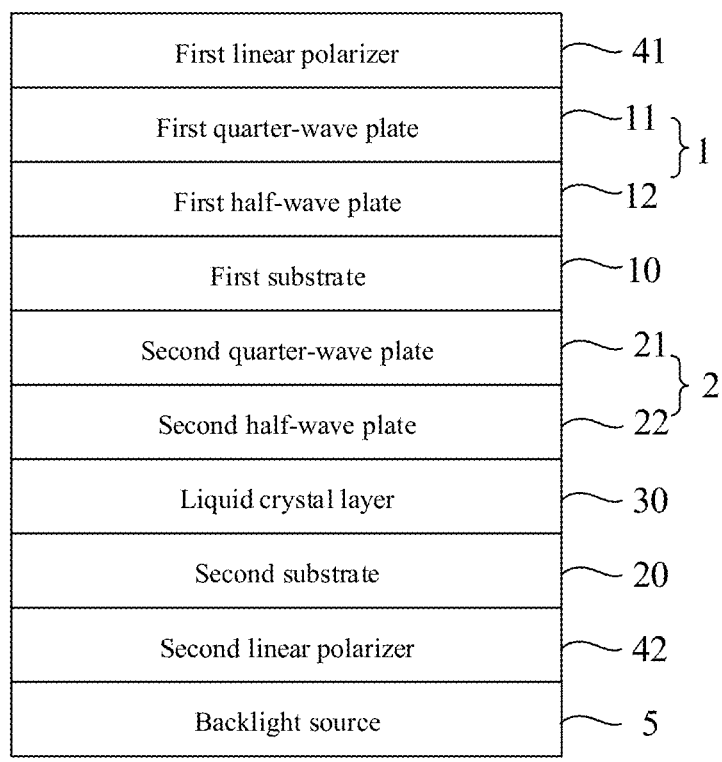
FIG. 58 is a schematic cross-sectional view of still another liquid crystal display panel according to an embodiment of the present disclosure.

FIG. 58 is a schematic cross-sectional view of still another liquid crystal display panel according to an embodiment of the present disclosure. In an example, as shown in FIG. 58, the liquid crystal display panel adopts the above-mentioned A3-B3-C1 design. That is, the second half-wave plate 22 is disposed in the liquid crystal cell of the liquid crystal display panel, and the first half-wave plate 12 is disposed outside the liquid crystal cell. In addition, the first quarter-wave plate 11 is located between the first linear polarizer 41 and the first half-wave plate 12, and the second half-wave plate 22 is located between the second linear polarizer 42 and the second quarter-wave plate 21.

In an embodiment, when the liquid crystal display panel adopts the A3-B3-C1 design as shown in FIG. 55, in a case where the first quarter-wave plate 11 is made of a positive material, the angle $θ_2$ formed between the slow axis of the first quarter-wave plate 11 and the first direction is set as 135° in this embodiment of the present disclosure, and in a case where the first quarter-wave plate 11 is made of a negative material, the angle $θ_2$ formed between the slow axis of the first quarter-wave plate 11 and the first direction is set as 45° in this embodiment of the present disclosure. In this way, after passing through the first linear polarizer 41, the first half-wave plate 12 and the first quarter-wave plate 11, ambient light emitted towards the liquid crystal display panel becomes left rotation circularly polarized light, thereby preventing the reflected ambient light from exiting from the liquid crystal display panel. A principle of preventing the reflected ambient light from exiting from the liquid crystal display panel is the same as that based on the above-mentioned A2-B2-C1 design, and will not be repeated herein.

Based on the structure shown in FIG. 58, in a case where the A3-B3-C1 design is adopted and it is satisfied that $θ_2=135°$ (in a case where the first quarter-wave plate 11 is made of a positive material) or $θ_2=45°$ (in a case where the first quarter-wave plate 11 is made of a negative material), when setting the second quarter-wave plate 21 and the second half-wave plate 22 in the liquid crystal cell, for the second quarter-wave plate 21 made of the positive material, it is set to satisfy $θ_4=2θ_3+135°$, and for the second quarter-wave plate 21 made of the negative material, it is set to satisfy $θ_4=2θ_3+45°$. In this way, the contrast of the liquid crystal display panel can be increased.

In an example, when the liquid crystal display panel is in a black state, after passing through the second half-wave plate 22 and the second quarter-wave plate 21 in the liquid crystal cell, the light emitted from the backlight source 5 becomes left rotation circularly polarized light. This process is the same as that based on the above-mentioned A1-B1-C1 design, and will not be repeated herein.

Subsequently, the left rotation circularly polarized light sequentially passes through the first half-wave plate 12 and the first quarter-wave plate 11 to become linear polarized light having a polarization direction being the first direction. This process is the same as that based on the above-mentioned A2-B2-C1 design, and will not be repeated herein.

Then, the linear polarized light will be absorbed by the first linear polarizer 41 and cannot exit, thereby avoiding light leakage in the black state.

When the liquid crystal display panel is in a white state, after passing through the second half-wave plate 22 and the second quarter-wave plate 21 in the liquid crystal cell, the light emitted from the backlight source 5 becomes right rotation circularly polarized light. This process is the same as that based on the above-mentioned A1-B1-C1 design, and will not be repeated herein.

Subsequently, the circularly polarized light sequentially passes through the first half-wave plate 12 and the first quarter-wave plate 11 to become linear polarized light having a polarization direction being the second direction. This process is the same as that based on the above-mentioned A2-B2-C1 design, and will not be repeated herein.

Then, the linear polarized light will be exactly emitted from the first linear polarizer 41, thereby ensuring brightness in the white state of the liquid crystal display panel.

On this basis, the angle $θ_1$ formed between the slow axis of the first half-wave plate 12 and the first direction is set as 0° or 90° in this embodiment of the present disclosure. Moreover, in a case where the second quarter-wave plate 21 is made of a positive material, it is set to satisfy $7°≤θ_3≤17°$ in this embodiment of the present disclosure, and in a case where the second quarter-wave plate 21 is made of a negative material, it is set to satisfy $40°≤θ_3≤50°$ in this embodiment of the present disclosure. In this way, the contrast of the liquid crystal display panel at a large viewing angle can be increased.

In an example, the liquid crystal display panel designed based on the A3-B3 design may further adopt a second scheme for setting the rotation direction. The second scheme for setting the rotation direction based on the A3-B3 design represents that ambient light emitted towards the liquid crystal display panel becomes right rotation circularly polarized light after passing through the first linear polarizer 41 and the first phase delay structure 1. The second scheme for setting the rotation direction based on the A3-B3 design is denoted by A3-B3-C2 in the following.

The liquid crystal display panel based on the A3-B3-C2 design can still be represented by the structure shown in FIG. 58. Different from the A3-B3-C1 design, in the A3-B3-C2 design, in a case where the first quarter-wave plate 11 is made of a positive material, the angle $\theta_2$ formed between the slow axis of the first quarter-wave plate 11 and the first direction is set as 45° in this embodiment of the present disclosure, and in a case where the plate 11 is made of a negative material, the angle $\theta_2$ formed between the slow axis of the first quarter-wave plate 11 and the first direction is set as 135° in this embodiment of the present disclosure. In this way, after passing through the first linear polarizer 41, the first quarter-wave plate 11 and the first half-wave plate 12, ambient light emitted towards the liquid crystal display panel becomes right rotation circularly polarized light, thereby preventing the reflected ambient light from exiting. A principle of preventing the reflected ambient light from exiting from the liquid crystal display panel is the same as that based on the above-mentioned A2-B2-C2 design, and will not be repeated herein.

Based on the structure shown in FIG. 58, in a case where the A3-B3-C2 design is adopted and it is satisfied that $\theta_2=45°$ (in a case where the first quarter-wave plate 11 is made of a positive material) or $\theta_2=135°$ (in a case where the first quarter-wave plate 11 is made of a negative material), when setting the second quarter-wave plate 21 and the second half-wave plate 22 in the liquid crystal cell, for the second quarter-wave plate 21 made of a positive material, it is set to satisfy $\theta_4=2\theta_3+45°$, and for the second quarter-wave plate 21 made of a negative material, it is set to satisfy $\theta_4=2\theta_3+135°$. In this way, the contrast of the liquid crystal display panel can be increased.

In an example, when the liquid crystal display panel is in a black state, after passing through the second half-wave plate 22 and the second quarter-wave plate 21 in the liquid crystal cell, the light emitted from the backlight source 5 becomes right rotation circularly polarized light. This process is the same as that based on the above-mentioned A1-B1-C2 design, and will not be repeated herein.

Subsequently, the right rotation circularly polarized light sequentially passes through the first half-wave plate 12 and the first quarter-wave plate 11 to become linear polarized light having a polarization direction being the first direction. This process is the same as that based on the above-mentioned A2-B2-C2 design, and will not be repeated herein.

Then, the linear polarized light will be absorbed by the first linear polarizer 41 and cannot exit, thereby avoiding light leakage in the black state.

When the liquid crystal display panel is in a white state, after passing through the second half-wave plate 22 and the second quarter-wave plate 21 in the liquid crystal cell, the light emitted from the backlight source 5 becomes left rotation circularly polarized light. This process is the same as that based on the above-mentioned A1-B1-C2 design, and will not be repeated herein.

Subsequently, the left rotation circularly polarized light sequentially passes through the first half-wave plate 12 and the first quarter-wave plate 11 to become linear polarized light having a polarization direction being the second direction. This process is the same as that based on the above-mentioned A2-B2-C2 design, and will not be repeated herein.

Then, the linear polarized light will be exactly emitted from the first linear polarizer 41, thereby ensuring brightness in the white state of the liquid crystal display panel.

On this basis, the angle $\theta_1$ formed between the slow axis of the first half-wave plate 12 and the first direction is set as 0° or 90° in this embodiment of the present disclosure. Moreover, in a case where the second quarter-wave plate 21 is made of a positive material, it is set to satisfy $340°\leq\theta_3\leq350°$ in this embodiment of the present disclosure, and in a case where the second quarter-wave plate 21 is made of a negative material, it is set to satisfy $45°\leq\theta_3\leq55°$ in this embodiment of the present disclosure. In this way, the contrast of the liquid crystal display panel at a large viewing angle can be increased.

In an embodiment, the liquid crystal display panel based on the A3 design may further adopt a fourth scheme for setting positions of wave plates, and the fourth scheme for setting positions of wave plates based on the A3 represents that the second quarter-wave plate 21 is located between the second half-wave plate 22 and the second linear polarizer 42, and the first quarter-wave plate 11 is located between the first half-wave plate 12 and the first linear polarizer 41. The fourth scheme for setting wave plates based on the A3 design is denoted by A3-B4 in the following.

In an embodiment, the liquid crystal display panel based on the A3-B4 design may further adopt a first scheme for setting the rotation direction. The first scheme for setting the rotation direction based on the A3-B4 design represents that ambient light emitted towards the liquid crystal display panel passes through the first linear polarizer 41 and the first phase delay structure 1 to become left rotation circularly polarized light. The first scheme for setting the rotation direction based on the A3-B4 design is denoted by A3-B4-C1 in the following.

Figure 59:
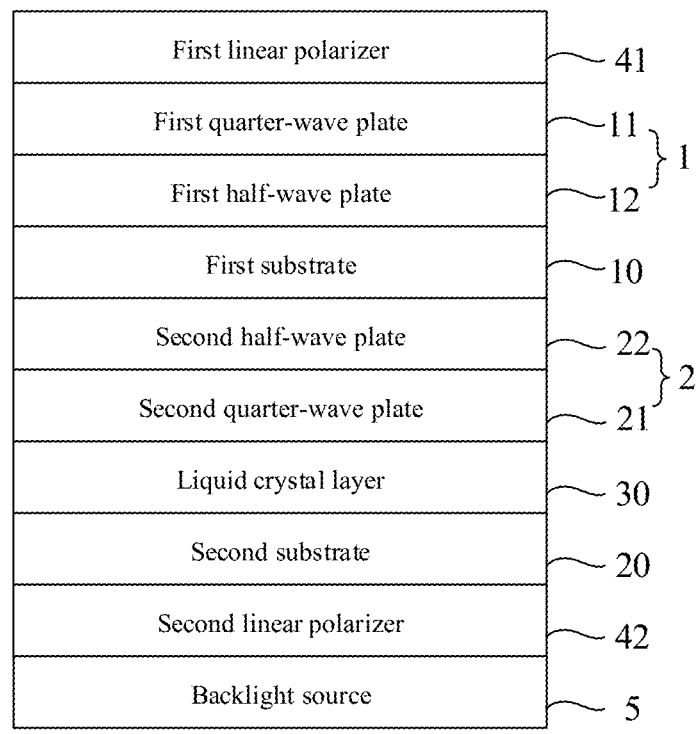
FIG. 59 is a schematic cross-sectional view of still another liquid crystal display panel according to an embodiment of the present disclosure.

FIG. 59 is a schematic cross-sectional view of still another liquid crystal display panel according to an embodiment of the present disclosure. In an example, as shown in FIG. 59, the liquid crystal display panel adopts the above-mentioned A3-B4-C1 design. That is, the second half-wave plate 22 is disposed in the liquid crystal cell of the liquid crystal display panel, and the first half-wave plate 12 is disposed outside the liquid crystal cell. Moreover, the first quarter-wave plate 11 is located between the first linear polarizer 41 and the first half-wave plate 12. The second quarter-wave plate 21 is located between the second linear polarizer 42 and the second half-wave plate 22.

In an embodiment, when the liquid crystal display panel adopts the A3-B4-C1 design as shown in FIG. 59, in a case where the first quarter-wave plate 11 is made of a positive material, the angle $\theta_2$ formed between the slow axis of the first quarter-wave plate 11 and the first direction is set as 135° in this embodiment of the present disclosure, and in a case where the first quarter-wave plate 11 is made of a negative material, the angle $\theta_2$ formed between the slow axis of the first quarter-wave plate 11 and the first direction is set as 45° in this embodiment of the present disclosure. In this way, after passing through the first linear polarizer 41, the first quarter-wave plate 11 and the first half-wave plate 12, ambient light emitted towards the liquid crystal display panel becomes left rotation circularly polarized light, thereby preventing the reflected ambient light from exiting from the liquid crystal display panel. A principle of preventing the reflected ambient light from exiting from the liquid crystal display panel is the same as that based on the above-mentioned A2-B2-C1 design, and will not be repeated herein.

Based on the structure shown in FIG. 59, in a case where the A3-B4-C1 design is adopted and it is satisfied that $\theta_2=135°$ (in a case where the first quarter-wave plate 11 is made of a positive material) or $\theta_2=45°$ (in a case where the first quarter-wave plate 11 is made of a negative material), when setting the second quarter-wave plate 21 and the second half-wave plate 22 in the liquid crystal cell, for the second quarter-wave plate 21 made of the positive material, the angle $\theta_4$ formed between the slow axis of the second quarter-wave plate 21 and the first direction is set as 45° in this embodiment of the present disclosure, and the second quarter-wave plate 21 made of the negative material, the angle $\theta_4$ formed between the slow axis of the second quarter-wave plate 21 and the first direction is set as 135°. In this way, the contrast of the liquid crystal display panel can be increased.

In an example, when the liquid crystal display panel is in a black state, after passing through the second quarter-wave plate 21 and the second half-wave plate 22 in the liquid crystal cell, the light emitted from the backlight source 5 becomes left rotation circularly polarized light. This process is the same as that based on the above-mentioned A1-B2-C1 design, and will not be repeated herein.

Then, the left rotation circularly polarized light sequentially passes through the first half-wave plate 12 and the first quarter-wave plate 11 to become linear polarized light having a polarization direction being the first direction. This process is the same as that based on the above-mentioned A2-B2-C1 design, and will not be repeated herein.

Subsequently, the linear polarized light will be absorbed by the first linear polarizer 41 and cannot exit, thereby avoiding light leakage in the black state.

When the liquid crystal display panel is in a white state, after passing through the second quarter-wave plate 21 and the second half-wave plate 22 in the liquid crystal cell, the light emitted from the backlight source 5 becomes right rotation circularly polarized light. This process is the same as that based on the above-mentioned A1-B2-C1 design, and will not be repeated herein.

Then, the right rotation circularly polarized light sequentially passes through the first half-wave plate 12 and the first quarter-wave plate 11 to become linear polarized light having a polarization direction being the second direction. This process is the same as that in the above-mentioned A2-B2-C1 design, and will not be repeated herein.

Then, the linear polarized light can be emitted from the first linear polarizer 41 without any loss, and brightness in the white state of the liquid crystal display panel can be ensured, thereby increasing the contrast of the liquid crystal display panel.

On this basis, the angle $\theta_1$ formed between the slow axis of the first half-wave plate 12 and the first direction is set as 0° or 90° in this embodiment of the present disclosure, thereby increasing the contrast of the liquid crystal display panel at a large viewing angle.

In an example, the liquid crystal display panel based on the A3-B4 design may further adopt a second scheme for setting the rotation direction. The second scheme for setting the rotation direction based on the A3-B4 design represents that ambient light emitted towards the liquid crystal display panel becomes right rotation circularly polarized light after passing through the first linear polarizer 41 and the first phase delay structure 1. The second scheme for setting the rotation direction based on the A3-B4 design is denoted as A3-B4-C2 in the following.

The liquid crystal display panel based on the A3-B4-C2 design can still adopt the setting scheme shown in FIG. 59. Different from the A3-B4-C1 design, in the A3-B4-C2 design, in a case where the first quarter-wave plate 11 is made of a positive material, the angle $\theta_2$ formed between the slow axis of the first quarter-wave plate 11 and the first direction is set as 45° in this embodiment of the present disclosure, and in a case where the first quarter-wave plate 11 is made of a negative material, the angle $\theta_2$ formed between the slow axis of the first quarter-wave plate 11 and the first direction is set as 135° in this embodiment of the present disclosure. In this way, after passing through the first linear polarizer 41, the first quarter-wave plate 11 and the first half-wave plate 12, ambient light emitted towards the liquid crystal display panel becomes right rotation circularly polarized light. A principle of preventing the reflected ambient light from exiting from the liquid crystal display panel is the same as that based on the above-mentioned A2-B2-C2 design, and will not be repeated herein.

Based on the structure shown in FIG. 59, in a case where the A3-B4-C2 design is adopted and it is satisfied that $\theta_2=45°$ (in a case where the first quarter-wave plate 11 is made of a positive material) or $\theta_2=135°$ (in a case where the first quarter-wave plate 11 is made of a negative material), when setting the second quarter-wave plate 21 and the second half-wave plate 22 in the liquid crystal cell, for the second quarter-wave plate 21 made of the positive material, the angle $\theta_4$ formed between the slow axis of the second quarter-wave plate 21 and the first direction is set as 135°, and for the second quarter-wave plate 21 made of the negative material, the angle $\theta_4$ formed between the slow axis of the second quarter-wave plate 21 and the first direction is set as 45° in this embodiment of the present disclosure. In this way, the contrast of the liquid crystal display panel can be increased.

In an example, when the liquid crystal display panel is in a black state, after passing through the second quarter-wave plate 21 and the second half-wave plate 22 in the liquid crystal cell, the light emitted from the backlight source 5 becomes right rotation circularly polarized light. This process is the same as that based on the above-mentioned A1-B2-C2 design, and will not be repeated herein.

Then, the right rotation circularly polarized light sequentially passes through the first half-wave plate 12 and the first quarter-wave plate 11 to become linear polarized light having a polarization direction being the first direction. This process is the same as that based on the above-mentioned A1-B2-C1 design, and will not be repeated herein.

Then, the linear polarized light will be absorbed by the first linear polarizer 41 and cannot exit, thereby avoiding light leakage in the black state.

When the liquid crystal display panel is in a white state, after passing through the second quarter-wave plate 21 and the second half-wave plate 22 in the liquid crystal cell, the light emitted from the backlight source 5 becomes left rotation circularly polarized light. This process is the same as that based on the above-mentioned A1-B2-C2 design, and will not be repeated herein.

Then, the left rotation circularly polarized light sequentially passes through the first half-wave plate 12 and the first quarter-wave plate 11 to become linear polarized light having a polarization direction being the second direction.

This process is the same as that based on the above-mentioned A2-B2-C2 design, and will not be repeated herein.

Then, the linear polarized light can be emitted from the first linear polarizer 41 without any loss, and brightness in the white state of the liquid crystal display panel can be ensured, thereby increasing the contrast of the liquid crystal display panel.

On this basis, the angle $\theta_1$ formed between the slow axis of the first half-wave plate 12 and the first direction is set as 0° or 90° in this embodiment of the present disclosure. In a case where the second quarter-wave plate is made of a negative material, the angle $\theta_3$ formed between the slow axis of the half-wave plate 22 and the first direction is set to satisfy 45°≤$\theta_3$≤55°, and in a case where the second quarter-wave plate is made of a positive material, the angle $\theta_3$ formed between the slow axis of the half-wave plate 22 and the first direction is set as 0° or 90°. In this way, the contrast of the liquid crystal display panel at a large viewing angle can be increased.

In an embodiment, each of the first quarter-wave plate 11, the second quarter-wave plate 21, the first half-wave plate 12, and the second half-wave plate 22 may be made of polymer liquid crystals, or a polymer material such as polycarbonate, polyvinyl chloride, or poly ethylene-succinate.

In an example, the relatively flat optical glue in the liquid crystal cell can be coated with the polymer liquid crystals, so as to form the second half-wave plate 22 and/or the second quarter-wave plate 21 in the liquid crystal cell. This can improve flatness of the second half-wave plate 22 and/or the second quarter-wave plate 21, thereby improving thickness uniformity of the second half-wave plate 22 and/or the second quarter-wave plate 21 at different positions. Therefore, light after passing through the second half-wave plate 22 and/or the second quarter-wave plate 21 has a uniform delay amount.

In this embodiment of the present disclosure, types of the first linear polarizer 41 and the second linear polarizer 42 are not particularly limited. For example, each of the first linear polarizer 41 and the second linear polarizer 42 may be a type of polymer iodine polyvinyl alcohol, or may also be a metal wire grid. Alternatively, the second linear polarizer 42 may be formed by dye liquid crystals.

In an embodiment, an anti-reflection film may be disposed on a side of the first linear polarizer 41 facing away from the first substrate 10 in this embodiment of the present disclosure. After the ambient light passes through the anti-reflection film, the reflected light will have a decreased intensity due to interference counteract, and the transmitted light will be absorbed by the first linear polarizer 41 and first phase delay structure 1 after being reflected by the liquid crystal display panel and cannot exit.

Figure 60:
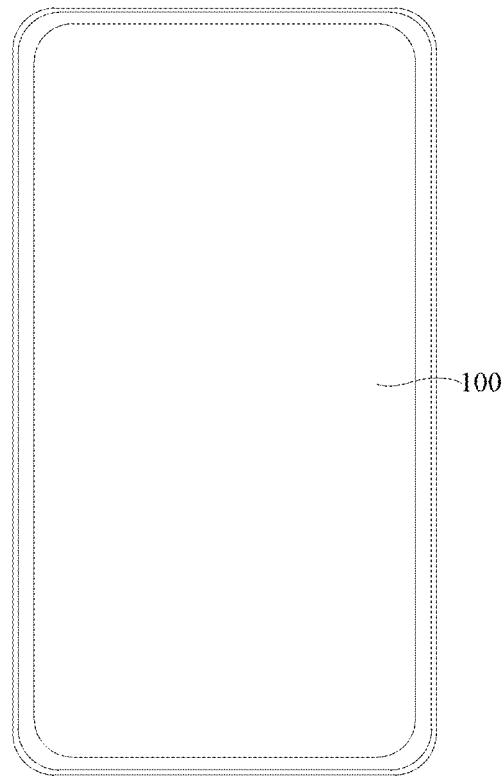
FIG. 60 is a schematic diagram of a display device according to an embodiment of the present disclosure.

An embodiment of the present disclosure further provides a display device. FIG. 60 is a schematic diagram of a display device according to an embodiment of the present disclosure. As shown in FIG. 60, the display device includes the liquid crystal display panel 100 described above. A specific structure of the display panel 100 has been described in details in the above-mentioned embodiments, and will not be repeated herein. It should be noted that the display device shown in FIG. 60 is merely for schematic illustration, and can be any electronic device having a display function, such as a mobile phone, a tablet computer, a notebook computer, an electronic paper book, or a television.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. A liquid crystal display panel, comprising:
   a first substrate and a second substrate facing the first substrate;
   a liquid crystal layer disposed between the first substrate and the second substrate;
   a first linear polarizer disposed on a side of the first substrate facing away from the liquid crystal layer and having an absorption axis extending along a first direction;
   a second linear polarizer disposed on a side of the second substrate facing away from the liquid crystal layer and having an absorption axis extending along a direction perpendicular to the first direction at a front viewing angle;
   a first quarter-wave plate disposed at the side of the first substrate facing away from the liquid crystal layer;
   a first half-wave plate disposed at the side of the first substrate facing away from the liquid crystal layer;
   a second quarter-wave plate disposed between the first substrate and the liquid crystal layer; and
   a second half-wave plate disposed between the first substrate and the liquid crystal layer,
   wherein light leakage is reduced when the liquid crystal display panel is in a black state;
   wherein the first half-wave plate is arranged between the first linear polarizer and the first quarter-wave plate,
   wherein an angle $\theta_1$ is formed between a slow axis of the first half-wave plate and the first direction, and an angle $\theta_2$ is formed between a slow axis of the first quarter-wave plate and the first direction; and the first quarter-wave plate is made of a positive material and $\theta_2=2\theta_1+45°$, or the first quarter-wave plate is made of a negative material and $\theta_2=2\theta_1+135°$; and
   wherein the second quarter-wave plate is made of a positive material, and an angle formed between a slow axis of the second quarter-wave plate and the first direction is 135°; or the second quarter-wave plate is made of a negative material, and the angle formed between the slow axis of the second quarter-wave plate and the first direction is 45°.

2. The liquid crystal display panel according to claim 1, wherein the second half-wave plate is arranged between the second linear polarizer and the second quarter-wave plate;
   the first quarter-wave plate is made of a positive material, and $\theta_2$ is 45°; or the first quarter-wave plate is made of a negative material, and $\theta_2$ is 135°; and
   an angle $\theta_3$ is formed between a slow axis of the second half-wave plate and the first direction, and an angle $\theta_4$ is formed between a slow axis of the second quarter-wave plate and the first direction; and the second quarter-wave plate is made of a positive material and $\theta_4=2\theta_3+135°$ or the second quarter-wave plate is made of a negative material and $\theta4=2\theta_3+45°$.

3. The liquid crystal display panel according to claim 1, wherein the second half-wave plate is arranged between the second linear polarizer and the second quarter-wave plate;
   the first quarter-wave plate is made of a positive material, and $\theta_2$ is 135°; or the first quarter-wave plate is made of a negative material, and $\theta_2$ is 45°; and
   an angle $\theta_3$ is formed between a slow axis of the second half-wave plate and the first direction, and an angle $\theta_4$ is formed between a slow axis of the second quarter-wave plate and the first direction; and the second quarter-wave plate is made of a positive material and $\theta_4=2\theta_3+45°$ or the second quarter-wave plate is made of a negative material and $\theta_4=2\theta_3+135°$.

4. The liquid crystal display panel according to claim 1, wherein the second quarter-wave plate is arranged between the second linear polarizer and the second half-wave plate;
the first quarter-wave plate is made of a positive material, and $\theta_2$ is 135°; or the first quarter-wave plate is made of a negative material, and $\theta_2$ is 45°; and
an angle $\theta_4$ is formed between a slow axis of the second quarter-wave plate and the first direction; and the second quarter-wave plate is made of a positive material and $\theta_4=135°$, or the second quarter-wave plate is made of a negative material and $\theta_4=45°$.

5. A display device, comprising the liquid crystal display panel according to claim 1.

* * * * *